(12) United States Patent
Nishita

(10) Patent No.: US 6,604,819 B2
(45) Date of Patent: *Aug. 12, 2003

(54) INK JET IMAGE RECORDING METHOD

(75) Inventor: Nobuhiro Nishita, Kanagawa (JP)

(73) Assignee: Fuji Photo Film Co., Ltd., Minami Ashigara (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/963,654

(22) Filed: Sep. 27, 2001

(65) Prior Publication Data

US 2002/0060727 A1 May 23, 2002

(30) Foreign Application Priority Data

| Sep. 28, 2000 | (JP) | ........................................ 2000-297365 |
| Sep. 29, 2000 | (JP) | ........................................ 2000-299465 |

(51) Int. Cl.$^7$ ................................................. B41J 2/01
(52) U.S. Cl. ........................... 347/100; 347/101; 347/95
(58) Field of Search ............................ 347/1, 100, 101, 347/96, 95, 84; 106/31.58, 31.6, 31.13, 31.27, 31.28; 523/160; 524/612

(56) References Cited

U.S. PATENT DOCUMENTS

| 5,063,146 A | * 11/1991 | Inagaki et al. ............... 430/522 |
| 5,446,136 A | 8/1995 | Pape et al. |
| 5,502,172 A | 3/1996 | Pape et al. |
| 5,644,350 A | * 7/1997 | Ando et al. .................. 347/101 |
| 5,847,738 A | * 12/1998 | Tutt et al. .................... 347/101 |
| 5,955,142 A | 9/1999 | Yoshino et al. |
| 6,142,618 A | * 11/2000 | Smith et al. ................... 347/85 |
| 6,147,139 A | 11/2000 | Shaw-Klein et al. |
| 6,270,214 B1 | * 8/2001 | Smith et al. ................. 347/100 |
| 6,283,589 B1 | 9/2001 | Gelbart |

FOREIGN PATENT DOCUMENTS

| DE | 43 43 454 A1 | 6/1995 |
| EP | 0 233 039 A2 | 8/1987 |
| EP | 1 035 172 A2 | 9/2000 |
| JP | 55-18412 | 2/1980 |
| JP | 7-237348 | 9/1995 |
| JP | 8-2090 | 1/1996 |

OTHER PUBLICATIONS

Annex to the European Search Report in European Patent Application No. EP 01 12 3187, dated Feb. 11, 2002.

\* cited by examiner

*Primary Examiner*—Raquel Yvette Gordon
*Assistant Examiner*—Manish Shah
(74) *Attorney, Agent, or Firm*—Burns, Doane, Swecker & Mathis, LLP

(57) ABSTRACT

An ink jet image recording method including: forming an image by ejecting an ink jet recording ink composition including one of a water-soluble dye and an oil-soluble dye onto an image-receiving material; and applying a solution including a dispersion of fine polymer particles to the image-receiving material simultaneously with or after the forming of an image or an ink jet image recording method including: applying a solution including a dispersion of fine polymer particles to an image-receiving material; and ejecting an ink jet recording ink composition including one of a water-soluble dye and an oil-soluble dye onto the image-receiving material for formation of an image, while the dispersion of fine polymer particles on the image-receiving material maintains a condition in which the ink jet recording ink composition is able to pass therethrough.

25 Claims, No Drawings

INK JET IMAGE RECORDING METHOD

FIELD OF THE INVENTION

The present invention relates to an ink jet image recording method which is excellent in quality of recording image, ejection stability and preservability of image formed.

BACKGROUND OF THE INVENTION

With popularization of computers in recent years, an ink jet printers are widely employed not only in offices but also in homes for printing on paper, films and clothes.

The ink jet recording method includes a system wherein a liquid droplet is ejected by applying pressure using a piezoelectric element, a system wherein a liquid droplet is ejected by generating a bubble in ink with heating, a system wherein a liquid droplet is ejected utilizing an ultrasonic wave and a system wherein a liquid droplet is ejected by an electrostatic attractive force. In these ink jet recording methods, an aqueous ink, an oily ink or a solid (melting type) ink is used as an ink jet recording ink. Of these inks, the aqueous ink is mainly used in view of productivity, handling, odor and safety.

It is requested for a coloring agent (e.g., dye and pigment) which is used in the ink jet recording ink to have high solubility to a solvent, to be capable of recoding in high density, to have good hue, to be excellent in fastness to light, heat, air, water and chemicals, to have a good fixing property to an image-receiving material and to be hardly blurred, to have good preservability as an ink, to be nonpoisonous, to have high purity, and to be available inexpensively. However, it is very difficult to obtain a coloring agent which satisfies these requirements in high levels. In particular, a coloring agent having good magenta hue and excellent light-fastness has been eagerly desired.

Various kinds of dyes and pigments have been proposed and practically employed for ink jet recording. However, a coloring agent which satisfies all such requirements has not yet been found. In case of using hitherto well-known dyes and pigments such as those having Colour Index (C.I.) number, the hue and fastness required for the ink jet recording ink are inconsistent.

On the other hand, methods for improving fastness by forming a covering film on the surface of image formed, thereby cutting off contact of the coloring agent with water, oxygen, ozone, $NO_x$ and the like have been studied.

For example, a method wherein an ink composition containing a latex is ejected from a recording head is described in JP-A-55-18412 (the term "JP-A" as used herein means an "unexamined published Japanese patent application"). According to the method, problems may occur in that ejection property of the ink composition degrades and in that the covering effect obtained is insufficient due to reduction in the coating amount of latex in a low density area.

In JP-A-7-237348 and JP-A-8-2090, there is described a method wherein a latex layer is provided on a hydrated alumina layer, image formation with ink is conducted in the hydrated alumina layer and then the latex layer is subjected to treatment for making a film. However, there is a problem in that if the ink or solvent remains in the latex layer at the time when the latex layer is heated for forming a film according to the method, crack may occur in the film formed and thus weather fastness and waterproofness of the portion degrade.

SUMMARY OF THE INVENTION

Therefore, an object of the present invention is to provide an ink jet image recording method which has high ejection stability and no defects in hue, weather fastness, waterproofness and image quality.

Other objects of the present invention will become apparent from the following description.

It has been found that these objects of the present invention are accomplished by the ink jet image recording methods described below.

(1) An ink jet image recording method comprising: forming an image by ejecting an ink jet recording ink composition comprising one of a water-soluble dye and an oil-soluble dye onto an image-receiving material; and applying a solution comprising a dispersion of fine polymer particles to the image-receiving material simultaneously with or after the forming of an image.

(2) An ink jet image recording method comprising: applying a solution comprising a dispersion of fine polymer particles to an image-receiving material; and ejecting an ink jet recording ink composition comprising one of a water-soluble dye and an oil-soluble dye onto the image-receiving material for formation of an image, while the dispersion of fine polymer particles on the image-receiving material maintains a condition in which the ink jet recording ink composition is able to pass therethrough.

(3) The ink jet image recording method according to (1) or (2) above, wherein the dispersion of fine polymer particles is a dispersion of fine polymer particles in which the polymer has an ethylenically unsaturated group in the main chain or side chain thereof.

(4) The ink jet image recording method according to (1) or (2) above, wherein a glass transition temperature (Tg) of the polymer in the dispersion of fine polymer particles is from −40 to 160° C.

(5) The ink jet image recording method according to (3) or (4) above, wherein the polymer is one of a homopolymer and a copolymer both comprising resin selected from the group consisting of acrylic or methacrylic resin, styrene resin, conjugated diene resin, vinyl acetate resin and polyolefin resin.

(6) The ink jet image recording method according to (1) or (2) above, wherein the polymer is a dissociation group-containing polymer selected from the group consisting of a vinyl polymer, polyurethane, polyester, polyamide, polyurea and polycarbonate.

(7) The ink jet image recording method according to (6) above, wherein the dissociation group-containing polymer is a dissociation group-containing polymer comprising a group selected from the group consisting of a cationic dissociation group and an anionic dissociation group.

(8) The ink jet image recording method according to (6) above, wherein the content of dissociation groups in the dissociation group-containing polymer is from 0.1 mmol/g to 3.0 mmol/g.

(9) The ink jet image recording method according to (1) or (2) above, wherein the recording is conducted up on an image-receiving material, the image-receiving material comprising an ink receiving layer disposed on a support, with the ink receiving layer including a porous inorganic pigment.

(10) The ink jet image recording method according to (1) or (2) above, wherein a glass transition temperature (Tg) of the polymer in the dispersion of fine polymer particles is from −40 to 160° C.

(11) The ink jet image recording method according to (1) or (2) above, wherein a coating amount of the dispersion of fine polymer particles is from 0.1 to 10 g/m² in terms of the solid content.

(12) The ink jet image recording method according to (1) or (2) above, wherein the ink jet recording ink composition comprises a water-soluble dye represented by formula (A-I):

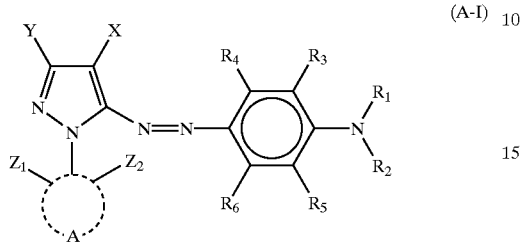

(A-I)

wherein X represents an electron attractive group having a Hammett's substituent constant $\sigma_p$ value of not less than 0.20; $R_1$, $R_2$, $R_3$, $R_4$, $R_5$, $R_6$ and Y, which may be the same or different, each represents a hydrogen atom, a halogen atom, an alkyl group, a cycloalkyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, sulfinyl group, a phosphoryl group, an acyl group or an ionic hydrophilic group; $R_1$ and $R_2$, $R_1$ and $R_3$ or $R_2$ and $R_5$ may combine with each other to form a ring; $Z_1$ and $Z_2$, which may be the same or different, each represents a hydrogen atom, a halogen atom, an alkyl group, a cycloalkyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, sulfinyl group, a phosphoryl group, an acyl group or an ionichydrophilic group; A represents a non-metallicatomic group necessary to form a 5-membered to 8-membered ring which may be a saturated ring or have an unsaturated bond, at least three atoms of the non-metallic atomic group are bonded to the nitrogen atom of the pyrazole ring, $Z_1$ and $Z_2$, respectively, and the atom bonding to the nitrogen atom of the pyrazole ring is connected to both the atom bonding to $Z_1$ and the atom bonding to $Z_2$; provided that at least one of $R_1$, $R_2$, $R_3$, $R_4$, $R_5$, $R_6$, X, Y, $Z_1$, $Z_2$ and A represents an ionic hydrophilic group or has an ionic hydrophilic group as a substituent.

(13) The ink jet image recording method according to (1) or (2) above, wherein the ink jet recording ink composition comprises a dye dispersion comprising an aqueous medium dispersed therein a high-boiling point organic solvent comprising an oil-soluble dye represented by formula (B-I) or (B-II) dissolved therein:

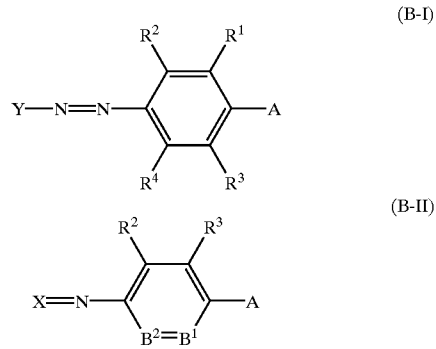

wherein $R^1$, $R^2$, $R^3$ and $R^4$, which may be the same or different, each represents a hydrogen atom, a halogen atom, an aliphatic group, an aromatic group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, sulfinyl group, a phosphoryl group, an acyl group, a carboxyl group or a sulfo group; A represents $-NR^5R^6$ or a hydroxy group; $R^5$ and $R^6$, which may be the same or different, each represents a hydrogen atom, an aliphatic group, an aromatic group or a heterocyclic group; $R^5$ and $R^6$ may combine with each other to form a ring together with the nitrogen atom; $B^1$ represents $=C(R^3)-$ or $=N-$; $B^2$ represents $-C(R^4)=$ or $-N=$; $R^1$ and $R^5$, $R^3$ and $R^6$ and/or $R^1$ and $R^2$ may combine with each other to form an aromatic ring or a heterocyclic ring; X represents a photographic color coupler residue; and Y represents an unsaturated heterocyclic group.

(14) The ink jet image recording method according to (1) or (2) above, wherein the ink jet recording ink composition comprises one of a water-soluble dye and an oil-soluble dye in an amount of from 0.2 to 20% by weight.

DETAILED DESCRIPTION OF THE INVENTION

The present invention is described in more detail below.

According to the ink jet image recording method of the present invention, an ink composition containing a water-soluble dye or an oil-soluble dye and a solution containing a dispersion of fine polymer particles are separately prepared and individually applied to an image-receiving material. Thus, after the formation of image, the dispersion of fine polymer particles can be converted to form a film on the image-receiving material so that the weather fastness and waterproofness of image are improved. Also, the dispersion of fine polymer particles is able to form a uniform film on the image-receiving material so that unevenness of gloss dose not occur in the image area.

Further, tackiness of the surface of image-receiving material after the application can be reduced upon the use of a dispersion of fine polymer particles having a high glass transition temperature.

In order to apply the ink composition containing a water-soluble dye or an oil-soluble dye and the solution containing a dispersion of fine polymer particles individually to the image-receiving material, the solution containing a dispersion of fine polymer particles is uniformly applied to the image-receiving material simultaneously with or after the imagewise application of the ink composition containing a water-soluble dye or an oil-soluble dye to the image-receiving material or the ink composition containing a water-soluble dye or an oil-soluble dye is imagewise applied to the image-receiving material after the solution containing a dispersion of fine polymer particles is uniformly applied to the image-receiving material. In case of former method, the solution containing a dispersion of fine polymer particles is uniformly applied to the image-receiving material, simultaneously with or after the imagewise application of the ink composition containing a water-soluble dye or an oil-soluble dye to the image-receiving material, the method is preferably applying the solution containing a dispersion of fine polymer particles uniformly to the image-receiving material after drying the imagewise application of the ink composition containing a water-soluble dye or an oil-soluble dye to the image-receiving material. In the case wherein the solution containing a dispersion of fine polymer particles is applied earlier than the application of the ink composition containing a water-soluble dye or an oil-soluble dye to the image-receiving material, it is necessary to apply the ink composition containing a water-soluble dye or an oil-soluble dye while the dispersion of fine polymer particles applied to the image-receiving material maintains a condition in which the dispersion dose not form a film and the ink composition is able to pass through the dispersion and to penetrate into the image-receiving material.

Examples of the water-soluble dye and oil-soluble dye contained in the ink composition of the present invention include yellow dyes, magenta dyes and cyan dyes.

Examples of the yellow dyes include aryl or heteryl azo dyes containing coupling components such as phenols, naphthols, anilines, pyrazolones, pyridones and open-chain active methylene compounds; azomethine dyes containing coupling components such as open-chain active methylene compounds; methine dyes such as benzylidene dyes and monomethineoxonol dyes; quinone dyes such as naphthoquinone dyes and anthraquinione dyes; quinophthalone dyes; nitro and nitroso dyes; acridine dyes; and acridinone dyes. These dyes may be those generate yellow color upon dissociation of apart of the chromophore thereof. In such a case, a counter cation may be an inorganic cation such as an alkali metal or ammonium, an organic cation such as pyridinium or a quaternary ammonium salt or a polymer cation containing such a cation as a partial structure.

Examples of the magenta dyes include aryl or heteryl azo dyes containing coupling components such as phenols, naphthols and anilines; azomethine dyes containing coupling components such as pyrazolones and pyrazolotriazoles; methine dyes such as arylidene dyes, styryl dyes, merocyanine dyes and oxonol dyes; carbonium dyes such as diphenylmethane dyes, triphenylmethane dyes and xanthene dyes; quinone dyes such as naphthoquinone dyes, anthraquinone dyes and anthrapyridone dyes; and condensed multi-nucleus dyes such as dioxazine dyes. These dyes may be those generate magenta color upon dissociation of a part of the chromophore thereof. In such a case, a counter cation may be an inorganic cation such as an alkali metal or ammonium, an organic cation such as pyridinium or a quaternary ammonium salt or a polymer cation containing such a cation as a partial structure.

Examples of the cyan dyes include azomethine dyes such as indoaniline dyes and indophenol dyes; polymethine dyes such as cyanine dyes, oxonol dyes and merocyanine dyes; carbonium dyes such as diphenylmethane dyes, triphenylmethane dyes and xanthene dyes; phthalocyanine dyes; anthraquinone dyes; aryl or heteryl azo dyes containing coupling components such as phenols, naphthols and anilines; and indigo and thioindigo dyes. These dyes may be those generate cyan color upon dissociation of a part of the chromophore thereof. In such a case, a counter cation may be an inorganic cation such as an alkali metal or ammonium, an organic cation such as pyridinium or a quaternary ammonium salt or a polymer cation containing such a cation as a partial structure.

Further, black dyes such as polyazo dyes can be used.

Specific examples of preferred dye include C.I. Solvent Black 3, 7, 27, 29 and 34; C.I. Solvent Yellow 14, 16, 19, 29, 30, 56, 82, 93 and 162; C.I. Solvent Red 1, 3, 8, 18, 24, 27, 43, 49, 51, 72, 73, 109, 122, 132 and 218; C.I. Solvent Violet 3; C.I. Solvent Blue 2, 11, 25, 35, 38, 67 and 70; C.I. Solvent Green 3 and 7; and C.I. Solvent Orange 2, but the present invention should not be construed as being limited thereto. Among these dyes, Nubian Black PC-0850, Oil Black HBB, Oil Yellow 129, Oil Yellow 105, Oil Pink 312, Oil Red 5B, Oil Scarlet 308, Vali Fast Blue 2606 and Oil Blue BOS (manufactured by Orient Chemical Co., Ltd.), Aizen Spilon Blue GNH (manufactured by Hodogaya Chemical Co., Ltd.), Neopen Yellow 075, Neopen Mazenta SE1378, Neopen Blue 808, Neopen Blue FF4012 and Neopen Cyan FF4238 (manufactured by BASF AG) are particularly preferred.

In the present invention, a disperse dye can also be used as far as it is soluble in a water-immiscible organic solvent. Specific examples of preferred dye include C.I. Disperse Yellow 5, 42, 54, 64, 79, 82, 83, 93, 99, 100, 119, 122, 124, 126, 160, 184:1, 186, 198, 201, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 205, 207, 221, 239, 240, 258, 277, 278, 283, 311, 323, 343, 356 and 362; C.I. Disperse Violet 33; C.I. Disperse Blue 55, 60, 73, 87, 113, 128, 143, 148, 154, 158, 165, 165:1, 165:2, 176, 183, 185, 197, 198, 201, 214, 224, 257, 266, 267, 287, 354, 358, 365 and 368; and C.I. Disperse Green 6:1 and 9.

Water-Soluble Dye

The ink jet recording ink composition for use in the present invention includes the dye represented by formula (A-I) described above. The water-soluble azo dye represented by formula (A-I) for use in the present invention will be described in greater detail below.

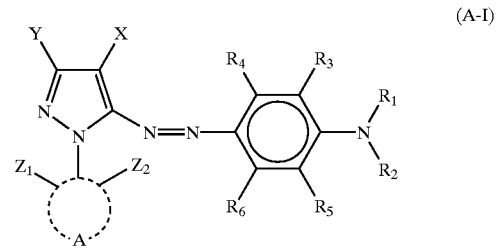

(A-I)

In formula (A-I), X represents an electron attractive group having a Hammett's substituent constant σp value of not less than 0.20, preferably an electron attractive group having a Hammett's substituent constant σp value of from 0.30 to 1.0.

The Hammett's substituent constant σp value used herein is described below. The Hammett's rule is an empirical rule which was proposed by L. P. Hammett in 1935 in order to quantitatively deal with the influence of substituents on the reaction or equilibrium of benzene derivatives and its reasonability has been widely admitted. The substituent constants obtained on the basis of the Hammett's rule are σp value and σm value and they are described in various ordinary publications. For example, the details thereof are described in J. A. Dean, *Lange's Handbook of Chemistry*, 12th Edition, 1979, published by The McGraw-Hill Co. and *Kagaku no Ryoiki*, Extra Edition, No. 122, pages 96 to 103, 1979, published by Nankodo Co., Ltd. In the present invention, the substituents are defined and explained by their Hammett's substituent constant $\sigma_p$ values. However, this does not mean that they are limited only to such substituents whose $\sigma_p$ values are known in published literatures as described above and as a matter of cause, they include all substituents having $\sigma_p$ values falling within the defined range when measured on the basis of the Hammett's rule even though their $\sigma_p$ values are not described in published literatures. Although the compounds represented by formula (A-I) according to the present invention are not benzene derivatives, the $\sigma_p$ value is used as a measure for indicating an electron effect of the substituent irrespective of the position of substituent.

In the present invention, the $\sigma_p$ value is used in the meaning as described above.

Specific examples of the electron attractive group having a Hammett's substituent constant p value of not less than 0.20 for X include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanato group, a thiocarbonyl group, a halogenated alkyl group, a halogenated aryloxy group, a halogenated alkylamino group, a halogenated alkyloxy group, a halogenated alkylthio group, an aryl group substituted with an electron attractive group having a Hammett's substituent constant $\sigma_p$ value of not less than 0.20, a heterocyclic group, a halogen atom, an azo group and a selenocyanato group.

When the group represented by X can be further substituted, examples of the substituent include a halogen atom (e.g., chlorine or bromine), a straight-chain or branched alkyl group having from 1 to 12 carbon atoms (e.g., methyl, ethyl, propyl, isopropyl or tert-butyl), an aralkyl group having from 7 to 18 carbon atoms (e.g., benzyl or phenethyl), an alkenyl group having from 2 to 12 carbon atoms (e.g., vinyl or allyl), a straight-chain or branched alkynl group having from 2 to 12 carbon atoms (e.g., ethynyl), a cycloalkyl group having from 3 to 12 carbon atoms (e.g., cyclopropyl or cyclohexyl), a cycloalkenyl group having from 3 to 12 carbon atoms (e.g., cyclopentenyl or cyclohexenyl), an aryl group (e.g., phenyl, 4-tert-butylphenyl or 2,4-di-tert-amylphenyl), a heterocyclic group (e.g., imidazolyl, pyrazolyl, triazolyl, 2-furyl, 2-thienyl, 2-pyrimidinyl or 2-benzothiazolyl), a cyano group, a hydroxy group, a nitro group, a carboxy group, an amino group, an alkyloxy group (e.g., methoxy, ethoxy, 2-methoxyethoxy or 2-methanesulfonylethoxy), an aryloxy group (e.g., phenoxy, 2-methylphenoxy, 4-tert-butylphenoxy, 3-nitrophenoxy, 3-tert-butyloxycarbamoylphenoxy or 3-methoxycarbamoylphenoxy), an acylamino group (e.g., acetamido, benzamido or 4-(3-tert-butyl-4-hydroxyphenoxy)butanamido), an alkylamino group (e.g., methylamino, butylamino, diethylamino or methybutylamino), an anilino group (e.g., phenylamino or 2-chloroanilin), a ureido (e.g., phenylureido, methylureido or N,N-dibutylureido), a sulfamoylamino group (e.g., N,N-dipropylsulfamoylamino), an alkylthio group (e.g., methylthio, octylthio or 2-phenoxyethylthio), an arylthio (e.g., phenylthio, 2-butoxy-5-tert-octylphenylthio or 2-carboxyphenylthio), an alkyloxycarbonylamino group (e.g., methoxycarbonylamino), a sulfonamido group (e.g., methanesulfonamido, benzenesulfonamido or p-toluenesulfonamido), a carbamoyl group (e.g., N-ethylcarbamoyl or N,N-dibutylcarbamoyl), a sulfamoyl group (e.g., N-ethylsulfamoyl, N,N-dipropylsulfamoyl or N,N-diethylsulfamoyl), a sulfonyl group (e.g., methanesulfonyl, octanesulfonyl, benzenesulfonyl or toluenesulfonyl), an alkyloxycarbonyl group (e.g., methoxycarbonyl or butyloxycarbonyl), a heterocyclicoxy group (e.g., 1-phenyltetrazol-5-oxy or 2-tetrahydropyranyloxy), an azo group (e.g., phenylazo, 4-methoxyphenylazo, 4-pivaloylaminophenylazo or 2-hydroxy-4-propanoylphenylazo), an acyloxy group (e.g., acetoxy), a carbamoyloxy group (e.g., N-methylcarbamoyloxy or N-phenylcarbamoyloxy), a silyloxy group (e.g., trimethylsilyloxy or dibutylmethylsilyloxy), an aryloxycarbonylamino group (e.g., phenoxycarbonylamino), an imido group (e.g., N-succinimido or N-phthalimido), a heterocyclicthio group (e.g., 2-benzothiazolylthio, 2,4-diphenoxy-1,3,5-triazol-6-thio or 2-pyridylthio), a sulfinyl group (e.g., 3-phenoxypropylsulfinyl), a phosphonyl group (e.g., phenoxyphosphonyl, octyloxyphosphonyl or phenylphosphonyl), an aryloxycarbonyl group (e.g., pheoxycarbonyl) and an acyl group (e.g., acetyl, 3-phenylpropanoyl or benzoyl).

Preferred examples of the electron attractive group for X include an acyl group having from 2 to 12 carbon atoms, an acyloxy group having from 2 to 12 carbon atoms, a carbamoyl group having from 2 to 12 carbon atoms, an alkyloxycarbonyl group having from 2 to 12 carbon atoms, an aryloxycarbonyl group having from 7 to 18 carbon atoms, a cyano group, a nitro group, an alkylsulfinyl group having from 1 to 12 carbon atoms, an arylsulfinyl group having from 6 to 18 carbon atoms, an alkylsulfonyl group having from 1 to 12 carbon atoms, an arylsulfonyl group having from 6 to 18 carbon atoms, a sulfamoyl group having from 0 to 12 carbon atoms, a halogenated alkyl group having from 1 to 12 carbon atoms, a halogenated alkyloxy group having from 1 to 12 carbon atoms, a halogenated alkylthio group having from 1 to 12 carbon atoms, a halogenated aryloxy group having from 7 to 18, an aryl group having from 7 to 18 carbon atoms substituted with an electron attractive group having a Hammett's substituent constant $\sigma_p$ value of not less than 0.20, and a 5-membered to 8-membered heterocyclic group containing a nitrogen atom, an oxygen atom or a sulfur atom and having from 1 to 18 carbon atoms.

X is more preferably an alkyloxycarbonyl group having from 2 to 12 carbon atoms, a nitro group, a cyano group, an alkylsulfonyl group having from 1 to 12 carbon atoms, an arylsulfonyl group having from 6 to 18 carbon atoms, a carbamoyl group having from 1 to 12 carbon atoms and a halogenated alkyl group having from 1 to 12 carbon atoms are preferred. Particularly, a cyano group, an alkylsulfonyl group having from 1 to 12 carbon atoms and an arylsulfonyl group having from 6 to 18 carbon atoms are preferred. Most preferably, X represents a cyano group.

In formula (A-I) above, $R_1$, $R_2$, $R_3$, $R_4$, $R_5$, $R_6$ and Y, which may be the same or different, each represents a hydrogen atom, a halogen atom, an alkyl group, a cycloalkyl group, an aralkyl group, an aryl group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, sulfinyl group, a phosphoryl group, an acyl group or an ionic hydrophilic group.

Of these groups, a hydrogen atom, a halogen atom, an alkyl group, an aryl group, a cyano group, an alkoxy group, an amido group, a ureido group, an alkoxycarbonylamino group, a sulfonamido group, a carbamoyl group, a sulfamoyl group and an alkoxycarbonyl group are preferred.

The halogen atom represented by $R_1$, $R_2$, $R_3$, $R_4$, $R_5$, $R_6$ or Y includes a fluorine atom, a chlorine atom and a bromine atom.

The alkyl group represented by $R_1$, $R_2$, $R_3$, $R_4$, $R_5$, $R_6$ or Y includes an alkyl group having a substituent and an unsubstituted alkyl group. The alkyl group is preferably an alkyl group having from 1 to 12 carbon atoms. Examples of the substituent include a hydroxy group, an alkoxy group, a cyano group, a halogen atom and an ionic hydrophilic group. Specific examples of the alkyl group include methyl, ethyl, butyl, isopropyl, tert-butyl, hydroxyethyl, methoxyethyl, cyanoethyl, trifluoromethyl, 3-sulfopropyl and 4-sulfobutyl.

The cycloalkyl group represented by $R_1$, $R_2$, $R_3$, $R_4$, $R_5$, $R_6$ or Y includes a cycloalkyl group having a substituent and an unsubstituted cycloalkyl group. The cycloalkyl group is preferably a cycloalkyl group having from 5 to 12 carbon atoms. Examples of the substituent include an inonic hydrophilic group. Specific examples of the cycloalkyl group include cyclohexyl.

The araklyl group represented by $R_1$, $R_2$, $R_3$, $R_4$, $R_5$, $R_6$ or Y includes an aralkyl group having a substituent and an unsubstituted aralkyl group. The aralkyl group is preferably an aralkyl group having from 7 to 12 carbon atoms. Examples of the substituent include an inonic hydrophilic group. Specific examples of the aralkyl group include benzyl and 2-phenethyl.

The aryl group represented by $R_1$, $R_2$, $R_3$, $R_4$, $R_5$, $R_6$ or Y includes an aryl group having a substituent and an unsubstituted aryl group. The aryl group is preferably an aryl group having from 6 to 12 carbon atoms. Examples of the substituent include an alkyl group, an alkoxy group, a halogen atom, an alkylamino group and an inonic hydrophilic group. Specific examples of the aryl group include phenyl, p-tolyl, p-methoxyphenyl, o-chlorophenyl and m-(3-sulfopropyulamino)phenyl.

The heterocyclic group represented by $R_1$, $R_2$, $R_3$, $R_4$, $R_5$, $R_6$ or Y includes a heterocyclic group having a substituent and an unsubstituted heterocyclic group. The heterocyclic group is preferably a 5-membered or 6-membered heterocyclic group. Examples of the substituent include an inonic hydrophilic group. Specific examples of the heterocyclic group include 2-pyridyl, 2-thienyl and 2-furyl.

The alkylamino group represented by $R_1$, $R_2$, $R_3$, $R_4$, $R_5$, R6 or Y includes an alkylamino group having a substituent and an unsubstituted alkylamino group. The alkylamino group is preferably an alkylamino group having from 1 to 6 carbon atoms. Examples of the substituent include an inonic hydrophilic group. Specific examples of the alkylamino group include methylamino and diethylamino.

The alkoxy group represented by $R_1$, $R_2$, $R_3$, $R_4$, $R_5$, R6 or Y includes an alkoxy group having a substituent and an unsubstituted alkoxy group. The alkoxy group is preferably an alkoxy group having from 1 to 12 carbon atoms. Examples of the substituent include an alkoxy group, a hydroxy group and an inonic hydrophilic group. Specific examples of the alkoxy group include methoxy, ethoxy, isopropoxy, methoxyethoxy, hydroxyethoxy and 3-carboxypropoxy.

The aryloxy group represented by $R_1$, $R_2$, $R_3$, $R_4$, $R_5$, $R_6$ or Y includes an aryloxy group having a substituent and an unsubstituted aryloxy group. The aryloxy group is preferably an aryloxy group having from 6 to 12 carbon atoms. Examples of the substituent include an alkoxy group and an inonic hydrophilic group. Specific examples of the aryloxy group include phenoxy, p-methoxyphenoxy and o-methoxyphenoxy.

The amido group represented by $R_1$, $R_2$, $R_3$, $R_4$, $R_5$, $R_6$ or Y includes an amido group having a substituent and an unsubstituted amido group. The amido group is preferably an amido group having from 2 to 12 carbon atoms. Examples of the substituent include an inonic hydrophilic group. Specific examples of the amido group include acetamido, propionamido, benzamido and 3,5-disulfobenzamido.

The arylamino group represented by $R_1$, $R_2$, $R_3$, $R_4$, $R_5$, R6 or Y includes an arylamino group having a substituent and an unsubstituted arylamino group. The arylamino group is preferably an arylamino group having from 6 to 12 carbon atoms. Examples of the substituent include a halogen atom and an inonic hydrophilic group. Specific examples of the arylamino group include anilino and 2-chloroanilino.

The ureido group represented by $R_1$, $R_2$, $R_3$, $R_4$, $R_5$, $R_6$ or Y includes a ureido group having a substituent and an unsubstituted ureido group. The ureido group is preferably a ureido group having from 1 to 12 carbon atoms. Examples of the substituent include an alkyl group and an aryl group. Specific examples of the ureido group include 3-methylureido, 3,3-dimethylureido and 3-phenylureido.

The sulfamoylamino group represented by $R_1$, $R_2$, $R_3$, $R_4$, $R_5$, $R_6$ or Y includes a sulfamoylamino group having a substituent and an unsubstituted sulfamoylamino group. The sulfamoylamino group is preferably a sulfamoylamino group. Examples of the substituent include an alkyl group. Specific examples of the sulfamoylamino group include N,N-dipropylsulfamoylamino.

The alkylthio group represented by $R_1$, $R_2$, $R_3$, $R_4$, $R_5$, $R_6$ or Y includes an alkylthio group having a substituent and an unsubstituted alkylthio group. The alkylthio group is preferably an alkylthio group having from 1 to 12 carbon atoms. Examples of the substituent include an inonic hydrophilic group. Specific examples of the alkylthio group include methylthio and ethylthio.

The arylthio group represented by $R_1$, $R_2$, $R_3$, $R_4$, $R_5$, $R_6$ or Y includes an arylthio group having a substituent and an unsubstituted arylthio group. The arylthio group is preferably an arylthio group having from 6 to 12 carbon atoms. Examples of the substituent include an alkyl group and an inonic hydrophilic group. Specific examples of the arylthio group include phenylthio and p-tolylthio.

The alkoxycarbonylamino group represented by $R_1$, $R_2$, $R_3$, $R_4$, $R_5$, $R_6$ or Y includes an alkoxycarbonylamino group having a substituent and an unsubstituted alkoxycarbonylamino group. The alkoxycarbonylamino group is preferably an alkoxycarbonylamino group having from 2 to 12 carbon atoms. Examples of the substituent include an ionic hydrophilic group. Specific examples of the alkoxycarbonylamino group include ethoxycarbonylamino.

The sulfonamido group represented by $R_1$, $R_2$, $R_3$, $R_4$, $R_5$, R6 or Y includes a sulfonamido group having a substituent and an unsubstituted sulfonamido group. The sulfonamido group is preferably a sulfonamido group having from 1 to 12 carbon atoms. Examples of the substituent include an ionic hydrophilic group. Specific examples of the sulfonamido group include methanesulfonamido, benzenesulfonamido and 3-carboxybenzenesulfonamido.

The carbamoyl group represented by $R_1$, $R_2$, $R_3$, $R_4$, $R_5$, $R_6$ or Y includes a carbamoyl group having a substituent and an unsubstituted carbamoyl group. The carbamoyl group is preferably a carbamoyl group. Examples of the substituent includean alkyl group. Specific examples of the carbamoyl group include methylcarbamoyl and dimethylcarbamoyl.

The sulfamoyl group represented by $R_1$, $R_2$, $R_3$, $R_4$, $R_5$, $R_6$ or Y includes a sulfamoyl group having a substituent and an unsubstituted sulfamoyl group. The sulfamoyl group is preferably a sulfamoyl group. Examples of the substituent include an alkyl group. Specific examples of the sulfamoyl group include dimethylsulfamoyl and di-(2-hydroxyethyl)sulfamoyl.

The sulfonyl group represented by $R_1$, $R_2$, $R_3$, $R_4$, $R_5$, $R_6$ or Y includes a sulfonyl group having a substituent and an unsubstituted sulfonyl group. The sulfonyl group is preferably a sulfonyl group. Examples of the substituent include an alkyl group and an aryl group. Specific examples of the sulfonyl group include methanesulfonyl and phenylsulfonyl.

The alkoxycarbonyl group represented by $R_1$, $R_2$, $R_3$, $R_4$, $R_5$, $R_6$ or Y includes an alkoxycarbonyl group having a substituent and an unsubstituted alkoxycarbonyl group. The alkoxycarbonyl group is preferably an alkoxycarbonyl group having from 2 to 12 carbon atoms. Examples of the substituent include an ionic hydrophilic group. Specific examples of the alkoxycarbonyl group include methoxycarbonyl and ethoxycarbonyl.

The heterocyclicoxy group represented by $R_1$, $R_2$, $R_3$, $R_4$, $R_5$, $R_6$ or Y includes a heterocyclicoxy group having a substituent and an unsubstituted heterocyclicoxy group. The heterocyclicoxy group is preferably a heterocyclicoxy group having a 5-membered or 6-membered heterocyclic ring. Examples of the substituent include a hydroxy group and an ionic hydrophilic group. Specific examples of the heterocyclicoxy group include 2-tetrahydropyranyloxy.

The azo group represented by $R_1$, $R_2$, $R_3$, $R_4$, $R_5$, $R_6$ or Y includes an azo group having a substituent and an unsubstituted azo group. The azo group is preferably an azo group. Examples of the azo group include p-nitrophenylazo.

The acyloxy group represented by $R_1$, $R_2$, $R_3$, $R_4$, $R_5$, $R_6$ or Y includes an acyloxy group having a substituent and an unsubstituted acyloxy group. The acyloxy group is preferably an acyloxy group having from 1 to 12 carbon atoms. Examples of the substituent include an ionic hydrophilic group. Specific examples of the acyloxy group include acetoxy and benzoyloxy.

The carbamoyloxy group represented by $R_1$, $R_2$, $R_3$, $R_4$, $R_5$, $R_6$ or Y includes a carbamoyloxy group having a substituent and an unsubstituted carbamoyloxy group. The carbamoyloxy group is preferably a carbamoyloxy group. Examples of the substituent include an alkyl group. Specific examples of the carbamoyloxy group include N-methylcarbamoyloxy.

The silyloxy group represented by $R_1$, $R_2$, $R_3$, $R_4$, $R_5$, $R_6$ or Y includes a silyloxy group having a substituent and an unsubstituted silyloxy group. The silyloxy group is preferably a silyloxy group. Examples of the substituent include an alkyl group. Specific examples of the silyloxy group include trimethylsilyloxy.

The aryloxycarbonyl group represented by $R_1$, $R_2$, $R_3$, $R_4$, $R_5$, $R_6$ or Y includes an aryloxycarbonyl group having a substituent and an unsubstituted aryloxycarbonyl group. The aryloxycarbonyl group is preferably an aryloxycarbonyl group having from 7 to 12 carbon atoms. Examples of the substituent include an ionic hydrophilic group. Specific examples of the aryloxycarbonyl group include phenoxycarbonyl.

The aryloxycarbonylamino group represented by $R_1$, $R_2$, $R_3$, $R_4$, $R_5$, $R_6$ or Y includes an aryloxycarbonylamino group having a substituent and an unsubstituted aryloxycarbonylamino group. The aryloxycarbonyl group is preferably an aryloxycarbonyl group having from 7 to 12 carbon atoms. Examples of the substituent include an ionic hydrophilic group. Specific examples of the aryloxycarbonylamino group include phenoxycarbonylamino.

The imido group represented by represented by $R_1$, $R_2$, $R_3$, $R_4$, $R_5$, $R_6$ or Y includes an imido group having a substituent and an unsubstituted imido group. The imido group is preferably an imido group. Examples of the imido group include N-phthalimido and N-succinimido.

The heterocyclicthio group represented by $R_1$, $R_2$, $R_3$, $R_4$, $R_5$, $R_6$ or Y includes a heterocyclicthio group having a substituent and an unsubstituted heterocyclicthio group. The heterocyclicthio group is preferably a heterocyclicthio group having a 5-membered or 6-membered heterocyclic ring. Examples of the substituent include an ionic hydrophilic group. Specific examples of the heterocyclicthio group include 2-pyridylthio.

The sulfinyl group represented by represented by $R_1$, $R_2$, $R_3$, $R_4$, $R_5$, $R_6$ or Y includes a sulfinyl group having a substituent and an unsubstituted sulfinyl group. The sulfinyl group is preferably a sulfinyl group. Examples of the sulfinyl group include phenylsulfinyl.

The phosphoryl group represented by $R_1$, $R_2$, $R_3$, $R_4$, $R_5$, $R_6$ or Y includes a phosphoryl group having a substituent and an unsubstituted phosphoryl group. The phosphoryl group is preferably a phosphoryl group. Specific examples of the phosphoryl group include phenoxyphosphoryl and phenylphosphoryl.

The acyl group represented by $R_1$, $R_2$, $R_3$, $R_4$, $R_5$, $R_6$ or Y includes an acyl group having a substituent and an unsubstituted acyl group. The acyl group is preferably an acyl group having from 1 to 12 carbon atoms. Examples of the substituent include an ionic hydrophilic group. Specific examples of the acyl group include acetyl and benzoyl.

The ionic hydrophilic group represented by $R_1$, $R_2$, $R_3$, $R_4$, $R_5$, $R_6$ or Y includes a carboxy group, a sulfo group and a quaternary ammonium group. Of the ionic hydrophilic groups, a carboxy group and a sulfo group are preferred, and a sulfo group is particularly preferred. The carboxy group and sulfo group may be the form of a salt and examples of a counter ion for forming the salt include an alkali metal ion (e.g., sodium ion or potassium ion) and an organic cation (e.g., tetramethylguanidinium ion).

In formula (A-I), $R_1$ and $R_2$, $R_1$ and $R_3$ or $R_2$ and $R_5$ may combine with each other to form a ring. Specific preferred examples of the ring formed are set forth below.

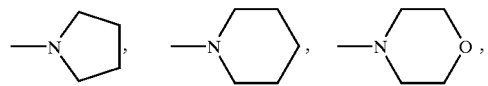

-continued

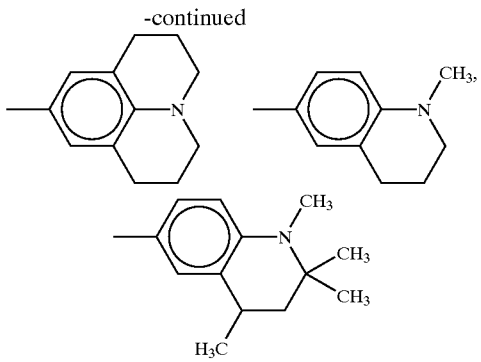

In formula (A-I), A represents a non-metallic atomic group necessary to form a 5-membered to 8-membered ring. Hereinafter, the ring formed with A is referred to as "ring A" sometimes. The ring A may be a saturated ring or have an unsaturated bond. The non-metallic atomic group is preferably an atomic group composed of one kind of atom or a combination of two or more kinds of atoms selected from a nitrogen atom, an oxygen atom, a sulfur atom and a carbon atom, and particularly preferably an atomic group composed of only carbon atoms.

Specific examples of the ring A includes a benzene ring, a cyclopentane ring, a cyclohexane ring, a cycloheptane ring, a cyclooctane ring, a cyclohexene ring, a pyridine ring, a piperazine ring, an oxane ring and a thiane ring. When such a ring further has a substituent, examples of the substituent include the groups defined for $R_1$ to $R_6$, Y, $Z_1$ and $Z_2$ described above.

At least three atoms of the non-metallic atomic group for forming the ring A are bonded to the nitrogen atom of the pyrazole ring, $Z_1$ and $Z_2$, respectively, and the atom bonding to the nitrogen atom of the pyrazole ring is connected to both the atom bonding to $Z_1$ and the atom bonding to $Z_2$.

As the ring A, a benzene ring is preferred, and a benzene ring substituted with an ionic hydrophilic group (which may be substituted with the substituent described above) on the 4-position to the nitrogen atom of the pyrazole ring, in addition to the substituents of the nitrogen atom of the pyrazole ring, $Z_1$ and $Z_2$ is particularly preferred.

In formula (A-I), $Z_1$ and $Z_2$, which may be the same or different, each represents a hydrogen atom, a halogen atom, an alkyl group, a cycloalkyl group, an aralkyl group, an aryl group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, sulfinyl group, a phosphoryl group, an acyl group or an ionic hydrophilic group.

Of these groups, a halogen atom, an alkyl group, an aryl group, a cyano group, an alkoxy group, an amido group, a ureido group, an alkoxycarbonylamino group, a sulfonamido group, a carbamoyl group, a sulfamoyl group, an alkoxycarbonyl group and an ionic hydrophilic group are preferred. A halogen atom, an alkyl group and an alkoxy group are particularly preferred, and a halogen atom is most preferred.

Each group represented by $Z_1$ and $Z_2$ has the same meaning as each group defined for $R_1$, $R_2$, $R_3$, $R_4$, $R_5$, R6 and Y, and preferred embodiments thereof are also same as those described for $R_1$, $R_2$, $R_3$, $R_4$, $R_5$, $R_6$ and Y.

Of the azo dyes represented by formula (A-I), an azo dye having a structure represented by formula (A-II) shown below is preferred. The azo dye represented by formula (A-II) for use in the present invention will be described in greater detail below.

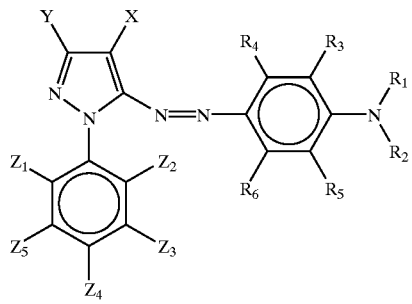

(A-II)

In formula (A-II), X, Y, $Z_1$, $Z_2$, $R_1$, $R_2$, $R_3$, $R_4$, $R_5$ and $R_6$ have the same meanings as X, Y, $Z_1$, $Z_2$, $R_1$, $R_2$, $R_3$, $R_4$, $R_5$ and $R_6$ defined in formula (A-I) above, respectively and preferred embodiments thereof are also same as those described for X, Y, $Z_1$, $Z_2$, $R_1$, $R_2$, $R_3$, $R_4$, $R_5$ and $R_6$.

In formula (A-II), $Z_3$, $Z_4$ and $Z_5$, which may be the same or different, each represents a hydrogen atom, a halogen atom, an alkyl group, a cycloalkyl group, an aralkyl group, an aryl group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, sulfinyl group, a phosphoryl group, an acyl group or an ionic hydrophilic group.

Of these groups, a hydrogen atom, a halogen atom, an alkyl group, an aryl group, a cyano group, an alkoxy group, an amido group, a ureido group, an alkoxycarbonylamino group, a sulfonamido group, a carbamoyl group, a sulfamoyl group, an alkoxycarbonyl group and an ionic hydrophilic group are particularly preferred.

Specific examples of the groups represented by $Z_3$, $Z_4$ and $Z_5$ include those described for $R_1$, $R_2$, $R_3$, $R_4$, $R_5$, $R_6$ and Y in formula (A-I) above.

More preferred groups for $Z_3$ and $Z_5$ include a hydrogen atom, a halogen atom and an alkyl group, and a hydrogen atom is particularly preferred.

More preferred groups for $Z_4$ include a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group and an ionic hydrophilic group. A hydrogen atom, an alkyl group and an ionic hydrophilic group are particularly preferred, and an ionic hydrophilic group is most preferred.

With respect to combinations of particularly referred substituents in the azo dye represented by formula (A-II) for use in the present invention, X represents preferably a cyano group, an alkylsulfonyl group having from 1 to 12 carbon atoms or an arylsulfonyl group having from 6 to 18 carbon atoms and particularly preferably a cyano group, Y represents preferably a hydrogen atom, an alkyl group or an aryl group and particularly preferably a hydrogen atom, $R_1$ and $R_2$ each represents preferably an alkyl group (which may have an ionic hydrophilic group as a substituent) or an aryl group (which may have an ionic hydrophilic group as a substituent), $R_3$, $R_4$ and $R_5$ each represents preferably a hydrogen atom, $R_6$ represents preferably an amido group (which may have an ionic hydrophilic group as a substituent), $Z_1$ and $Z_2$ each represents preferably a halogen atom or an alkyl group, $Z_3$ and $Z_5$ each represents preferably a hydrogen atom, a halogen atom or an alkyl group and particularly preferably a hydrogen atom, and $Z_4$ represents preferably a hydrogen atom, a halogen atom, a sulfonamido group, a carbamoyl group, a sulfamoyl group, an alkoxycarbonyl group or an ionic hydrophilic group and particularly preferably an ionic hydrophilic group.

Regarding the combinations of particularly referred substituents in the azo dye represented by formula (A-II) for use in the present invention described above, the azo dye compounds wherein at least one of the various substituents represents one of the preferred groups described above are preferred, those wherein more of the various substituents represent the preferred groups described above are more preferred, and those wherein all of the various substituents represent the preferred groups described above are most preferred.

It is required that at least one of $R_1$, $R_2$, $R_3$, $R_4$, $R_5$, $R_6$, X, Y, $Z_1$, $Z_2$ and A in formula (A-I) describe above or at least one of $R_1$, $R_2$, $R_3$, $R_4$, $R_5$, $R_6$, X, Y, $Z_1$, $Z_2$, $Z_3$, $Z_4$ and $Z_5$ in formula (A-II) represents an ionic hydrophilic group or has an ionic hydrophilic group as a substituent. Since the azo dye represented by formula (A-I) or (A-II) has at last one ionic hydrophilic group in the molecule thereof, its solubility or dispersibility in an aqueous medium is good. The ionic hydrophilic group for $R_1$, $R_2$, $R_3$, $R_4$, $R_5$, $R_6$, X, Y, $Z_1$, $Z_2$, $Z_3$, $Z_4$ or $Z_5$ includes a sulfo group, a carboxy group and a quaternary ammonium group. Of the ionic hydrophilic groups, a sulfo group and a carboxy group are preferred, and a sulfo group is particularly preferred. The carboxy group and sulfo group may be the form of a salt and examples of a counter ion for forming the salt include an alkali metalion (e.g., sodium ion or potassium ion) and an organic cation (e.g., tetramethylguanidinium ion).

Of the azo dyes represented by formula (A-II), an azo dye having a structure represented by formula (A-III) shown below is more preferred.

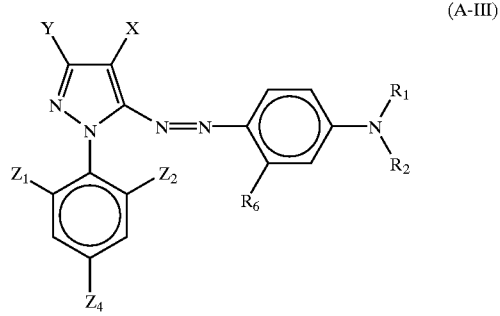

(A-III)

In formula (A-III), X, Y, $Z_1$, $Z_2$, $Z_4$, $R_1$, $R_2$ and $R_6$ have the same meanings as X, Y, $Z_1$, $Z_2$, $Z_4$, $R_1$, $R_2$ and $R_6$ defined in formula (A-II) above, respectively and preferred embodiments thereof are also same as those described for X, Y, $Z_1$, $Z_2$, $Z_4$, $R_1$, $R_2$ and $R_6$.

With respect to combinations of particularly referred substituents in the azo dye represented by formula (A-III) described above, X represents preferably a cyano group, an alkylsulfonyl group having from 1 to 12 carbon atoms or an arylsulfonyl group having from 6 to 18 carbon atoms and particularly preferably a cyano group, Y represents preferably a hydrogen atom, an alkyl group or an aryl group and particularly preferably a hydrogen atom, $R_1$ and $R_2$ each represents preferably an alkyl group (which may have an ionic hydrophilic group as a substituent) or an aryl group (which may have an ionic hydrophilic group as a substituent), $R_6$ represents preferably an amido group (which may have an ionic hydrophilic group as a substituent), $Z_1$ and $Z_2$ each represents preferably a halogen atom or an alkyl group, and $Z_4$ represents preferably a hydrogen atom, a halogen atom, a sulfonamido group, a carbamoyl group, a sulfamoyl group, an alkoxycarbonyl group or an ionic hydrophilic group and particularly preferably an ionic hydrophilic group.

Regarding the combinations of particularly referred substituents in the azo dye represented by formula (A-III) described above, the azo dye compounds wherein at least one of the various substituents represents one of the preferred groups described above are preferred, those wherein more of the various substituents represent the preferred groups described above are more preferred, and those wherein all of the various substituents represent the preferred groups described above are most preferred.

Specific examples of the azo dye represented by formula (A-I) or (A-II) are set forth as (101) to (143) below, but the present invention should not be construed as being limited thereto.

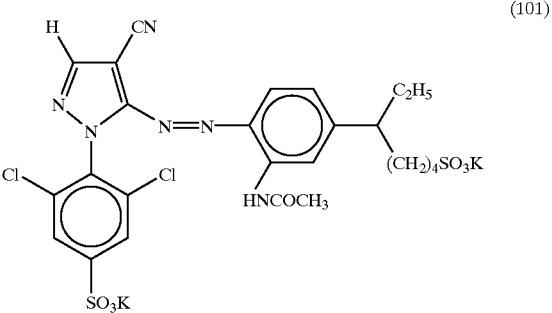

(101)

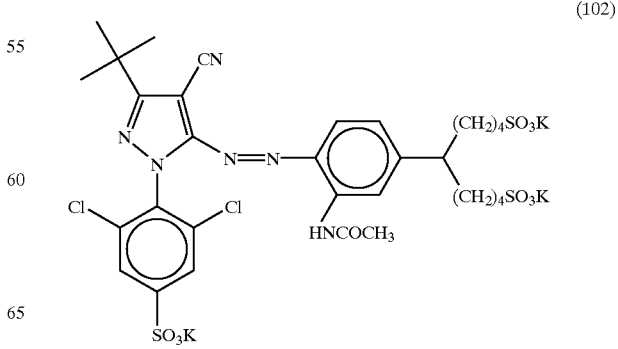

(102)

(103) 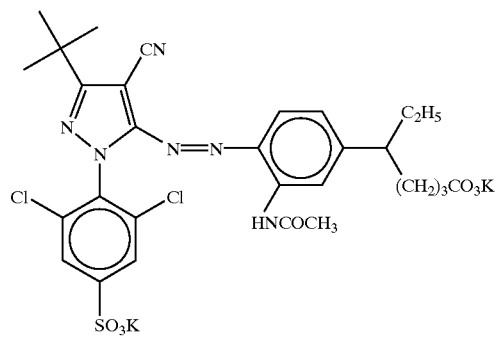
(104) 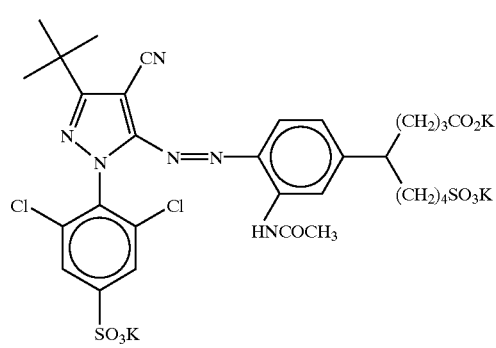
(105) 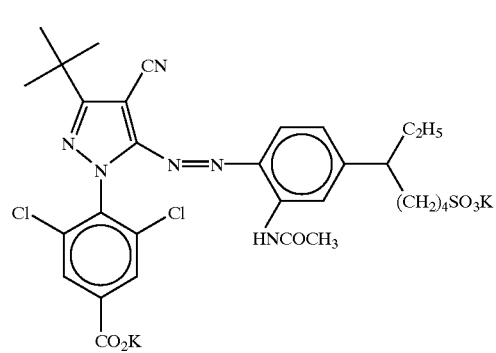
(106) 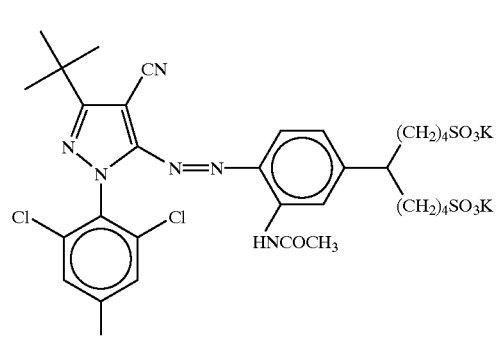
(107) 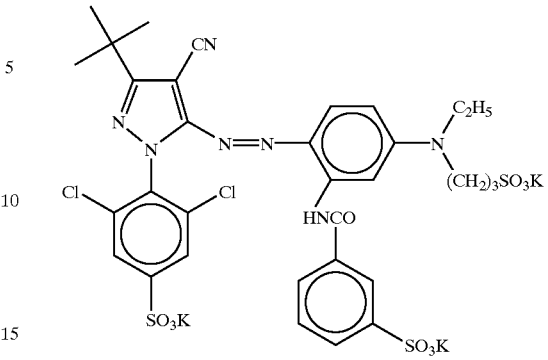
(108) 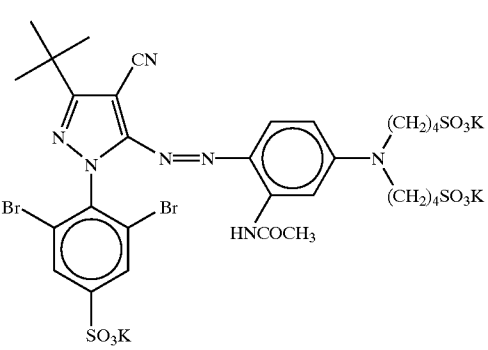
(109) 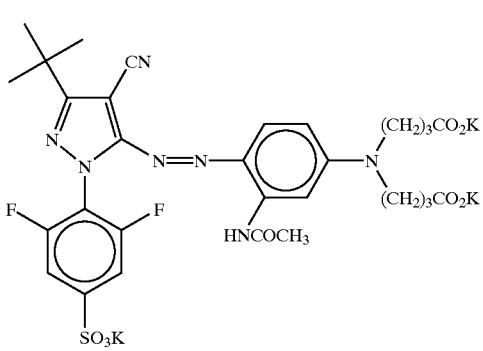
(110) 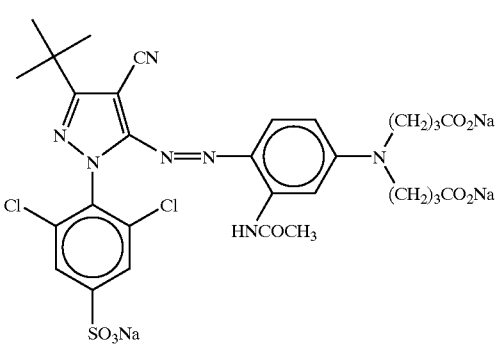

-continued
(111)
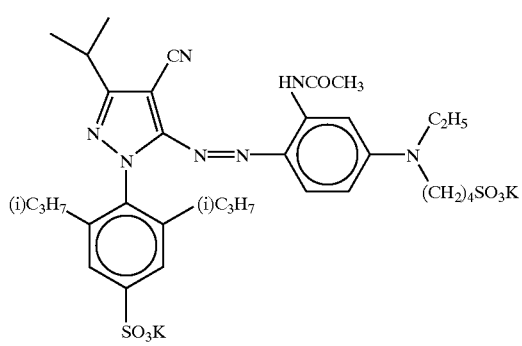
(112)
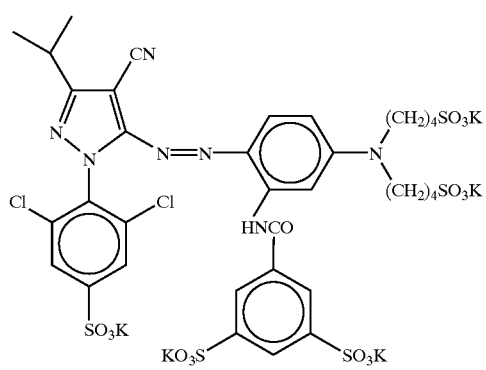
(113)
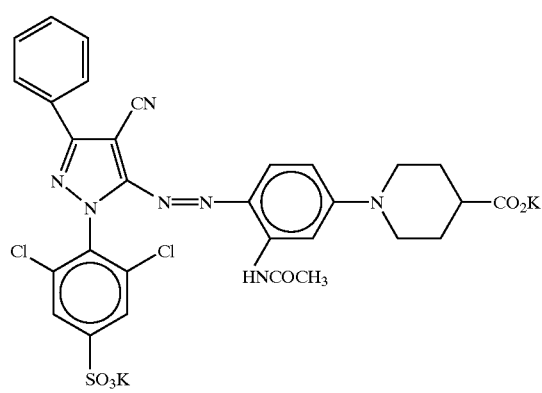
(114)
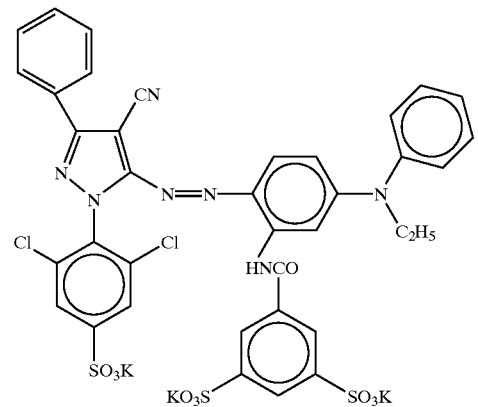
-continued
(115)
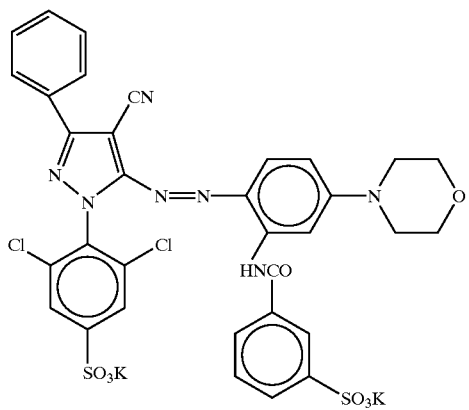
(116)
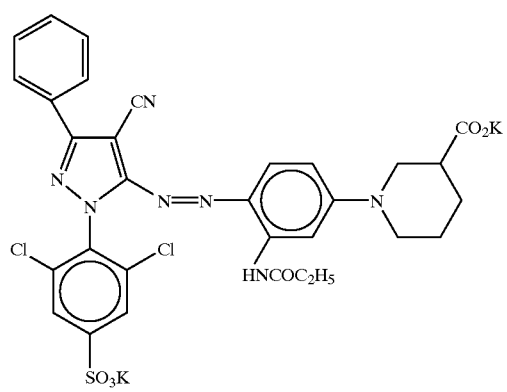
(117)
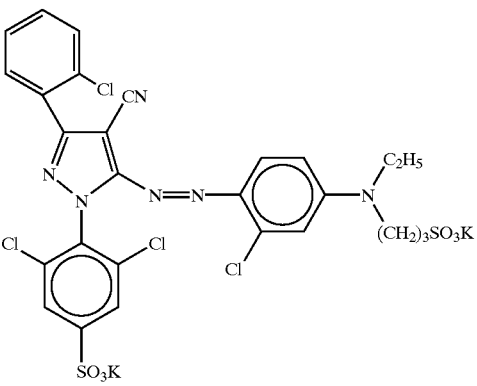
(118)
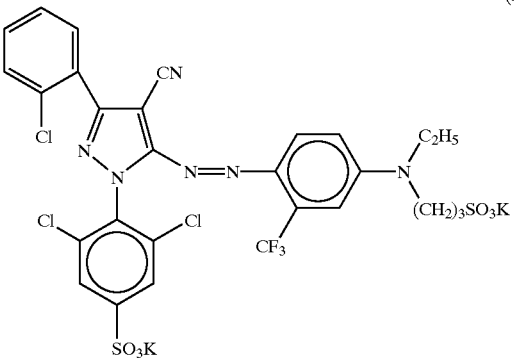

-continued
(119)
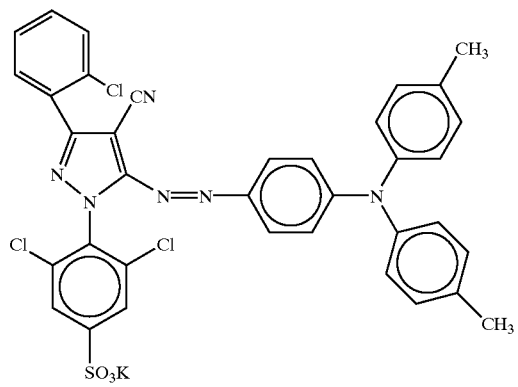
(120)
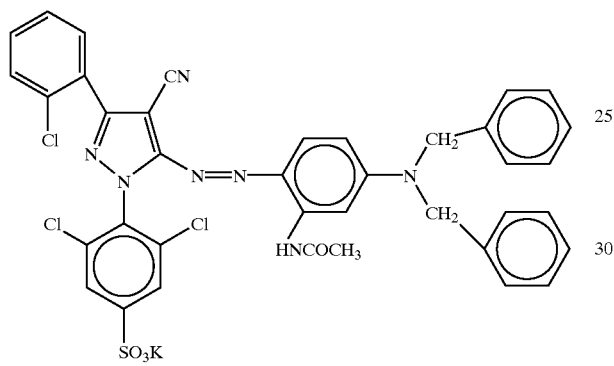
(121)
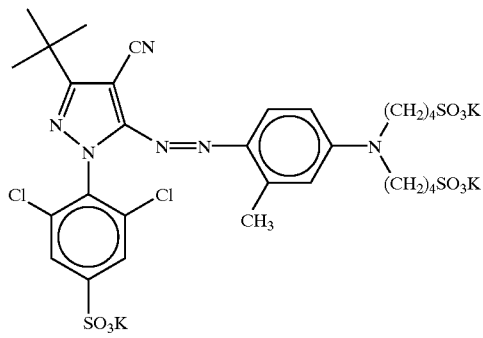
(122)
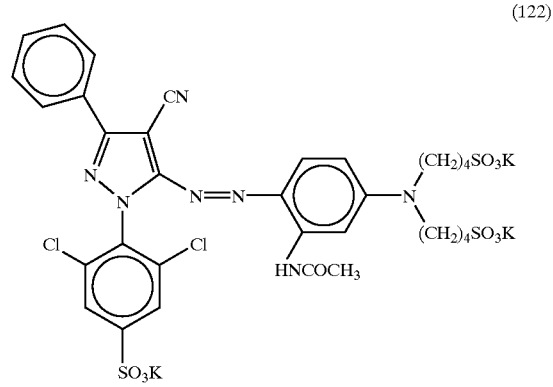
-continued
(123)
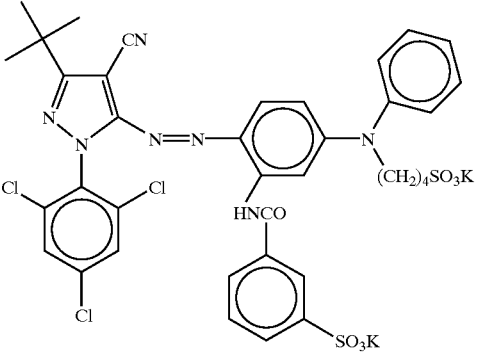
(124)
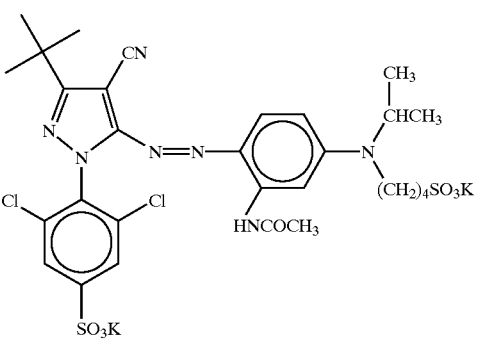
(125)
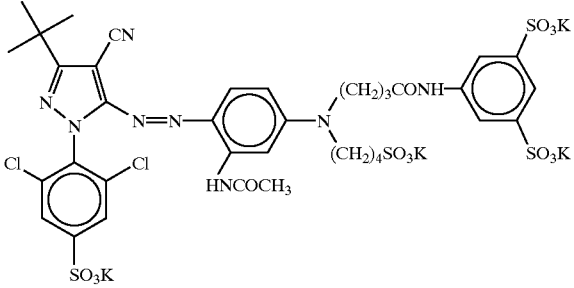
(126)
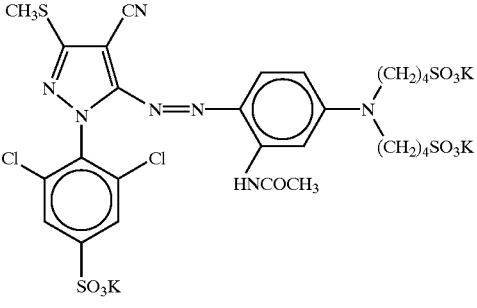

(127)
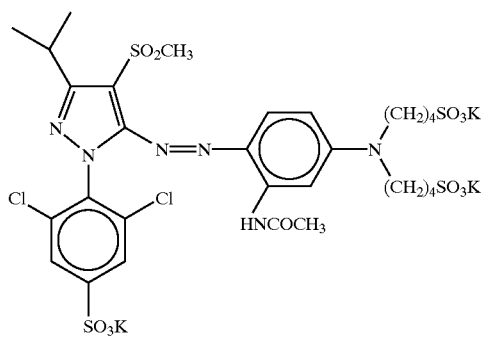
(128)
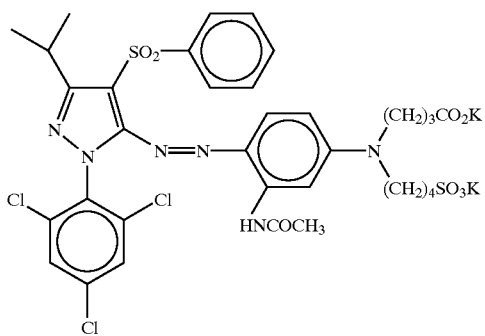
(129)
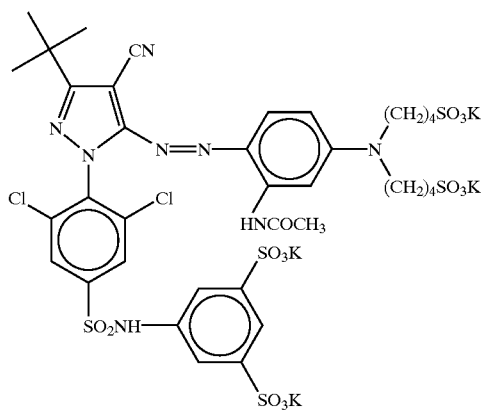
(130)
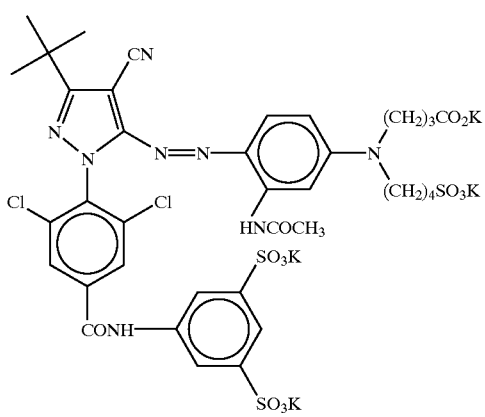
(131)
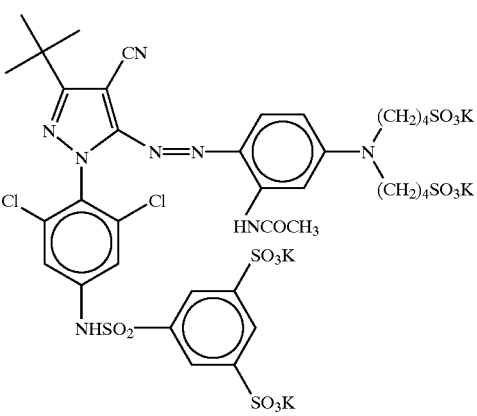
(132)
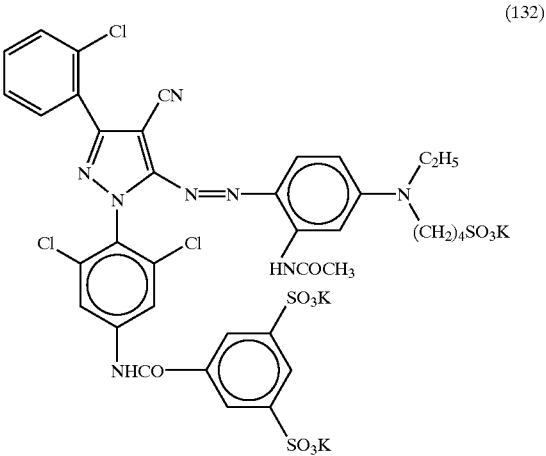
(133)
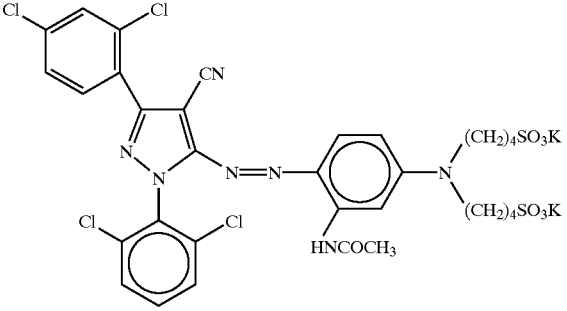
(134)
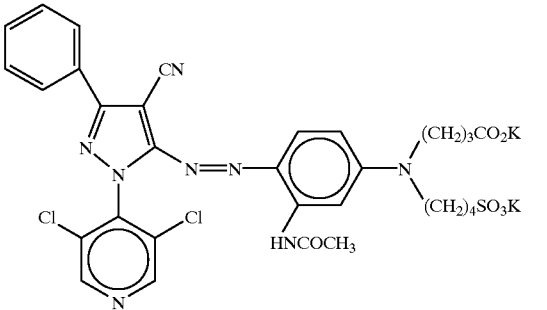

(135)
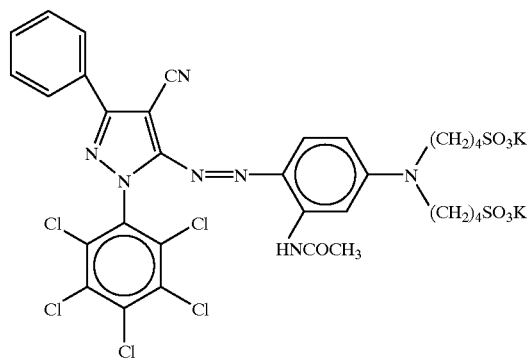
(136)
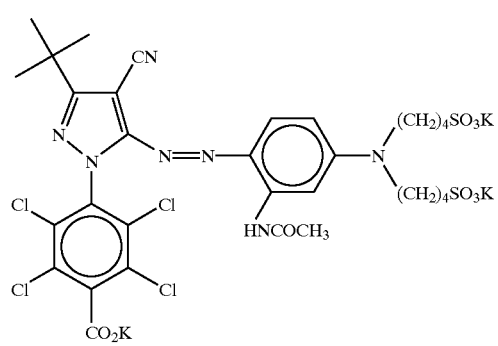
(137)
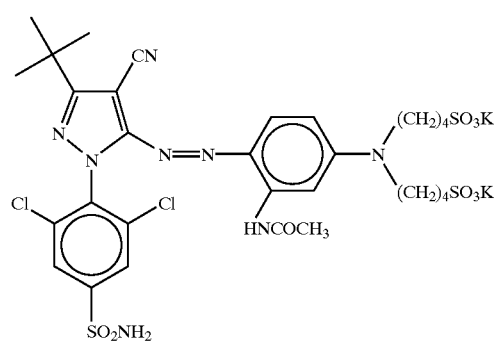
(138)
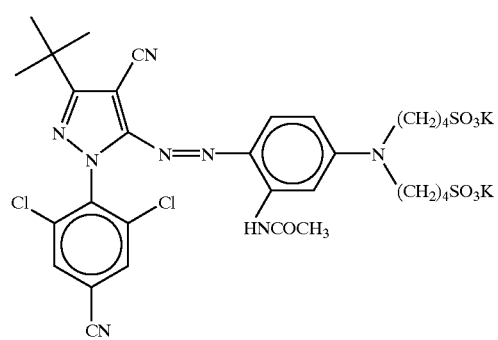
(139)
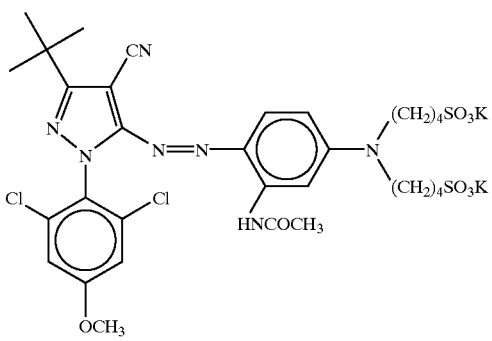
(140)
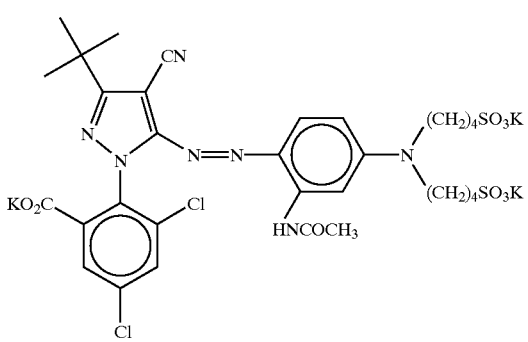
(141)
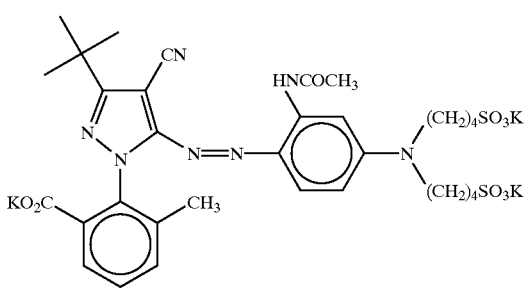
(142)
(143)
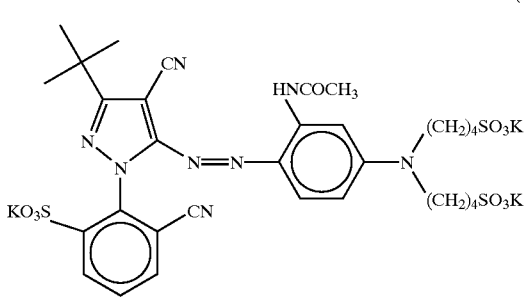

Oil-soluble Dye

The ink jet recording ink composition for use in the present invention can be prepared by dissolving an oil-soluble dye in a high-boiling point organic solvent and dispersing the resulting solution in an aqueous medium. The term "aqueous medium" used in the present invention means and includes water, a mixture of water and a small amount of water-soluble organic solvent and those containing one or more additives, for example, a wetting agent, a stabilizer and an antiseptic, if desired.

Examples of the oil-soluble dye include yellow dyes, magenta dyes and cyan dyes and solubility thereof in water is not particularly restricted.

Particularly preferred oil-soluble dyes include azo dyes and azomethine dyes represented by formula (B-I) or (B-II) shown below. The dyes represented by formula (B-II) are known as dyes which are formed from color couplers and developing agents upon oxidation in photographic materials.

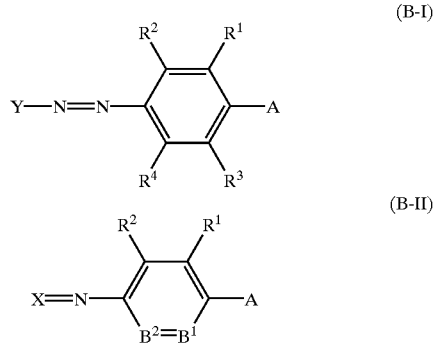

In formulas (B-I) and (B-II), $R^1$, $R^2$, $R^3$ and $R^4$, which may be the same or different, each represents a hydrogen atom, a halogen atom, an aliphatic group, an aromatic group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, sulfinyl group, a phosphoryl group, an acyl group, a carboxy group or asulfo group. A represents —$NR^5R^6$ or a hydroxy group, and $R^5$ and $R^6$, which may be the same or different, each represents a hydrogen atom, an aliphatic group, an aromatic group or a heterocyclic group, or $R^5$ and $R^6$ may combine with each other to form a ring together with the nitrogen atom. It is preferred that A represents —$NR^5R^6$. $B^1$ represents =$C(R^3)$— or =N—, and $B^2$ represents —$C(R^4)$= or —N=. It is preferred that both $B^1$ and $B^2$ do not represent —N= at the same time. It is more preferred that $B^1$ represents =$C(R^3)$— and $B^2$ represents —$C(R^4)$=. $R^1$ and $R^5$, $R^3$ and $R^6$ and/or $R^1$ and $R^2$ may combine with each other to form an aromatic ring or a heterocyclic ring. X represents a photographic color coupler residue, and Y represents an unsaturated heterocyclic group.

In the formulae above, $R^5$ and $R^6$, which may be the same or different, each represents preferably a hydrogen atom, an aliphatic group, an aromatic group or a heterocyclic group, more preferably a hydrogen atom, an alkyl group, a substituted alkyl group, an aryl group or a substituted aryl group and still more preferably a hydrogen atom, an alkyl group having from 1 to 18 carbon atoms or a substituted alkyl group having from 1 to 18 carbon atoms.

$R^2$ represents preferably a hydrogen atom, a halogen atom, an aliphatic group, an alkoxy group, an aryloxy group, an amido group, a ureido group, a sulfamoylamino group, an alkoxycarbonylamino group or a sulfonamido group.

In the specification, the term "aliphatic group" means and includes an alkyl group, a substituted alkyl group, an alkenyl group, a substituted alkenyl group, an alkynyl group, a substituted alkynyl group, an aralkyl group and a substituted aralkyl group.

The aliphatic group may be branched or may form a ring. A number of carbon atoms included in the aliphatic group is preferably from 1 to 20, more preferably from 1 to 18. The aryl portion of the aralkyl group or substituted aralkyl group is preferably a phenyl group or a naphthyl group, particularly preferably a phenyl group.

Examples of the substituent for the alkyl moiety in the substituted alkyl group, substituted alkenyl group, substituted alkynyl group or substituted aralkyl group include those defined for $R^1$, $R^2$, $R^3$ and $R^4$ above.

Examples of the substituent for the aryl moiety in the substituted aralkyl group include those recited for the substituted aryl group described below.

In the specification, the term "aromatic group" means and includes an aryl group and a substituted aryl group. The aryl group is preferably a phenyl group or a naphthyl group, particularly preferably a phenyl group.

The aryl moiety in the substituted aryl group is same as the aryl group described above.

Examples of the substituent for the substituted aryl group include those defined for $R^1$, $R^2$, $R^3$ and $R^4$ above.

The unsaturated heterocyclic group represented by Y in formula (B-I) is preferably a group derived from a 5-membered or 6-membered unsaturated heterocyclic ring. The heterocyclic ring may have an aliphatic ring, aromatic ring or heterocyclic ring condensed thereto. Examples of the hetero atom include a nitrogen atom, an oxygen atom and a sulfur atom. Examples of a saturated heterocyclic ring include a pyrrolidine ring and a morpholine ring. Examples of the unsaturated heterocyclic ring include a pyrazole ring, an imidazole ring, a thiazole ring, an isothiazole ring, a thiadiazole ring, a thiophene ring, a benzothiazole ring, a benzoxazole ring, a benzisothiazole ring, a pyrimidine ring, a pyridine ring and quinoline ring.

The heterocyclic group may have one or more substituents defined for $R^1$, $R^2$, $R^3$ and $R^4$ above.

The photographic color coupler residue represented by X in formula (B-II) preferably includes those derived from the following color couplers:

<Yellow Coupler>

Couplers described in U.S. Pat. Nos. 3,933,501, 4,022, 620, 4,326,024, 4,401,752 and 4,248,961, JP-B-58-10739 (the term "JP-B" as used herein means an "examined Japanese patent publication"), British Patents 1,425,020 and 1,476,760, U.S. Pat. Nos. 3,973,968, 4,314,023 and 4,511, 649 and European Patent 249,473A, couplers represented by formulas (I) and (II) of European Patent 502,424A, couplers represented by formulas (1) and (2) of European Patent 513,496A (particularly Y-28 on page 18), couplers represented by formula (I) in Claim 1 of European Patent 568, 037A, couplers represented by formula (I) in column 1, lines 45 to 55 of U.S. Pat. No. 5,066,576, couplers represented by formula (I) in paragraph 0008 of JP-A-4-274425, couplers described in Claim 1 on page 40 of European Patent 498, 381A1 (particularly Coupler D-35 on page 18), couplers represented by formula (Y) on Page 4 of European Patent 447,969A1 (particularly Coupler Y-1 on page 17 and Coupler Y-54 on page 41), and couplers represented by formulas (II) to (IV) in column 7, lines 36 to 58 of U.S. Pat. No. 4,476,219 (particularly Coupler II-17 and II-19 in column 17 and Coupler II-24 in column 19.

<Magenta Coupler>

Couplers described in U.S. Pat. Nos. 4,310,619 and 4,351,897, European Patent 73,626, U.S. Pat. Nos. 3,061,432 and 3,725,067, Research Disclosure, No. 24220 (June 1984), ibid., No. 24230 (June 1984), JP-A-60-33552, JP-A-60-43659, JP-A-61-72238, JP-A-60-35730, JP-A-55-118034, JP-A-60-185951, U.S. Pat. Nos. 4,500,630, 4,540,654 and 4,556,630 and WO88/04795, Coupler L-57 in right lower column on page 11, Coupler L-68 in right lower column on page 12 and Coupler L-77 in right lower column on page 13 of JP-A-3-39737, Coupler [A-4]-63 on page 134 and Couplers [A-4]-73 and [A-4]-75 on page 139 of European Patent 456,257, Couplers M-4 and M-6 on page 26 and Coupler M-7 on page 27 of European Patent 486,965, Coupler M-45 on page 19 of European Patent 571,959A, Coupler (M-1) on page 6 of JP-A-5-204106, Coupler M-22 in paragraph 0237 of JP-A-4-362631, and couplers described in U.S. Pat. Nos. 3,061,432 and 3,725,067.

<Cyan Coupler>

Couplers described in U.S. Pat. Nos. 4,052,212, 4,146,396, 4,228,233 and 4,296,200 and European Patent 73,636, Couplers CX-1, -3, -4, -5, -11, -12, -14 and -15 on pages 14 to 16 of JP-A-4-204843, Couplers C-7 and C-10 on page 35, Couplers C-34 and C-35 on page 37, Couplers (I-1) and (I-17) on pages 42 to 43 of JP-A-4-43345, and couplers represented by formulas (Ia) and (Ib) in Claim 1 of JP-A-6-67385.

In addition, couplers described on page 91 of JP-A-62-215272, on pages 3 and 30 of JP-A-2-33144 and on pages 4, 5, 45 and 47 of European Patent 355,660A are useful.

Of the dyes represented by formula (B-I), those represented by formula (B-III) shown below are particularly preferably used as magenta dyes.

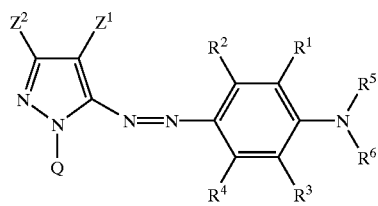

(B-III)

In formula (B-III), $Z^1$ represents an electron attractive group having a Hammett's substituent constant σp value of not less than 0.20. $Z^1$ preferably represents an electron attractive group having a Hammett's substituent constant σp value of from 0.30 to 1.0. Specific examples of the electron attractive group include electron attractive substituents described hereinafter. Among them, an acyl group having from 2 to 12 carbon atoms, an alkyloxycarbonyl group having from 2 to 12 carbon atoms, a nitro group, a cyano group, an alkylsulfonyl group having from 1 to 12 carbon atoms, an arylsulfonyl group having from 6 to 18 carbon atoms, a carbamoyl group having from 1 to 12 carbon atoms and a halogenated alkyl group having from 1 to 12 carbon atoms are preferred. Particularly, a cyano group, an alkylsulfonyl group having from 1 to 12 carbon atoms and an arylsulfonyl group having from 6 to 18 carbon atoms are preferred. Most preferably, $Z^1$ represents a cyano group.

$R^1$ to $R^6$ in formula (B-III) above each has the same meaning as defined in formula (B-I). $Z^2$ represents a hydrogen atom, an aliphatic group or an aromatic group. Q represents a hydrogen atom, an aliphatic group, an aromatic group or a heterocyclic group. Q preferably represents a group composed of non-metallic atoms necessary to form a 5-membered to 8-membered ring. Of these rings, an aromatic ring and a heterocyclic ring are more preferred. The 5-membered to 8-membered ring may be substituted and may be a saturated rind or have an unsaturated bond. Preferred examples of the non-metallic atom include a nitrogen atom, an oxygen atom, a sulfur atom and a carbon atom. Specific examples of the ring structure includes a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benzimidazole ring, an oxazole ring, a benzoxazole ring, an oxane ring, a sulfolane ring and a thiane ring. When such a ring further has a substituent, examples of the substituent include the groups defined for $R^1$ to $R^4$ described above.

Preferred examples of the dye structure represented by formula (B-III) are described in Japanese Patent Application No. 2000-80733.

Of the dyes represented by formula (B-I), those represented by formula (B-IV) shown below are also particularly preferably used as magenta dyes.

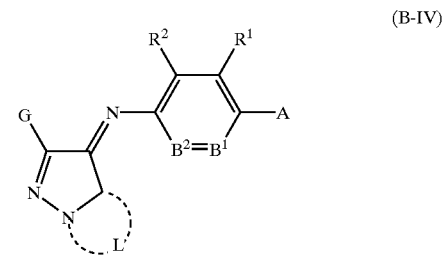

(B-IV)

In formula (B-IV), G represents a hydrogen atom, an aliphatic group, an aromatic group, a heterocyclic group, a cyano group, an alkoxy group, an aryloxy group, an alkylthio group, an arylthio group, an ester group, an amino group, a carbamoyl group, a sulfonyl group, a sulfamoyl group, a ureido group, a urethane group, an acyl group, an amido group or a sulfonamido group. $R^1$, $R^2$, A, $B^1$ and $B^2$ in formula (B-IV) each has the same meaning as defined in formula (B-II) and preferred embodiments of these groups are also same as those described above. L represents an atomic group necessary for forming a 5-membered or 6-membered nitrogen-containing heterocyclic ring which may be substituted with one or more substituents selected from an aliphatic group, an aromatic group, a heterocyclic group, a cyano group, an alkoxy group, an aryloxy group, an alkylthio group, an arylthio group, an ester group, an amino group, a carbamoyl group, a sulfonyl group, a sulfamoyl group, a ureido group, a urethane group, an acyl group, an amido group or a sulfonamido group. The heterocyclic ring may form a condensed ring together with another ring.

Of the compounds represented by formula (B-IV), A preferably represents —$NR^5R^6$, and L preferably represents an atomic group necessary for forming a 5-membered nitrogen-containing heterocyclic ring. Examples of the 5-membered nitrogen-containing heterocyclic ring include an imidazole ring, a triazole ring and a tetraxole ring.

Specific examples of the magenta dye represented by formula (B-I) or (B-II) are set forth below but the present invention should not be construed as being limited thereto.

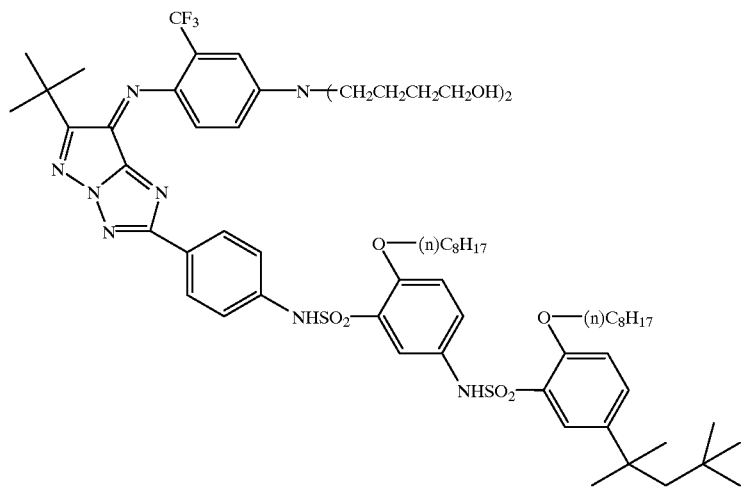
(M-1)
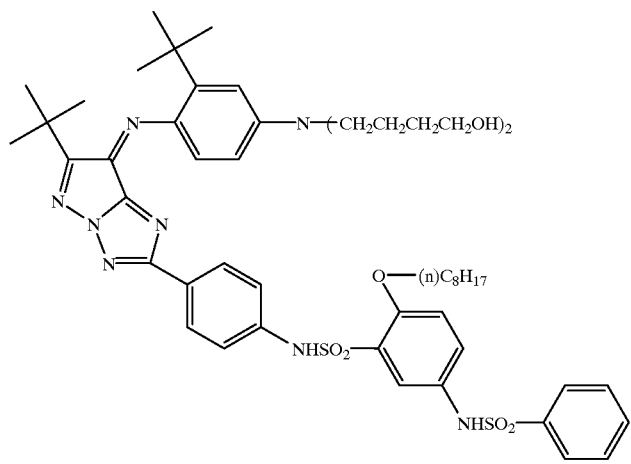
(M-2)
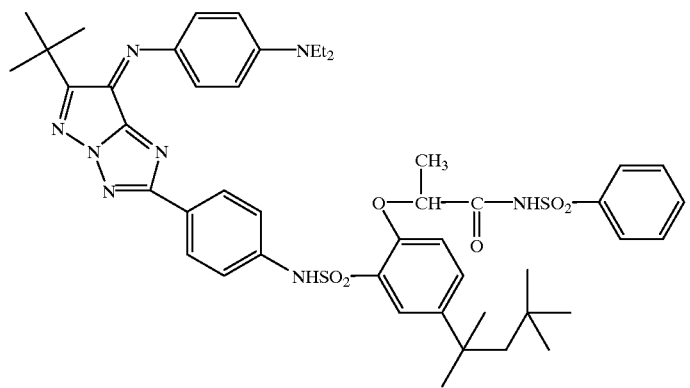
(M-3)

-continued
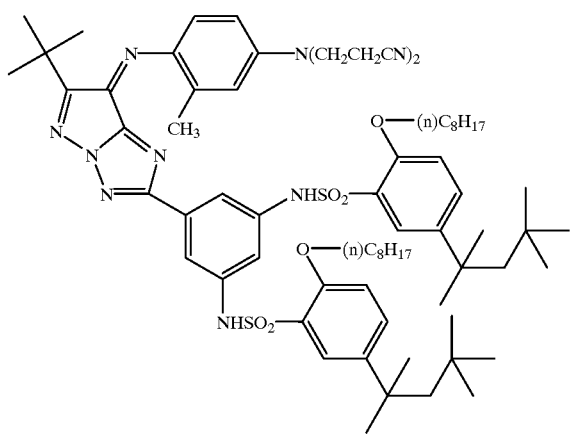
(M-4)
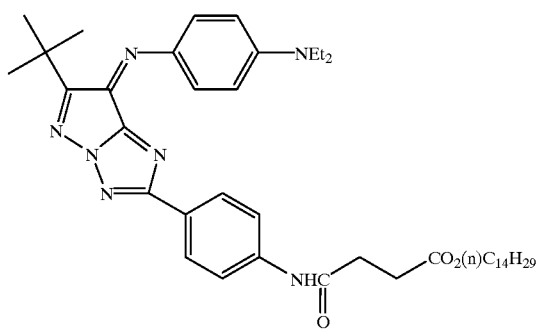
(M-5)
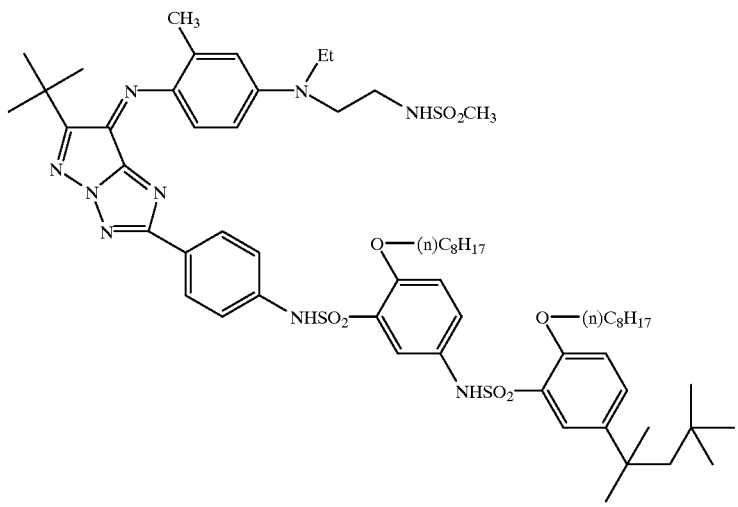
(M-6)

-continued
(M-7)
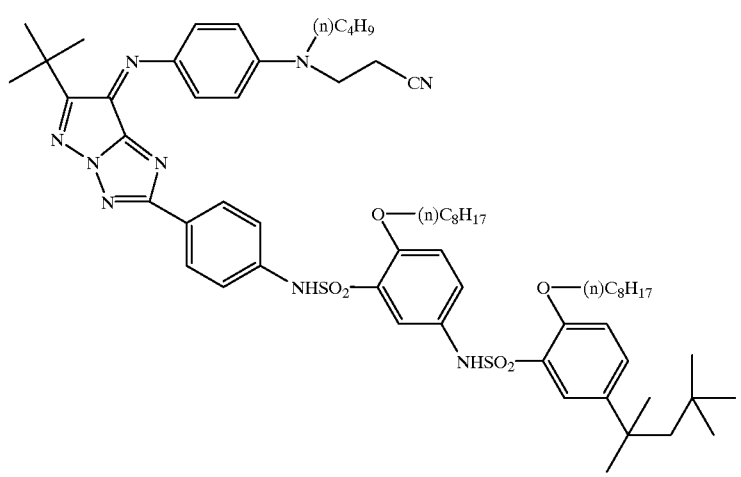
(M-8)
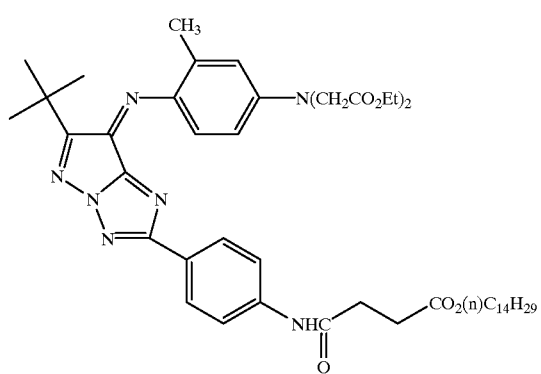
(M-9)
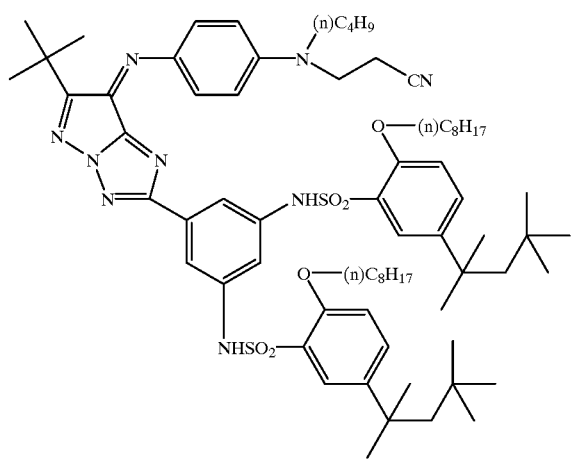

(M-10)
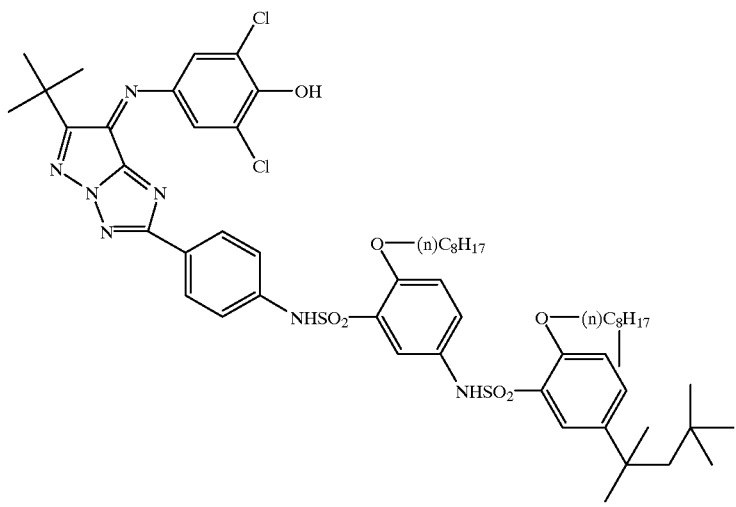
(M-11)
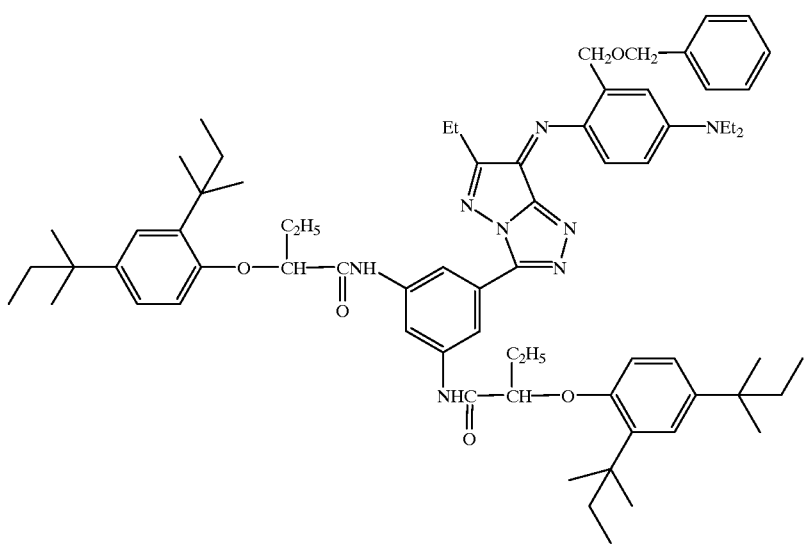
(M-12)
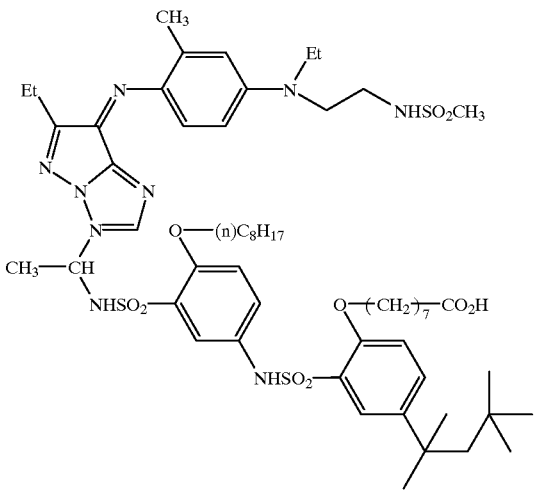

(M-13)
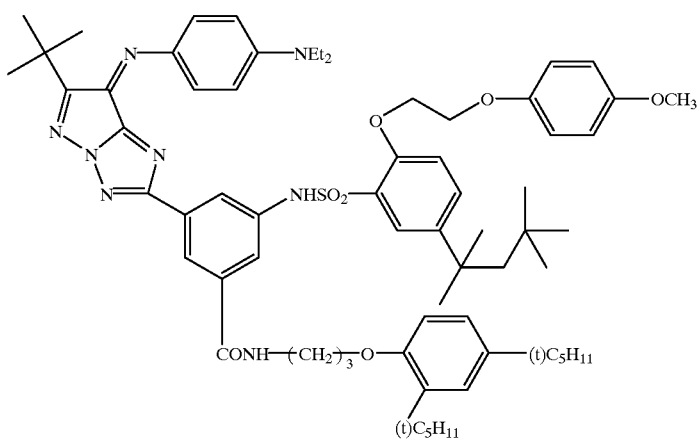
(M-14)
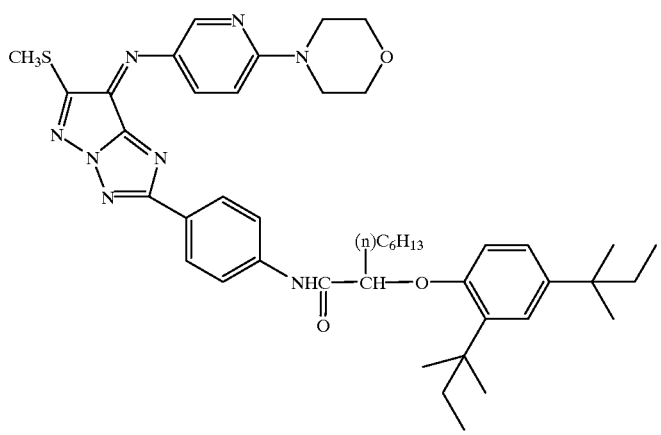
(M-15)
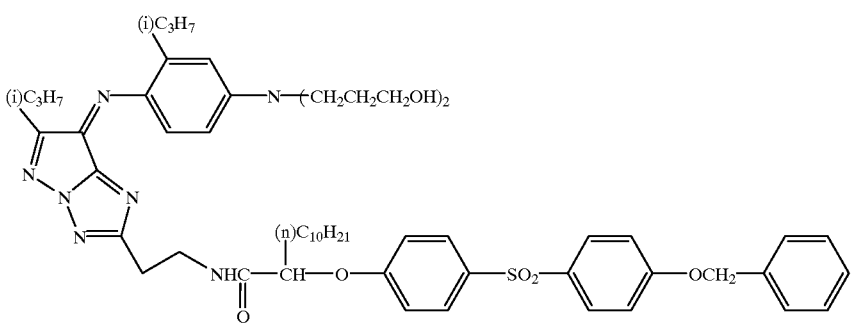
(M-16)
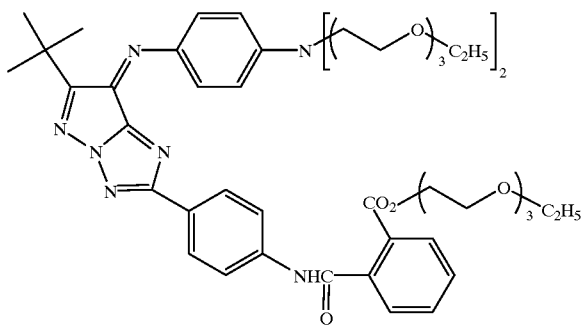

-continued
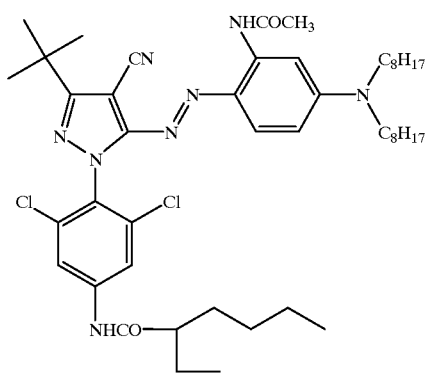
(M-17)
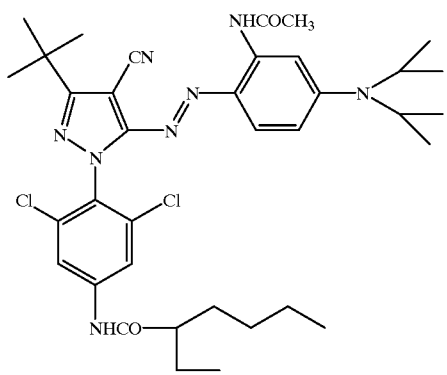
(M-18)
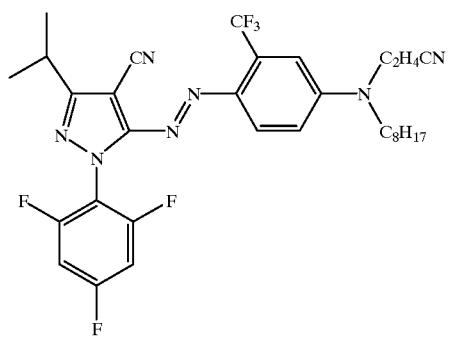
(M-19)
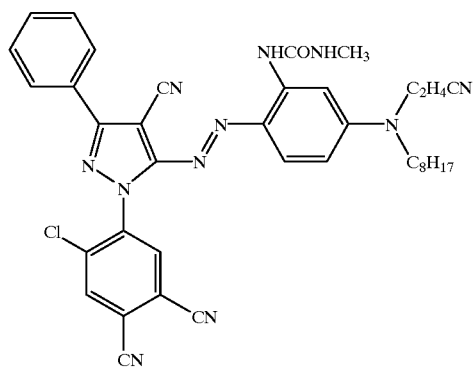
(M-20)

-continued
(M-21)
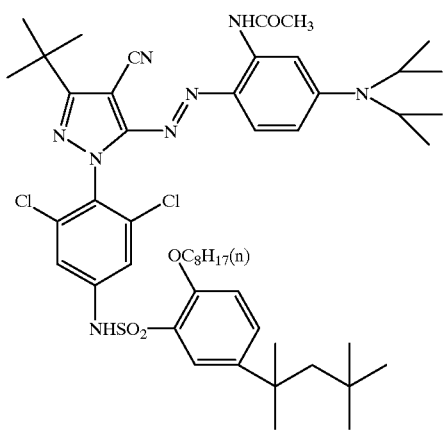
(M-22)
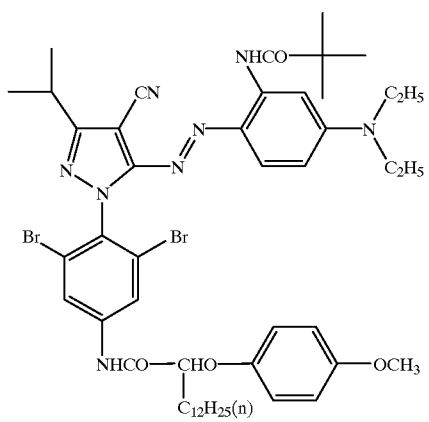
(M-23)
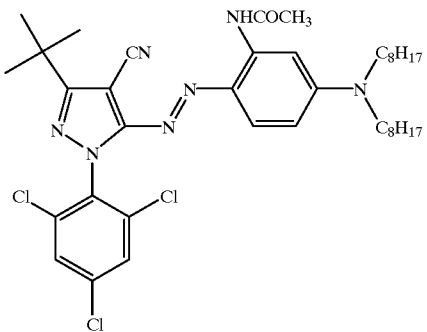
(M-24)
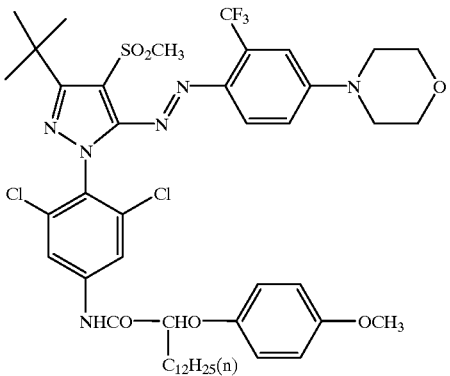

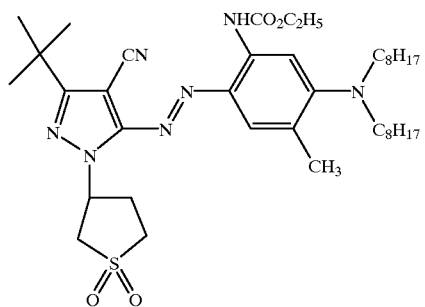
(M-25)
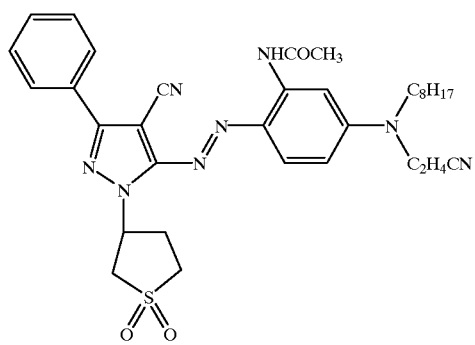
(M-26)
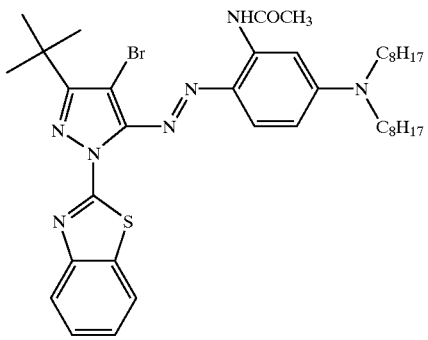
(M-27)
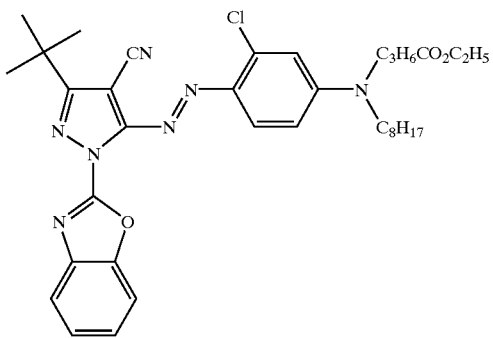
(M-28)

-continued
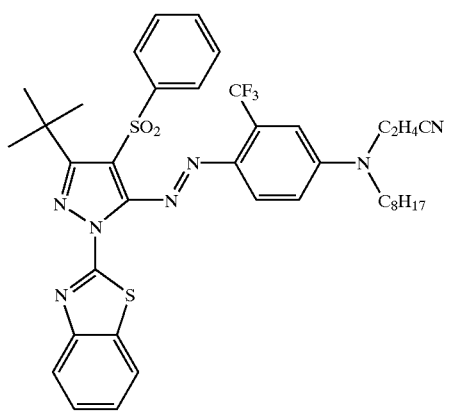
(M-29)
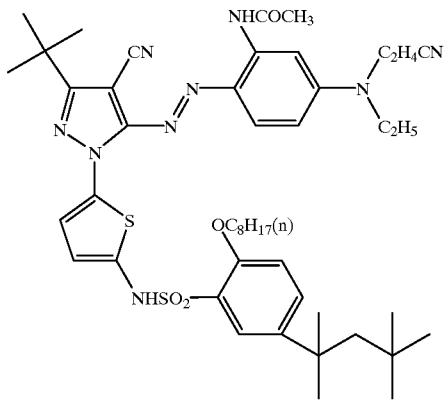
(M-30)
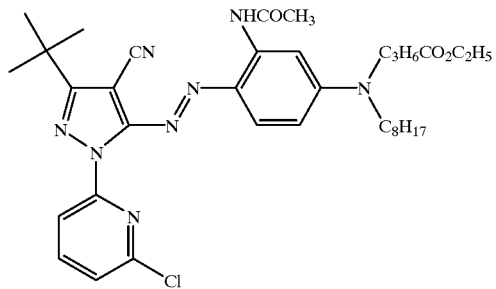
(M-31)
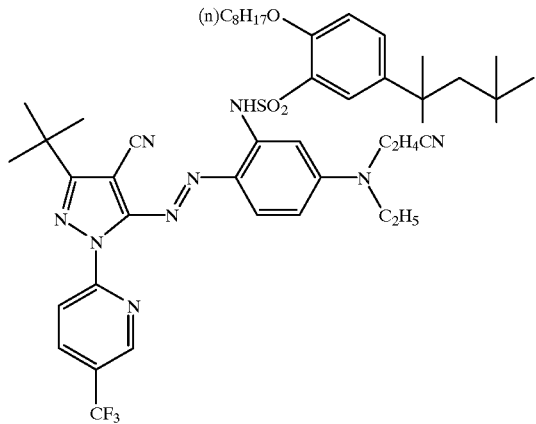
(M-32)

(M-33)
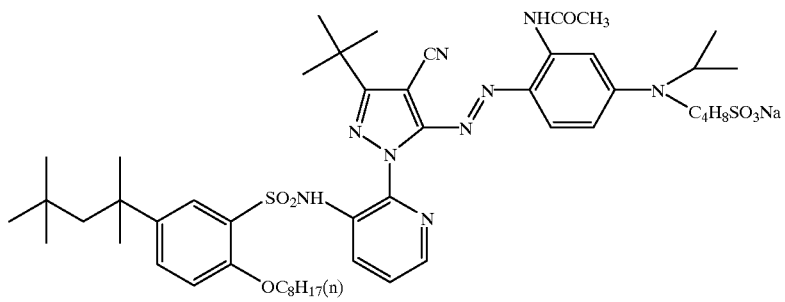
(M-34)
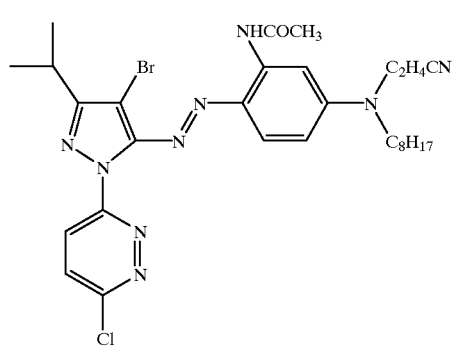
(M-35)
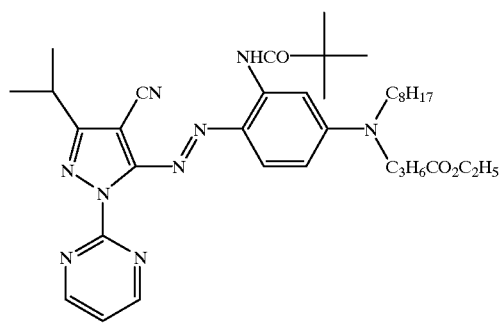
(M-36)
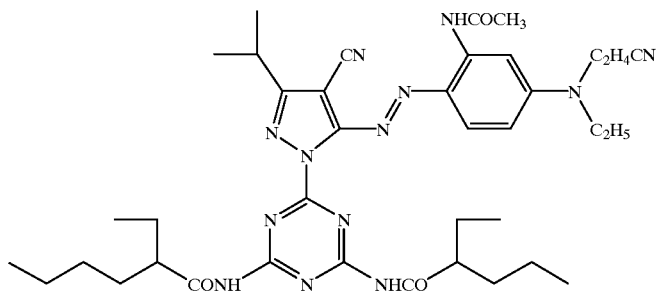

-continued (M-37)

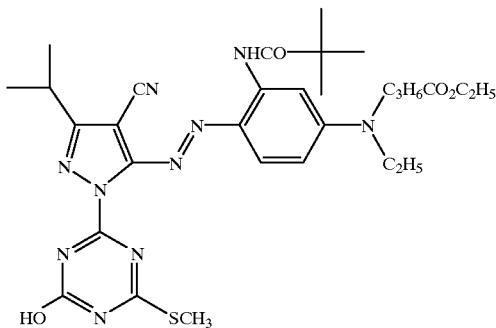

(M-38)

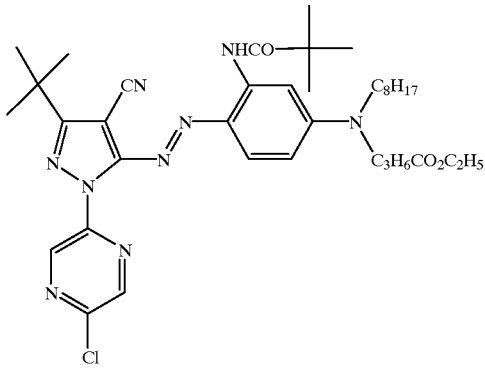

Other examples of the magenta dye for use in the present invention are described in Japanese Patent Application Nos. 11-365187, 11-365190 and 2000-80733, but the present invention should not be construed as being limited thereto.

The dye represented by formula (B-III) can be synthesized with reference to the methods described, for example, in Japanese Patent Application No. 2000-80733 and JP-A-55-161856.

The dye represented by formula (B-IV) can be synthesized with reference to the methods described, for example, in JP-A-4-126772, JP-B-7-94180 and Japanese Patent Application No. 11-365187.

Of the dyes represented by formula (B-II), pyrrolotriazole azomethine dyes represented by formula (B-V) shown below are particularly preferably used as cyan dyes.

(B-V)

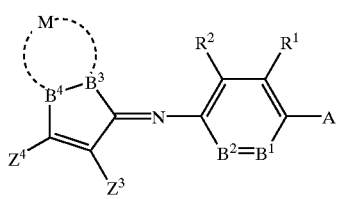

In formula (B-V), A, $R^1$, $R^2$, $B^1$ and $B^2$ each has the same meaning as defined in formula (B-II) and preferred embodiments of these groups are also same as those described above. $Z^3$ and $Z^4$, which may be the same or different, each has the same meaning as defined for G in formula (B-IV), or $Z^3$ and $Z^4$ may combine with each other to form a ring structure. M represents an atomic group necessary for forming a 1,2,4-triazole ring condensed to the 5-membered ring in formula (B-V), and one of two atoms of the condensation portion represented by $B^3$ and $B^4$ is a nitrogen atom and the other is a carbon atom.

The pyrrolotriazole azomethine dye represented by formula (B-V) wherein $Z^3$ represents an electron attractive group having a Hammett's substituent constant $\sigma_p$ value of not less than 0.30 is more preferred since it has a sharp absorption. Further, $Z^3$ represents still more preferably an electron attractive group having a Hammett's substituent constant $\sigma_p$ value of not less than 0.45, and most preferably an electron attractive group having a Hammett's substituent constant $\sigma_p$ value of not less than 0.60. The pyrrolotriazole azomethine dye represented by formula (B-V) wherein the sum total of Hammett's substituent constant σp value of the groups represented by $Z^3$ and $Z^4$ is not less than 0.70 is particularly preferred since it has excellent cyan hue.

While it is preferred in the present invention to use the pyrrolotriazole azomethine dye represented by formula (B-V) as a cyan dye, it may be used as a magenta dye by modifying the substituents thereof.

The Hammett's substituent constant $\sigma_p$ value used herein is described with respect to formula (A-I) hereinbefore. As described above, although the compounds represented by formulae (B-I) to (B-V) according to the present invention are not benzene derivatives, the $\sigma_p$ value is used as a measure for indicating an electron effect of the substituent irrespective of the position of substituent. The description of the Hammett's substituent constant is also found in Japanese Patent Application No. 11-365188 and the $\sigma_p$ values of the present invention are same as those described therein.

In the present invention, the $\sigma_p$ value is used in the meaning as described above.

Examples of the electron attractive group having a Hammett's substituent constant $\sigma_p$ value of not less than 0.60 include a cyano group, a nitro group, an alkylsulfonyl group (e.g., methanesulfonyl) and an arylsulfonyl group (e.g., benzenesulfonyl).

Examples of the electron attractive group having a Hammett's substituent constant $\sigma_p$ value of not less than 0.45 include an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl or N,N-dimethylsulfamoyl) and a halogenated alkyl group (e.g., trifluoromethyl), in addition to the above-described groups.

Examples of the electron attractive group having a Hammett's substituent constant $\sigma_p$ value of not less than 0.30 include an acyloxy group (e.g., acetoxy), a carbamoly group (e.g., N-ethylcarbamoyl or N,N-dibutylcarbamoyl), a halogenated alkoxy group (e.g., trifluoromethyloxy), a halogenated aryloxy group (e.g., pentafluorophenyloxy), a sulfonyloxy group (e.g., methylsulfonyloxy), a halogenated alkylthio group (e.g., difluoromethylthio), an aryl group substituted with at least two electron attractive groups each having a Hammett's substituent constant $\sigma_p$ value of not less than 0.15 (e.g., 2,4-dinitrophenyl or pentachlorophenyl) and a heterocyclic group (e.g., 2-benzoxazolyl, 2-benzothiazolyl and 1-phenyl-2-benzimidazolyl), in addition to the above-described groups.

Examples of the electron attractive group having a Hammett's substituent constant $\sigma_p$ value of not less than 0.20 include a halogen atom, in addition to the above-described groups.

Specific examples of the cyan dye for use in the present invention are set forth below but the present invention should not be construed as being limited thereto.

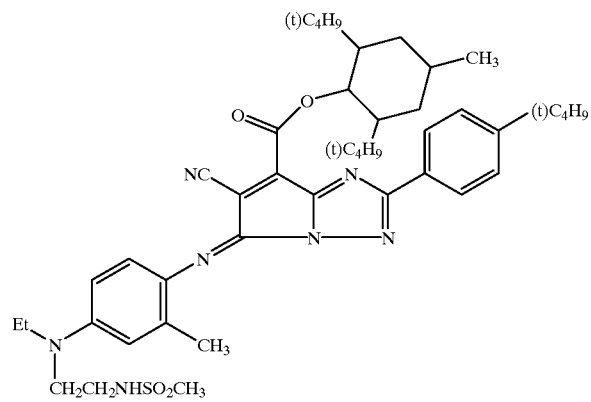

(C-1)

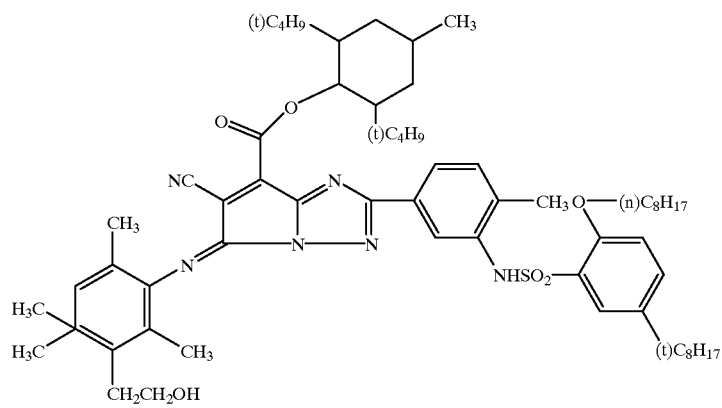

(C-2)

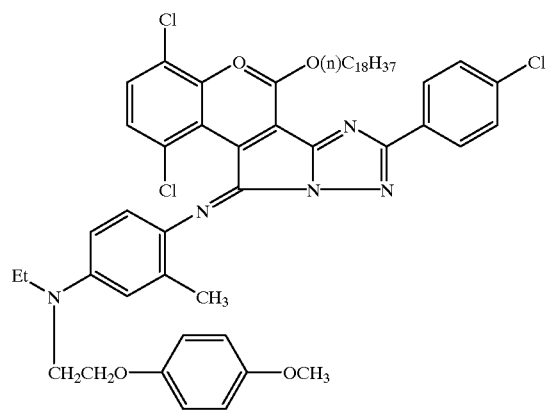

(C-3)

-continued
(C-4)
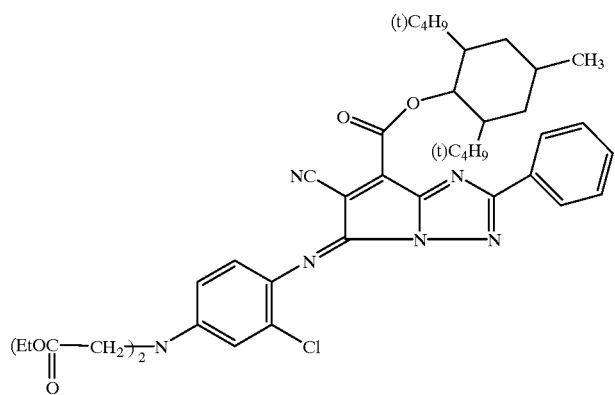
(C-5)
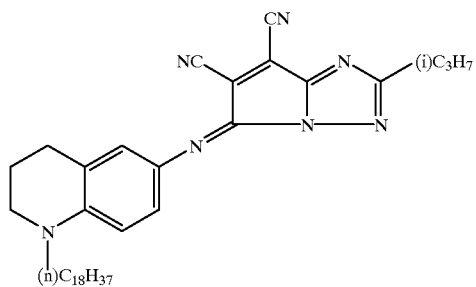
(C-6)
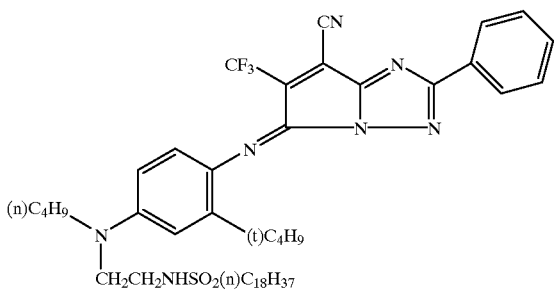
(C-7)
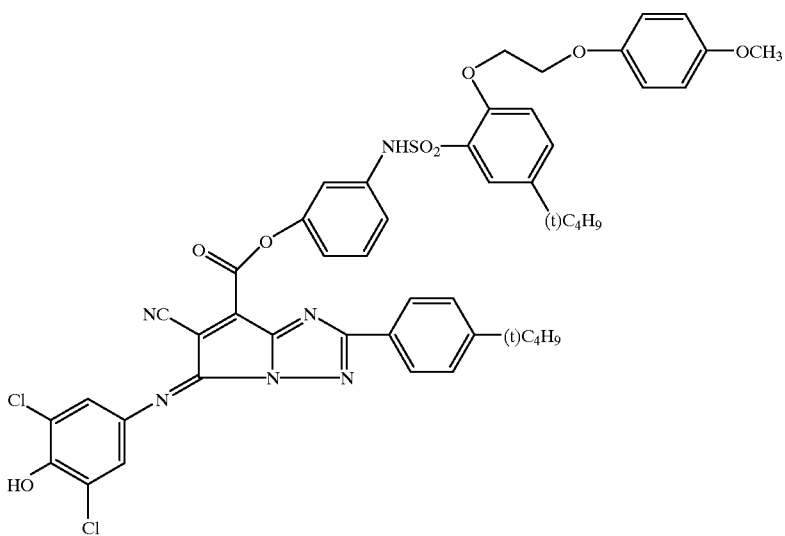

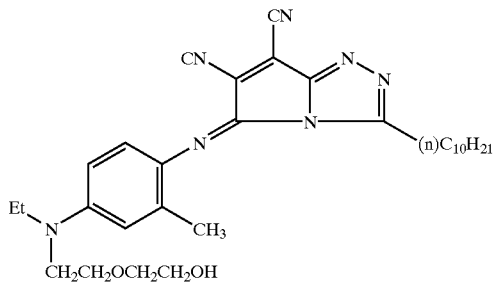

(C-8)

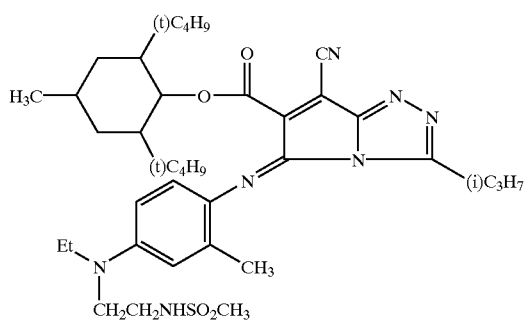

(C-9)

Further, other examples of the cyan dye for use in the present invention are described in Japanese Patent Application Nos. 11-365188, but the present invention should not be construed as being limited thereto.

The pyrrolotriazole azomethine dye represented by formula (B-V) can be synthesized with reference to the methods described, for example, in JP-A-5-177959, JP-A-9-292679, JP-A-10-62926 and Japanese Patent Application No. 11-365188.

Dispersion of Fine Polymer Particles

Now, the dispersion of fine polymer particles which is used in the method of the present invention is described in detail below.

The dispersion of fine polymer particles (polymer latex) for use in the present invention is a dispersion wherein a polymer is dispersed in the form of fine particles in an aqueous medium and which is prepared by a so-called emulsion polymerization using a vinyl monomer. In order to improve hue of the image formed by the ink jet recording method and to improve printing characteristics (e.g., prevention of clogging in nozzle or twist of ejection), a particle size of the dispersed particles is preferably from 0.001 to 1 μm, more preferably from 0.01 to 0.5 μm in terms of a volume average particle size.

The volume average particle size means a particle size weighted with a particle volume and is calculated by dividing the sum total of values obtained by multiplying a diameter of each particle by a volume thereof by the total volume of the particles. On the volume average particle size, reference is made to Soichi Muroi, *Kobunshi Latex no Kagaku*, page 119, published by Kobunshi Kanko Kai.

Measurement of the volume average particle size of the dispersed particles can be easily carried out using known methods, for example, a static light scattering method, a kinetic light scattering method, a centrifugal sedimentation method or a method described in *Jikken Kagaku Koza*, Fourth Edition, pages 417 to 418. Specifically, the particle size is easily determined by diluting the ink composition with distilled water so as to make a concentration of particles in a range of from 0.1 to 1% by weight and measuring with a commercially available volume average particle size measuring apparatus (for example, Microtrack UPA manufactured by Nikkiso Co., Ltd.). The kinetic light scattering method utilizing a laser Doppler effect is particularly preferred because the measurement of small particle size can be conducted.

A polymer constituting the dispersion of fine polymer particles includes a homopolymer or copolymer comprising one or more monomers appropriately selected from monomer groups described below. The monomer usable is not particularly restricted and any monomer can be used as far as it is polymerizable by a conventional radical polymerization method.

Monomer Groups (a) Olefins: ethylene, propylene, isoprene, butadiene, vinyl chloride, vinylidene chloride, 6-hydroxy-1-hexene, cyclopentadiene, 4-pentenoic acid, 8-nonenoic acid, vinylsulfonic acid, trimethyl vinyl silane, trimethoxy vinyl silane, butadiene, pentadiene, isoprene, 1,4-divinyl cyclohexane and 1,2,5-trivinyl cyclohexane.

(b) α,β-Unsaturated carboxylic acids and salts thereof: acrylic acid, methacrylic acid, itaconic acid, maleic acid, sodium acrylate, ammonium methacrylate and potassium itaconate.

(c) Derivatives of α,β-unsaturated carboxylic acids: an alkyl acrylate (e.g., methyl acrylate, ethyl acrylate, n-butyl acrylate, cyclohexyl acrylate, 2-ethylhexyl acrylate or n-dodecyl acrylate), a substituted alkyl acrylate (e.g., 2-chloroethyl acrylate, benzyl acrylate, 2-cyanoethyl acrylate or ally acrylate), an alkyl methacrylate (e.g., methyl methacrylate, n-butyl methacrylate, 2-ethylhexyl methacrylate or n-dodecyl methacrylate), a substituted alkyl methacrylate (e.g., 2-hydroxyethyl methacrylate, glycidyl methacrylate, glycerol monomethacrylate, 2-acetoxyethyl methacrylate, teterahydrofurfuryl methacrylate, 2-methoxyethyl methacrylate, ω-methoxypolyethylene glycol methacrylate (addition molar amount of polyoxyethylene: 2 to 100), polyethylene glycol monomethacrylate (addition molar amount of polyoxyethylene: 2 to 100), polypropylene glycol monomethacrylate (addition molar amount of polyoxypropylene: 2 to 100), 2-carboxyethyl methacrylate, 3-sulfopropyl methacrylate, 4-oxysulfobutyl methacrylate, 3-trimethoxysilylpropyl methacrylate or allyl methacrylate), a derivative of unsaturated dicarboxylic acid (e.g., monobutyl maleate, dimethyl maleate, monomethyl itaconate or dibutyl itaconate), a polyfunctional ester (e.g., ethylene glycol diacrylate, ethylene glycol dimethacrylate, 1,4-cyclohexane diacrylate, pentaerythritol tetramethacrylate, pentaerythritol triacrylate, trimethylolpropane triacrylate, trimethylolethane triacrylate, dipentaerythritol pentamethacrylate, dipentaerythritol hexaacrylate or 1,2,4-cyclohexane trimethacrylate).

(d) Amides of α,β-unsaturated carboxylic acids: acrylamide, methacrylamide, N-methylacrylamide, N,N-dimethylacrylamide, N-methyl-N-hydroxyethylmethacrylamide, N-tert-butylacrylamide, N-tert-octylmethacrylamide, N-cyclohexylacrylamide, N-phenylacrylamide, N-(2-acetoacetoxyethyl) acrylamide, N-acryloylmorpholine, diacetoneacrylamide, itaconic diamide, N-methylmaleimide, 2-acrylamido-2-methylpropanesulfonic acid, methylenebisacrylamide or dimethacryloylpiperazine.

(e) Styrene and derivatives thereof: styrene, vinyltoluene, p-tert-butylstyrene, vinylbenzoic acid, methyl vinylbenzoate, α-methylstyrene, p-chloromethylstyrene, vinylnaphthalene, p-hydroxymethylstyrene, sodium p-styrenesulfonate, potassium p-styrenesulfinate, 1,4-divinylbenzene or 2-acryloylethyl 4-vinylbenzoate.

(f) Vinyl ethers: methyl vinyl ether, butyl vinyl ether or methoxyethyl vinyl ether.

(g) Vinyl esters: vinyl acetate, vinyl propionata, vinyl benzoate, vinyl salicylate or vinyl chloroacetate.

(h) Other polymerizable monomers: N-vinylpyrrolidone, 2-vinyloxazoline, 2-isopropenyloxazoline or divinylsulfone.

The polymer for forming the dispersion of fine polymer particles for use in the present invention is preferably a homopolymer or copolymer containing an acrylic or methacrylic resin, styrene resin, conjugateddiene resin, vinyl acetate resin or polyolefin resin as the main component. Of these polymers, a polymer having ethylenically unsaturated groups in the main chain or side chain thereof, that is, a polymer containing at least one monomer selected from a conjugated diene and a monomer having at least two non-conjugated ethylenically unsaturated groups whose reactivities are different from each other as a constituting monomer component is more preferred, and a polymer containing a conjugated diene as a constituting monomer component is particularly preferred.

Specific examples of the monomer having at least two non-conjugated ethylenically unsaturated groups whose reactivities are different from each other as the more preferred monomers include allyl acrylate, allyl methacrylate, N-allylacrylamide and N-allylmethacrylamide. Specific examples of the conjugated diene as the particularly preferred monomer include 1,3-butadiene, isoprene, 1,3-petadiene, 2-ethyl-1,3-butadiene, 2-n-propyl-1,3-butadiene, 2,3-dimethyl-1,3-butadiene, 2-methyl-1,3-butadiene 1-phenyl-1,3-butadiene, 1-α-naphthyl-1,3-butadiene, 1-β-naphthyl-1,3-butadiene, 2-chloro-1,3-butadiene, 1-bromo-1, 3-butadiene, 1-chloro-1,3-butadiene, 2-fluoro-1,3-butadiene, 2,3-dichloro-1,3-butadiene, 1,1,2-trichloro-1,3-butadiene, 2-cyano-1,3-butadiene, 1,4-hexadiene, cyclopentadiene and ethylidenenorbornene.

Specific preferred examples of the dispersion of fine polymer particles for use in the present invention are set forth in Table 1 below, but the present invention should not be construed as being limited thereto. The numerical value denoting a ratio of each monomer in parentheses is represented by a percent by weight, as far as it is not otherwise indicated.

TABLE 1

| | |
|---|---|
| P-1 | Styrene/butadiene (80/20) |
| P-2 | Styrene/butadiene/acrylic acid (70/27/3) |
| P-3 | Styrene/butadiene/acrylic acid (47.5/47.5/5) |
| P-4 | Styrene/butadiene (37/63) |
| P-5 | Styrene/butadiene (23/77) |
| P-6 | Butadiene (homopolymer) |
| P-7 | Isoprene (homopolymer) |
| P-8 | Ethyl acrylate/butadiene (40/60) |
| P-9 | Ethyl acrylate/styrene/butadiene (40/30/30) |
| P-10 | Isoprene/styrene/vinyltoluene (50/25/25) |
| P-11 | Methyl acrylate (homopolymer) |
| P-12 | Ethyl acrylate (homopolymer) |
| P-13 | Ethyl acrylate/methyl methacrylate (70/30) |
| P-14 | Ethyl acrylate/styrene/sodium 2-acrylamido-2-methyl-propanesulfonate (55/40/5) |
| P-15 | n-Butyl acrylate/styrene (40/60) |
| P-16 | n-Butyl acrylate/tert-butyl acrylate/acrylic acid (47/50/3) |
| P-17 | 2-Ethylhexyl acrylate/styrene (50/50) |
| P-18 | n-Butyl methacrylate (homopolymer) |
| P-19 | n-Butyl methacrylate/methacrylic acid (90/10) |
| P-20 | n-Butyl methacrylate/methoxy polyethylene glycol (n = 9) monomethacrylate (80/20) |
| P-21 | 2-Ethylhexyl methacrylate/styrene/2-hydroxyethyl methacrylate/acrylic acid (40/40/18/2) |
| P-22 | n-Dodecyl methacrylate/methyl methacrylate/styrene/sodium styrenesulfonate (45/25/25/5) |
| P-23 | Benzyl methacrylate/methyl acrylate (80/20) |
| P-24 | Styrene/n-butyl acrylate/allyl methacrylate (40/30/30) |
| P-25 | 2-Ethylhexyl methacrylate/styrene/ally methacrylate/methacrylic acid (30/35/30/5) |
| P-26 | Vinyl acetate (homopolymer) |
| P-27 | tert-Butylacrylamide/n-butyl acrylate/2-carboxyethyl acrylate (45/45/10) |
| P-28 | Methyl acrylate/2-acetoacetoxyethyl methacrylate/acrylic acid (80/17/3) |
| P-29 | Ethylene glycol dimethacrylate/n-butyl methacrylate/acrylic acid (5/92/3) |
| P-30 | Ethylene glycol dimethacrylate/styrene/n-butyl acrylate (10/45/45) |
| P-31 | Ethylene glycol dimethacrylate/ethyl methacrylate/glycidyl methacrylate/methoxy polyethylene glycol (n − 23) monomethacrylate (5/60/20/15) |
| P-32 | Divinylbenzene/styrene/2-ethylhexyl methacrylate (5/45/50) |
| P-33 | Trivinylcyclohexane/n-butyl methacrylate/2-carboxyethyl acrylate (5/75/20) |

The dispersions of fine polymer particles may be used individually or as a mixture of two or more thereof, if desired.

The dispersion of fine polymer particles synthesized using an emulsion polymerization method has a high molecular weight in comparison with that obtained by a usual solution polymerization method as far as using no chain transfer agent, etc., such as ordinarily a weight average molecular weight of 100,000 or more. Further, when a conjugated diene monomer or a monomer having two or more ethylenically unsaturated groups is used, a molecular weight of the dispersion of fine polymer particles may be substantially infinite due to a crosslinking reaction in some cases.

The emulsion polymerization method used for synthesis of the dispersion of fine polymer particles is described below. The emulsion polymerization method comprising emulsifying a monomer in an amount of from about 5 to about 150% by weight based on a dispersing medium of water or a mixed solvent of water and an organic solvent miscible with water (e.g., methanol, ethanol or acetone) using at least one emulsifying agent in an amount of from 0.1 to 20% by weight based on the monomer and conducting polymerization using a radical polymerization initiator in an amount of from 0.02 to 5% by weight based on the monomer at a temperature of ordinarily from about 30 to about 100° C., preferably from 40 to 90° C. under stirring. The amount of organic solvent miscible with water is form 0 to 100% by volume, preferably from 0 to 50% by volume based on water.

The polymerization initiator used includes an azobis compound, a peroxide, a hydroperoxide and a redox catalyst. Specific examples of the polymerization initiator include an inorganic persulfate, for example, potassium persulfate or ammonium persulfate, an organic peroxide, for example, tert-butyl peroctoate, bezoyl peroxide, isopropyl percarbonate, 2,4-dichlorobenzoyl peroxide, methyl ethyl ketone peroxide, cumene hydroperoxide or dicumyl peroxide, an azobis compound, for example, 2,2'-azobisisobutyrate, sodium 2,2'-azobiscyanovalerate, 2,2'-azobis(2-amidinopropane) hydrochloride, 2,2'-azobis[2-(5-methyl-2-imidazolin-2-yl)propane] hydrochloride, 2,2'-azobis(2-methyl-N-[1,1'-bis(hydroxymethyl)-2-hydroxyethyl]propionamide. Of these compounds, potassium persulfate and ammonium persulfate are particularly preferred.

The emulsifying agent includes an anionic surface active agent, a cationic surface active agent, an amphoteric surface active agent, a nonionic surface active agent and a water-soluble polymer. Specific examples thereof include sodium laurate, sodium dodecylsulfate, sodium 1-octoxycarbonylmethyl-1-octoxycarbonylmethanesulfonate, sodium laurylnaphthalenesulfonate, sodium laurylbenzenesulfonate, sodium laurylphosphate, cetyl trimethyl ammonium chloride, N-2-ethylpyridinium chloride, polyoxyethylene nonyl phenyl ether, polyoxyethylene sorbitane lauryl ester, polyvinyl alcohol and an emulsifying agent and a water-soluble polymer, etc. as described in JP-B-53-6190.

In the emulsion polymerization, various factors, for example, polymerization initiator, concentration, polymerization temperature and reaction time can be naturally varied widely and easily depending on the purposes. The emulsion polymerization reaction can be conducted by adding a polymerization initiator to a reaction vessel containing the total amounts of a monomer, a surface active agent and an aqueous medium. Alternatively, the polymerization reaction is carried out while a partial or all amount of either a monomer, a polymerization initiator or both thereof is dropwise added, if desired. The latex according to the present invention can be easily synthesized using a conventional manner of emulsion polymerization method. In general, the emulsion polymerization methods are described in detail in publications, for example, Taira Okuda and Hirosi Inagaki ed., *Goseijyusi Emulsion,* published by Kobunsi Kanko Kai (1978), Takaaki Sugimura, Yasuo Kataoka, Soichi Suzuki and Keiji Kasahara ed., *Gosei Latex no Oyo,* published by Kobunshi Kanko Kai (1993), and Soichi Muroi, *Kobunshi Latex no Kagaku,* published by Kobunshi Kanko Kai (1970).

Further, those known as soap-free latexes can be preferably employed.

Another example of water-dispersible polymer fine particles for use in the present invention includes a water-insoluble dissociation group-containing polymer. The water-insoluble dissociation group-containing polymer means a polymer having an ionic dissociation group. The ionic dissociation group includes a cationic dissociation group such as a tertiary amino group or a quaternary ammonium group and an anionic dissociation group such as a carboxylic acid group, a sulfonic acid group or a phosphoric acid group. Examples of the dissociation group-containing polymer include a vinyl polymer and a condensation polymer (e.g., polyurethane, polyester, polyamide, polyurea or polycarbonate). The water-insoluble dissociation group-containing polymer is preferably a polymer which is water-dispersible, namely, a polymer which has a self-emulsifying property.

Examples of the dissociation group contained in the dissociation group-containing vinyl polymer include an anionic group such as a carboxylic acid group, a sulfonic acid group, a sulfuric acid monoester group, —OPO(OH)$_2$, a sulfinic acid group, and a salt thereof (for example, an alkali metal salt such as sodium or potassium, or an ammonium salt such as ammonia, dimethylamine, ethanolamine, diethanolamine, triethanolamine or trimethylamine) and a cationic group such as a primary amine, a secondary amine, a tertiary amine, a salt thereof (for example, a salt of an organic acid (e.g., acetic acid, propionic acid or methanesulfonic acid) or an inorganic acid (e.g., hydrochloric acid or sulfuric acid)), and a quaternary ammonium salt. Among these groups, the anionic group is preferred, and a carboxylic acid group is particularly preferred.

Examples of the monomer containing a carboxylic acid as the dissociation group include acrylic acid, 2-carboxyethyl acrylate, methacrylic acid, itaconic acid, maleic acid, fumaric acid, citraconic acid, crotonic acid, a monoalkyl ester of itaconic acid (e.g., monomethyl itaconate, monoethyl itaconate or monobutyl itaconate), a monoalkyl ester of maleic acid (e.g., monomethyl maleate, monoethyl maleate or monobutyl maleate).

Examples of the monomer containing a sulfonic acid as the dissociation group include styrenesulfonic acid, vinylsulfonic acid, an acryloyloxyalkylsulfonic acid (e.g., acryloyloxyethylsulfonic acid or acryloyloxypropylsulfonic acid), a methacryloyloxyalkylsulfonic acid (e.g., methacryloyloxyethylsulfonic acid or methacryloyloxypropylsulfonic acid), an acrylamidoalkylsulfonic acid (e.g., 2-acrylamido-2-methylethanesulfonic acid, 2-acrylamido-2-methylpropanesulfonic acid or 2-acrylamido-2-methylbutanesulfonic acid), a methacrylamidoalkylsulfonic acid (e.g., 2-methacrylamido-2-methylethanesulfonic acid or 2-methacrylamido-2-methylpropanesulfonic acid).

Examples of the monomer containing a phosphoric acid as the dissociation group include monoacryloyloxyethyl phosphate and monomethacryloyloxyethyl phosphate.

Of these monomers, acrylic acid, metacrylic acid, styrenesulfonic acid, vinylsulfonic acid, an acrylamidoalkylsulfonic acid and a methacrylamidoalkylsulfonic acid are preferred, and acrylic acid, metacrylic acid, styrenesulfonic acid, 2-acrylamido-2-methylpropanesulfonic acid and 2-acrylamido-2-methylbutanesulfonic acid are particularly preferred.

Examples of the monomer containing the cationic dissociation group include a monomer containing a tertiary amino group such as a dialkylaminoethyl metacrylate or a dialkylaminoethyl acrylate and a monomer containing a quaternary ammonium group such as N-2-acryloyloxyethyl-N,N,N-trimethylammonium chloride or N-vinylbenzyl-N,N,N-triethylammonium chloride.

The dissociation group-containing monomer may be copolymerized with one or more monomers having no dissociation group. Examples of such monomer used are set forth below.

<Acrylates>

Specific examples of the acrylates include methyl acrylate, ethyl acrylate, n-propyl acrylate, isopropyl acrylate, n-butyl acrylate, isobutyl acrylate, sec-butyl acrylate, tert-butyl acrylate, hexyl acrylate, 2-ethylhexyl acrylate, tert-octyl acrylate, 2-chloroethyl acrylate, 2-bromoethyl acrylate, 4-chlorobutyl acrylate, 2-acetoxyethyl acrylate, benzyl acrylate, cyclohexyl acrylate, furfuryl acrylate, tetrahydrofurfuryl acrylate, phenyl acrylate, 2-hydroxyethyl acrylate, 2,2-dimethyl-3-hydroxypropyl acrylate, 2-methoxyethyl acrylate, 3-methoxybutyl acrylate, 2-ethoxyethyl acrylate, 2-butoxyethyl acrylate, 2-(2-methoxyethoxy)ethyl acrylate, glycidyl acrylate, 1-bromo-2-methoxyethyl acrylate, 2,2,2-trifluoroethyl acrylate, 1H,1H,2H,2H-perfluorodecyl acrylate, diphenyl-2-acryloyloxyethyl phosphate, diphenyl-2-methacryloyloxyethyl phosphate and dibutyl-2-acryloyloxyethyl phosphate.

<Methacrylates>

Specific examples of the methacrylates include methyl methacrylate, ethyl methacrylate, n-propyl methacrylate, isopropyl methacrylate, n-butyl methacrylate, isobutyl methacrylate, sec-butylmethacrylate, tert-butylmethacrylate, cyclohexyl methacrylate, benzyl methacrylate, 2-ethylhexyl methacrylate, lauryl methacrylate, stearyl methacrylate, furfurylmethacrylate, tetrahydrofurfurylmethacrylate, phenyl methacrylate, cresyl methacrylate, naphthyl metacrylate, 2-hydroxyethyl methacrylate, 4-hydroxybutyl methacrylate, triethylene glycol monomethacrylate, dipropylene glycol monomethacrylate, 2-methoxyethylmethacrylate, 3-methoxybutyl methacrylate, 2-ethoxyethyl methacrylate, 2-butoxyethyl methacrylate, 2-(2-methoxyethoxy)ethyl methacrylate, 2-(2-ethoxyethoxy)ethyl methacrylate, 2-acetoxyethyl methacrylate, 2-acetoacetoxyethyl methacrylate, allyl methacrylate, glycidyl methacrylate, 2,2,2-trifluoroethyl methacrylate, 1H,1H,2H,2H-perfluorodecyl methacrylate and dioctyl-2-methacryloyloxyethyl phosphate.

<Vinyl Esters>

Specific examples of the vinyl esters include vinyl acetate, vinyl propionate, vinyl butyrate, vinyl caproate, vinyl chloroacetate, vinyl methoxyacetate, vinyl phenylacetate, vinyl benzoate and vinyl salicylate.

<Acrylamides>

Specific examples of the acrylamides include acrylamide, methylacrylamide, ethylacrylamide, isopropylacrylamide, n-butylacrylamide, tert-butylacrylamide, tert-octylacrylamide, cyclohexylacrylamide, benzylacrylamide, hydroxymethylacrylamide, methoxymethylacrylamide, butoxymethylacrylamide, methoxyethylacrylamide, phenylacrylamide, dimethylacrylamide, diethylacrylamide, β-cyanoethylacrylamide, N-(2-acetoacetoxyethyl) acrylamide and diacetoneacrylamide.

<Methacrylamides>

Specific examples of the methacrylamides include methacrylamide, methylmethacrylamide, ethylmethacrylamide, propylmethacrylamide, n-butylmethacrylamide, tert-butylmethacrylamide, cyclohexylmethacrylamide, benzylmethacrylamide, hydroxymethylmethacrylamide, methoxyethylmethacrylamide, phenylmethacrylamide, β-cyanoethylmethacrylamide and N-(2-acetoacetoxyethyl) methacrylamide.

<Olefins>

Specific examples of the olefins include dicyclopentadiene, ethylene, propylene, 1-butene, 1-pentene, vinyl chloride, vinylidene chloride, isoprene, chloroprene, butadiene and 2,3-dimethylbutadiene.

<Styrenes>

Specific examples of the styrenes include styrene, methylstyrene, dimethylstyrene, trimethylstyrene, ethylstyrene, chloromethylstyrene, methoxystyrene, acetoxystyrene, chlorostyrene, dichlorostyrene, bromostyrene and methyl vinylbenzoate.

<Vinyl Ethers>

Specific examples of the vinyl ethers include methyl vinyl ether, butyl vinyl ether, hexyl vinyl ether and methoxyethyl vinyl ether.

<Other Monomers>

Specific examples of other monomers include butyl crotonate, hexyl crotonate, dimethyl itaconate, dibutyl itaconate, diethyl maleate, dimethyl maleate, dibutyl maleate, diethyl fumarate, dimethyl fumarate, dibutyl fumarate, methyl vinyl ketone, phenyl vinyl ketone, methoxyethyl vinyl ketone, N-vinyloxazolidone, N-vinylpyrrolidone, vinylidene chloride, methylene malononitrile and vinylidene.

It is also preferred to copolymerize a monomer having a nonionic dispersing group. Examples of the monomer having a nonionic dispersing group include an ester of polyethylene glycol monoalkyl ether with a carboxylic acid-containing monomer, an ester of polyethylene glycol monoalkyl ether with a sulfonic acid-containing monomer, an ester of polyethylene glycol monoalkyl ether with a phosphoric acid-containing monomer, a vinyl group-containing urethane formed from polyethylene glycol monoalkyl ether and an isocyanate group-containing monomer, and a mocromonomer containing a polyvinyl alcohol structure.

In the polyethylene glycol monoalkyl ether described above, a number of the repeating unit of ethyleneoxy portion is preferably from 8 to 50, more preferably from 10 to 30. A number of carbon atoms contained in the alkyl group of the polyethylene glycol monoalkyl ether is preferably from 1 to 20, more preferably from 1 to 12.

Now, the dissociation group-containing condensation polymer described above is described in detail below.

The dissociation group-containing polyurethane is basically synthesized by a poly addition reaction using a diol compound and a diisocyanate compound as raw materials.

Specific examples of the diol compound include a non-dissociating diol, for example, ethylene glycol, 1,2-propanediol, 1,3-propanediol, 1,3-butanediol, 2,3-butanediol, 2,2-dimethyl-1,3-propanediol, 1,4-pentanediol, 2,4-pentanediol, 3,3-dimethyl-1,2-butanediol, 2-ethyl-2-methyl-1,3-propanediol, 1,6-hexanediol, 2,5-hexanediol, 2-methyl-2,4-pentanediol, 2,2-diethyl-1,3-propanediol, 2,4-dimethyl-2,4-pentanediol, 2-methyl-2-propyl-1,3-propanediol, 2,5-dimethyl-2,5-hexanediol, 2-ethyl-1,3-hexanediol, 1,2-octanediol, 2,2,4-trimethyl-1,3-pentanediol, 1,4-cyclohexanedimethanol, diethylene glycol, triethylene glycol, dipropylene glycol, tripropylene glycol, polyethylene glycol (average molecular weight: 200 to 4,000), polypropylene glycol (average molecular weight: 200 to 1,000), polyester polyol, 4,4'-dihydroxydiphenyl-2,2-propane and 4,4'-dihydroxyphenyl sulfone.

Specific examples of the diisocyanate include ethylene diisocyanate, isophorone diisocyanate, hexamethylene diisocyanate, 1,4-cyclohexane diisocyanate, 2,4-toluene diisocyanate, 1,3-xylylene diisocyanate, 1,5-naphthalene diisocyanate, m-phenylene diisocyanate, p-phenylene diisocyanate, 3,3'-dimethyl-4,4'-diphenylmethane diisocyanate, 3,3'-dimethylbiphenylene diisocyanate, dicyclohexylmethane diisocyanate and methylenebis(4-cyclohexylisocyanate).

The dissociation group-containing polyurethane can be obtained, for example, by using diol containing a dissociation group at the synthesis of polyurethane. In this case, the dissociation group is introduced into the polyurethane as a substituent of the polymer main chain. Examples of the diol having a dissociation group, particularly an anionic dissociation group include 2,2-bis(hydroxymethyl)propionic acid, 2,2-bis(hydroxymethyl)butanoic acid, 2,5,6-trimethoxy-3,4-dihydroxyhexanoic acid, 2,3-dihydroxy-4,5-dimethoxypentanoic acid, 3,5-di(2-hydroxy)ethyloxycarbonylbenzenesulfonic acid and a salt thereof, but the present invention should not be construed as being limited thereto.

Examples of the dissociation group contained in the dissociation group-containing polyurethane include an anionic group such as a carboxylic acid group, a sulfonic acid group, a sulfuric acid monoester group, —OPO(OH)$_2$, a sulfinic acid group, and a salt thereof (for example, an alkali metal salt such as sodium or potassium, or an ammonium salt such as ammonia, dimethylamine, ethanolamine, diethanolamine, triethanolamine or trimethylamine) and a cationic group such as a primary amine, a secondary amine, a tertiary amine or a quaternary ammonium salt. Among these groups, the anionic group is preferred, and a carboxylic acid group is particularly preferred.

The dissociation group-containing polyester is basically synthesized by a condensation reaction of a diol compound with a dicarboxylic acid compound.

Specific examples of the dicarboxylic acid compound include oxalic acid, moronic acid, succinic acid, glutaric acid, dimethylmaronic acid, adipic acid, pimelic acid, α,α-dimethylsuccinic acid, acetonedicarboxylic acid, sebacic acid, 1,9-nonanedicarboxylic acid, fumaric acid, maleic acid, itaconic acid, citraconic acid, phthalic acid, isophthalic acid, terephthalic acid, 2-butylterephthalic acid, tetrachloroterephthalic acid, acetylenedicarboxylic acid, poly(ethylene terephthalate)dicarboxylic acid, 1,2-cyclohexanedicarboxylic acid, 1,4-cyclohexanedicarboxylic acid, ω-poly(ethylene oxide)dicarboxylic acid and p-xylylenedicarboxylic acid.

The dicarboxylic acid compound may be used in the form of an alkyl ester thereof (e.g., dimethyl ester) or a chloride thereof, or in the form of an acid anhydride (e.g., maleic anhydride, succinic anhydride or phthalic anhydride) at the polycondensation reaction with the diol compound.

The dissociation group-containing polyester can be obtained by synthesizing using a dicarboxylic acid compound having a dissociation group, for example, an anionic group such as a sulfonic acid group, a sulfuric acid monoester group, —OPO(OH)$_2$, a sulfinic acid group, or a salt thereof (for example, an alkali metal salt such as sodium or potassium, or an ammonium salt such as ammonia, dimethylamine, ethanolamine, diethanolamine, triethanolamine or trimethylamine) or a cationic group such as a tertiary amine, a salt thereof (for example, a salt of an organic acid (e.g., acetic acid, propionic acid or methanesulfonic acid) or an inorganic acid (e.g., hydrochloric acid or sulfuric acid)), or a quaternary ammonium salt in addition to the carboxylic acid group. As the dissociation group other than the carboxylic acid group contained in the dissociation group-containing polyester, the anionic group is preferred, and a sulfonic acid group is particularly preferred.

Preferred examples of the dicarboxylic acid compound containing a sulfonic acid group include a sulfophthalic acid (e.g., 3-sulfophthalic acid, 4-sulfophthalic acid, 4-sulfoisophthalic acid, 5-sulfoisophthalic acid or 2-sulfoterephthalic acid), sulfosuccinic acid, a sulfonaphthalenedicarboxylic acid (e.g., 4-sulfo-1,8-naphthalenedicarboxylic acid or 7-sulfo-1,5-naphthalenedicarboxylic acid), 3,5-di(2-hydroxy)ethyloxycarbonylbenzenesulfonic acid and a salt thereof.

As the diol compound, a compound selected from the diol compounds described with respect to the dissociation group-containing polyurethane described above can be employed.

Typical synthesis method of the dissociation group-containing polyester comprises a condensation reaction of the diol compound with the dicarboxylic acid compound or a derivative thereof. The dissociation group-containing polyester can also be obtained by conducting the condensation using a hydroxycarboxylic acid (e.g., 12-hydroxystearic acid). Further, a polyester obtained by a ring-opening polymerization method between a cyclic ether and a lactone as described in detail in Takeo Saegusa, *Koza Jugo Hannoron* 6, Kaikan Jyugo (I), published by Kagakudojin Publishing Co., Ltd. (1971) can be suitably used in the present invention.

The dissociation group-containing polyamide can be obtained by a polycondensation reaction of a diamine compound with a dicarboxylic acid compound, a polycondensation reaction of an aminocarboxylic acid compound, or a ring-opening polymerization reaction of a lactam.

Specific examples of the diamine compound include ethylenediamine, 1,3-propanediamine, 1,2-propanediamine, hexamethylenediamine, octamethylenediamine, o-phenylenediamine, m-phenylenediamine, p-phenylenediamine, piperazine, 2,5-dimethylpiperazine, 4,4'-diaminodiphenylether, 3,3'-diaminodiphenylsolfone and xylylenediamine. Specific examples of the aminocarboxylic acid compound include glycine, alanine, phenylalanine, ω-aminohexanoic acid, ω-aminodecanoic acid, ω-aminoundecanoic acid and anthranilic acid. Specific examples of monomer for use in the ring-opening polymerization reaction include ε-caprolactam, azetidinone and pyrrolidone.

As the dicarboxylic acid compound, a compound selected from the dicarboxylic acid compounds described with respect to the dissociation group-containing polyester described above can be employed.

The dissociation group-containing polyurea can be basically obtained by a polyaddition reaction of a diamine compound with a diisocyanate compound or a deammoniation reaction of a diamine compound and urea. As the diamine compound, a compound selected from the diamine compounds described with respect to the dissociation group-containing polyamide described above can be employed. As the diisocyanate compound, a compound selected from the diisocyanate compounds described with respect to the dissociation group-containing polyurethane described above can be employed.

The dissociation group-containing polycarbonate can be basically obtained by a reaction of a diol compound with phosgene or a carbonic ester derivative (e.g., an aromatic ester of carbonic acid such as diphenyl carbonate). As the diol compound, a compound selected from the diol compounds described with respect to the dissociation group-containing polyurethane described above can be employed.

The dissociation group can be introduced into each of the polymers described above according to various methods. For instance, in case of the polyurethane, a diol having the dissociation group is used at the synthesis of polyurethane, whereby the dissociation group is introduced into the polyurethane as a substituent of the polymer main chain, as described above. Also, in case of the water-insoluble polyester, the dissociation group can be introduced by leaving an unreacted carboxylic acid group at the terminal of the polymer. Further, after the synthesis of polymer, the dissociation group is introduced into the polymer by reacting a compound which can introduce the dissociation group such as an acid anhydride (e.g., maleic anhydride) with a reactive group such as a hydroxy group or an amino group of the polymer.

In the dissociation group-containing polymer including both the vinyl polymer and the condensation polymer, one kind of the required starting material is used, or two or more kinds of the required starting materials can be used in an appropriate ratio depending on various purposes for adjusting properties of the polymer, for example, a glass transition temperature (Tg) or solubility of the polymer, compatibility with a dye, or stability of the dispersion.

Of the dissociation group-containing polymers described above, those having at least one of a carboxylic acid group and a sulfonic acid group as the dissociation group are preferred, and those having a carboxylic acid group as the dissociation group are particularly preferred.

When the content of dissociation group is too small or too large, a self-emulsifying property of the dissociation group-containing polymer is small and an effect for stabilizing the dispersion of fine polymer particles may tend to decrease. Therefore, the content of dissociation group in the dissociation group-containing polymer is preferably in a range of from 0.1 to 3.0 mmol/g, more preferably in a range of from 0.2 to 2.0 mmol/g.

Of the dissociation group, the anionic dissociation group maybe used in the form of a salt of an alkali metal (e.g., sodium or potassium) or an ammonium ion. The tertiary amine of the cationic dissociation group may be used in the form of a salt of an organic acid (e.g., acetic acid, propionic acid or methanesulfonic acid) or an inorganic acid (e.g., hydrochloric acid or sulfuric acid).

Among the dissociation group-containing polymers, the vinyl polymer, polyurethane and polyester are more preferred, and the vinyl polymer is particularly preferred taking the impartation of excellent dispersion stability and easiness of introduction of the dissociation group into consideration.

Specific examples of the dissociation group-containing vinyl polymer for use in the present invention are set forth as (PP-1) to (PP-54) in Tables 2 and 3 below, but the present invention should not be construed as being limited thereto. The numerical value denoting a ratio of each monomer in parentheses is represented by a percent by weight.

TABLE 2

| PP-1) | tert-Butylmethacrylamide/methyl methacrylate/acrylic acid copolymer (60/30/10) |
|---|---|
| PP-2) | n-Butyl acrylate/acrylic acid copolymer (95/5) |
| PP-3) | Methyl methacrylate/isobutyl methacrylate/acrylic acid copolymer (60/30/10) |
| PP-4) | sec-Butyl acrylate/acrylic acid copolymer (90/10) |
| PP-5) | Ethyl acrylate/acrylic acid copolymer (95/5) |
| PP-6) | Isopropyl acrylate/acrylic acid copolymer (90/10) |
| PP-7) | n-Butyl acrylate/2-hydroxyethyl methacrylate/acrylic acid copolymer (85/5/10) |
| PP-8) | Isobutyl methacrylate/tetrahydrofurfuryl acrylate/acrylic acid copolymer (60/30/10) |
| PP-9) | n-Butyl methacrylate/1H,1H,2H,2H-perfluorodecyl acrylate/acrylic acid copolymer (75/20/5) |
| PP-10) | Methyl methacrylate/n-butyl acrylate/acrylic acid copolymer (47.5/47.5/5) |
| PP-11) | Ethylhexyl methacrylate/methyl acrylate/acrylic acid copolymer (40/55/5) |
| PP-12) | Methoxybutyl methacrylate/styrene/acrylic acid copolymer (35/50/15) |
| PP-13) | Cyclohexyl methacrylate/allyl methacrylate/acrylic acid copolymer (70/20/10) |

TABLE 2-continued

| PP-14) | Isopropyl methacrylate/2-butoxyethyl methacrylate/acrylic acid copolymer (85/15/5) |
|---|---|
| PP-15) | Ethyl acrylate/phenyl methacrylate/acrylic acid copolymer (82/15/3) |
| PP-16) | Methyl methacrylate/2-ethylhexyl acrylate/acrylic acid copolymer (47.5/47.5/5) |
| PP-17) | Isobutyl methacrylate/methacrylate of polyethylene glycol monomethyl ether (number of ethyleneoxy chain repeating unit: 23)/acrylic acid copolymer (70/25/5) |
| PP-18) | Isobutyl methacrylate/dipropylene glycol monomethacrylate/acrylic acid copolymer (85/10/5) |
| PP-19) | Isobutyl methacrylate/methacrylate of polyethylene glycol monomethyl ether(number of ethyleneoxy chain repeating unit: 9)/acrylic acid copolymer (85/10/5) |
| PP-20) | Isobutyl acrylate/methoxystyrene/acrylic acid copolymer (75/15/10) |
| PP-21) | tert-Butyl acrylate/methacrylic acid copolymer (88/12) |
| PP-22) | Hexyl acrylate/styrene/methacrylic acid copolymer (80/10/10) |
| PP-23) | 2,2,2-Trifluoroethyl methacrylate/methyl methacrylate/methacrylic acid copolymer (35/60/5) |
| PP-24) | Ethyl methacrylate/methacrylic acid copolymer (95/5) |
| PP-25) | Ethyl methacrylate/2-methoxyethyl methacrylate/methacrylic acid copolymer (70/15/15) |
| PP-26) | n-Butyl methacrylate/methacrylic acid copolymer (95/5) |
| PP-27) | Vinyl acetate/methacrylic acid copolymer (85/15) |
| PP-28) | n-Butyl methacrylate/acrylamide/methacrylic acid copolymer (80/15/5) |
| PP-29) | tert-Octylacrylamide/propyl methacrylate/methacrylic acid copolymer (20/65/15) |
| PP-30) | n-Butyl methacrylate/butoxymethylacrylamide/methacrylic acid copolymer (80/5/15) |
| PP-31) | Isobutyl methacrylate/dimethylacrylamide/methacrylic acid copolymer (80/15/5) |
| PP-32) | Isobutyl methacrylate/dimethylacrylamide/methacrylic acid copolymer (80/15/5) |
| PP-33) | n-Butyl methacrylate/phenylacrylamide/methacrylic acid copolymer (70/15/15) |
| PP-34) | n-Butyl methacrylate/methoxyethylmethacrylamide/methacrylic acid copolymer (70/15/15) |
| PP-35) | Isobutyl methacrylate/2-(2-methoxyethoxy) ethyl methacrylate/methacrylic acid copolymer (50/35/15) |

TABLE 3

| PP-36) | Ethyl methacrylate/2-carboxyethyl methacrylate copolymer (90/10) |
|---|---|
| PP-37) | n-Butyl methacrylate/styrenesulfonic acid copolymer (90/10) |
| PP-38) | Ethyl methacrylate/styrenesulfonic acid copolymer (90/10) |
| PP-39) | n-Butyl acrylate/styrene/styrenesulfonic acid copolymer (60/35/5) |
| PP-40) | n-Butyl acrylate/1H,1H,2H,2H-perfluorodecyl methacrylate/styrenesulfonic acid copolymer (80/10/10) |
| PP-41) | n-Butyl methacrrylate/2-acrylamido-2-methylethanesulfonic acid copolymer (90/10) |
| PP-42) | Isobutyl acrylate/n-butyl methacrylate/2-acrylamido-2-methylethanesulfonic acid copolymer (70/20/10) |
| PP-43) | n-Butyl methacrylate/2-acrylamido-2-methylpropanesulfonic acid copolymer (90/10) |
| PP-44) | Ethyl methacrylate/2-acrylamido-2-methylpropanesulfonic acid copolymer (90/10) |
| PP-45) | Ethyl acrylate/tert-butyl methacrylate/2-acrylamido-2-methylpropanesulfonic acid copolymer (60/35/5) |
| PP-46) | tert-Butyl acrylate/tetrahydrofurfuryl acrylate/2-methylpropanesulfonic acid copolymer (50/40/10) |

TABLE 3-continued

| | |
|---|---|
| PP-47) | tert-Butyl acrylate/methacrylate of polyethylene glycol monomethyl ether (number of ethyleneoxy chain repeating unit: 23)/2-acrylamido-2-methylpropanesulfonic acid copolymer (70/27/3) |
| PP-48) | Isobutyl acrylate/N-vinyl pyrrolidone/2-acrylamido-2-methylpropanesulfonic acid copolymer (65/30/5) |
| PP-49) | Isobutyl methacrylate/sodium 2-acrylamido-2-methylpropanesulfonate copolymer (88/12) |
| PP-50) | n-Butyl methacrylate/2-methacrylamido-2-methylpropanesulfonic acid copolymer (90/10) |
| PP-51) | n-Butyl acrylate/tert-butylmethacrylate/vinyl sulfonic acid copolymer (60/30/10) |
| PP-52) | Ethyl acrylate/tert-butyl methacrylate/vinyl sulfonic acid copolymer (60/30/10) |
| PP-53) | Ethyl methacrylate/2-acrylamido-2-methylbutanesulfonic acid copolymer (90/10) |
| PP-54) | n-Butyl methacrylate/sodium 2-acrylamido-2-methylbutanesulfonate copolymer (88/12) |

Specific examples of the dissociation group-containing condensation polymer for use in the present invention are set forth as (PP-55) to (PP-74) in Table 4 below, but the present invention should not be construed as being limited thereto. The acidic group in each polymer is shown as a non-dissociated form. In the polymers obtained by a condensation reaction, for example, polyesters and polyamides, the constituting components are shown by dicarboxylic acids, diols, diamines, hydroxycarboxylic acids and aminocarboxylic acids irrespective of their use as raw materials. The numerical value denoting a ratio of each component in parentheses is represented by a percent by weight.

TABLE 4

| | |
|---|---|
| PP-55) | 4,4'-Diphenylmethanediisocyanate/hexamethylene-diisocyanate/tetraethylene glycol/ethylene glycol/2,2-bis(hydroxymethyl)propionic acid (40/10/20/20/10) |
| PP-56) | 4,4'-Diphenylmethanediisocyanate/hexamethylene-diisocyanate/butanediol/polyethylene glycol (Mw = 400)/2,2-bis(hydroxymethyl)propionic acid (40/10/20/10/20) |
| PP-57) | 1,5-Naphthlenediisocyanate/butanediol/4,4'-dihydroxy-diphenyl-2,2'-propane/polypropylene glycol (Mw = 400)/2,2-bis(hydroxymethyl)propionic acid (50/20/5/10/15) |
| PP-58) | 1,5-Naphthlenediisocyanate/hexamethylenediisocyanate/2,2-bis(hydroxymethyl)butanoic acid/polybutylene oxide(Mw = 500) (35/15/25/25) |
| PP-59) | Isophoronediisocyanate/diethylene glycol/neopentyl glycol/2,2-bis(hydroxymethyl)propionic acid (50/20/20/10) |
| PP-60) | Toluenediisocyanate/2,2-bis(hydroxymethyl)butanoic Acid/polyethylene glycol (Mw = 1,000)/cyclohexanedimethanol (50/10/10/30) |
| PP-61) | 4,4'-Diphenylmethanediisocyanate/hexamethylene-diisocyanate/tetraethylene glycol/butanediol/3,5-di(2-hydroxy) ethyloxycarbonylbenzenesulfonic acid (40/10/10/33/7) |
| PP-62) | 4,4'-Diphenylmethanediisocyanate/hexamethylene-diisocyanate/butanediol/ethyleneglycol/2,2-bis-(hydroxymethyl) butanoic acid/3,5-di(2-hydroxy) ethyl-oxycarbonylbenzenesulfonic acid (40/10/20/15/10/5) |
| PP-63) | Terephthalic acid/isophthalic acid/5-sulfoisophthalic acid/ethylene glycol/neopentyl glycol (24/24/2/25/25) |
| PP-64) | Terephthalic acid/isophthalic acid/5-sulfoisophthalic acid/cyclohexanedimethanol/1,4-butanediol/ethylene glycol (22/22/6/25/15/10) |
| PP-65) | Isophthalic acid/5-sulfoisophthalic acid/cyclohexanedimethanol/ethylene glycol (40/10/40/10) |

TABLE 4-continued

| | |
|---|---|
| PP-66) | Cyclohexanedicarboxylic acid/isophthalic acid/3,5-di(2-hydroxy) ethyloxycarbonylbenzenesulfonic acid/cyclohexanedimethanol/ethylene glycol (30/20/5/25/20) |
| PP-67) | 11-Aminoundecanoic acid (100) |
| PP-68) | 12-Amidodecanoic acid (100) |
| PP-69) | Reaction product of poly(12-aminododecanoic acid) with maleic anhydride (100) |
| PP-70) | 11-Aminoundecanoic acid/7-aminoheptanoic acid (50/50) |
| PP-71) | Hexamethylediamine/adipic acid (50/50) |
| PP-72) | N,N-Dimethylenediamine/adipic acid/cyclohexanedicarboxylic acid (50/20/30) |
| PP-73) | Toluenediisocyanate/hexamethylenediamine/2,2-bis(hydroxymethyl)propionic acid (50/40/10) |
| PP-74) | 11-Aminoundecanoic acid/hexamethylenediamine/urea (33/33/34) |

For the synthesis of the dissociation group-containing condensation polymer, known methods described, for example, Amane Kanbara ed., *Kobunshi Jikkengaku*, Vol. 5, Jyushukugo to Jyufuka, published by Kyoritu Shuppan Co., Ltd. (1980), Eiichiro Takiyama, *Polyester Jushi Handbook*, published by The Nikkan Kogyo Shimbun, Ltd. (1988), Keiji Iwata ed., *Polyurethane Jushi Handbook*, published by Nikkan Kogyo Shimbun, Ltd. (1987), Takayuki Otsu and Masaetsu Kinoshita, *Kobunshigosei no Jikkenho*, published by Kagaku-dojin Publishing Co., Ltd. (1972), JP-B-33-1141, JP-B-37-7641, JP-B-39-5989, JP-B-40-27349, JP-B-42-5118, JP-B-42-24194, JP-B-45-10957, JP-B-48-25435, JP-B-49-36942, JP-B-52-81344, JP-A-56-88454 and JP-A-6-340835 can be employed.

With respect to the dispersion of fine polymer particles for use in the present invention, a glass transition temperature (Tg) of the polymer is preferably from −40 to 160° C., more preferably from −30 to 150° C.

A coating amount of solid content of the dispersion of fine polymer particles is preferably from 0.1 to 10 $g/m^2$, more preferably from 0.2 to 5 $g/M^2$.

The surface tension of the dispersion of fine polymer particles according to the present invention is preferably from 20 to 60 mN/m, more preferably from 25 to 45 mN/m, with or without using the surfactant.

The viscosity of the dispersion of fine polymer particles according to the present invention is preferably not more than 30 mPa.s., more preferably not more than 20 mPa.s.

Ink Jet Recording Ink

In the ink jet recording ink composition for use in the present invention, a content of the water-soluble dye or oil-soluble dye is preferably from 0.2 to 20% by weight based on 100% by weight of the ink composition. Together with the dye according to the present invention, other dyes may be used in the ink jet ink composition for use in the present invention in order to obtain a full-color image or to adjust color tone. Examples of other dyes usable include those described below.

Examples of the water-soluble organic solvent for use in the present invention include an alcohol (e.g., methanol, ethanol, propanol, isopropanol, butanol, isobutanol, sec-butanol, tert-butanol, pentanol, hexanol, cyclohexanol or benzyl alcohol), a polyhydric alcohol (e.g., ethylene glycol, diethylene glycol, triethylene glycol, polyethylene glycol, polypropylene glycol, dipolypropylene glycol, polypropylene glycol, butylenes glycol, hexanediol, pentanediol, glycerol, hexanetriol or thiodiglycol), a glycol derivative (e.g., ethylene glycol monomethyl ether, ethylene glycol monoethyl ether ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether or ethylene glycol monophenyl ether), an amine (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine or tetramethylpropylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl 2-pyrrolidone, 2-oxazolidone, 1,3-dimethyl-2-imidazolidinone, acetonitrile or acetone). The water-soluble organic solvent can be used as a mixture of two or more thereof.

To the ink jet recording ink composition for use in the present invention, other additives, for example, a drying preventing agent for preventing the occurrence of clogging in an ink ejection head due to drying of the ink jet recording ink composition, a penetration accelerating agent for promoting penetration of the ink composition into paper, an ultraviolet absorbing agent, an antioxidant, a viscosity controlling agent, a surface tension controlling agent, a dispersant, a dispersion stabilizing agent, an antimold, a rust preventing agent, a pH controlling agent, a deforming agent and a chelating agent may be added. Such additives are appropriately selected and used in suitable amounts.

The drying preventing agent for use in the ink composition of present invention is preferably a water-soluble organic solvent having a vapor pressure lower than water. Specific examples of the drying preventing agent include a polyhydric alcohol (e.g., ethylene glycol, propylene glycol, diethylene glycol, polyethylene glycol, tiodiglycol, dithiodiglycol, 2-methyl-1,3-propanediol, 1,2,6-hexanetriol, an acetylene glycol derivative, glycerol or trimethylolpropane), a lower alkyl ether of polyhydric alcohol (e.g., ethylene glycol monomethyl (or ethyl) ether, diethylene glycol monomethyl (or ethyl) ether or triethylene glycol monoethyl (or butyl) ether), a heterocyclic compound (e.g., 2-pyrrolidone, N-methyl-2-pyrrolidone, 1,3-dimethyl-2-imodazolidinone or N-ethylmorpholine), a sulfur-containing compound (e.g., sulfolane, dimethylsulfoxide or 3-sulfolene), a polyfunctional compound (e.g., diacetone alcohol or diethanolamine), and aurea derivative. Of these compounds, a polyhydric alcohol such as glycerol or diethylene glycol is preferred. The drying preventing agents may be used individually or as a mixture of two or more thereof. The drying preventing agent is preferably used in an amount of from 10 to 50% by weight of the ink composition.

Examples of the penetration accelerating agent for use in the ink composition according to the present invention include an alcohol (e.g., ethanol, isopropanol, butanol, diethylene glycol monobutyl ether, triethylene glycol monobutyl ether or 1,2-hexanediol), sodium laurylsulfate, sodium oleate, and a nonionic surface active agent. Such a compound exhibits a sufficient effect by using in an amount of from 10 to 30% by weight of the ink composition. It is preferred to use the penetration accelerating agent in a range of the addition amount in which blur of print or print through dose not occur.

Examples of the ultraviolet absorbing agent used for improving preservability of image formed in the present invention include a benzotriazole compound as described, for example, in JP-A-58-185677, JP-A-61-190537, JP-A-2-782, JP-A-5-197075 and JP-A-9-34057, a benzophenone compound as described, for example, in JP-A-46-2784, JP-A-5-194483 and U.S. Pat. No. 3,214,463, a cinnamic acid compound as described, for example, in JP-B-48-30492, JP-B-56-21141 and JP-A-10-88106, a triazine compound as described, for example, in JP-A-4-298503, JP-A-8-53427, JP-A-8-239368, JP-A-10-182621 and International Patent Publication No. 8-501291, and a compound as described in *Research Disclosure*, No. 24239. A so-called fluorescent whitening agent which absorbs an ultraviolet ray and emits fluorescence represented by a stilbene compound or a benzoxazole compound is also used.

The antioxidant used for improving preservability of image formed in the present invention includes various kinds of organic and metal complex color-fading preventing agents. Examples of the organic color-fading preventing agent include a hydroquinone, an alkoxyphnol, a dialkoxyphenol, a phenol, an aniline, an amine, an indan, a chroman, an alkoxyaniline and a heterocyclic compound. Examples of metal complex color-fading preventing agent include a nickel complex and a zinc complex. Specific examples of the antioxidant used include compounds described in patens cited in *Research Disclosure*, No. 17643, VII, Items I and J, ibid., No. 15162, ibid., 18716, page 650, left column, ibid., No. 36544, page 527, ibid., No. 307105, page 872 and ibid., No. 15162 and compounds included in the formulae and examples of representative compounds as described in JP-A-62-215272, pages 127 to 137.

Examples of the antimold for use in the present invention include sodium dehydroacetic acid, sodium benzoate, sodium pyridinethion-1-oxide, ethyl p-hydroxybenzoate, 1,2-benzisothizolin-3-one and a salt thereof. The antimold is preferably used in an amount of from 0.02 to 1.00% by weight of the ink composition.

Examples of the pH controlling agent include a hydroxide of alkalimetal, e.g., lithium hydroxide or potassium hydroxide, a carbonate, e.g., sodium carbonate or sodium hydrogen carbonate, an inorganic base, e.g., potassium acetate, sodium silicate or disodium phophate, and an organic base, e.g., N-methyldiethanolamine or triethanolamine. The pH of ink composition is preferably from 6 to 10, more preferably from 7 to 10 for improving the stability of the ink composition.

The surface tension controlling agent for use in the present invention includes a nonionic, cationic and anionic surface active agent. Examples of the anionic surface active agent include a fatty acid salt, an alkylsulfate, an alkylbenzenesulfonate, an alkylnaphthalenesulfonate, a dialkylsulfosuccinate, an alkylphosphate, a naphthalenesulfonic acid-formalin condensate and a polyoxyethylenealkylsulfate. Examples of the nonionic surface active agent include a polyoxyethylene alkyl ether, a polyoxyethylene alkyl aryl ether, a polyoxyethylene fatty acid ester, a sorbitan fatty acid ester, a polyoxyethylene sorbitan fatty acid ester, a polyoxyethylene alkylamine, a glycerol fatty acid ester and an oxyethylene-oxypropylene block copolymer. Surfynols (manufactured by Air Products & Chemicals, Inc.) which is an acetylene polyoxyethylene oxide surface active agent is also preferably used. Further, an amine oxide amphoteric surface active agent such as N,N-dimethyl-N-alkylamine oxide is also preferably used. Moreover, surface active agents described in JP-A-59-157636, pages 37 to 38 and *Research Disclosure*, No.308119 (1989) are also employed. Of the surface active agents, those having a solubility in water of not less than 0.5% at 25° C. are preferred.

The surface tension of ink composition according to the present invention is preferably from 20 to 60 mN/m, more preferably from 25 to 45 mN/m, with or without using the surface active agent.

The viscosity of ink composition according to the present invention is preferably not more than 30 mPa.s, more preferably not more than 20 mPa.s. The viscosity controlling agent may be used for the purpose of controlling viscosity of the ink composition. Examples of the viscosity controlling agent include a water-soluble polymer such as a cellulose or polyvinyl alcohol, and a nonionic surface active agent.

In the ink composition according to the present invention, the cationic, anionic or nonionic surface active agent described above is used as the dispersant or dispersion stabilizing agent, and a fluorine or silicon compound or a chelating agent such as EDTA is used as the defoming agent, if desired.

Preparation Method of Ink Jet Recording Ink

The ink jet recording ink composition for use in the present invention can be prepared by dissolving and/or dispersing the water-soluble dye or oil-soluble dye described above in an aqueous medium. The term "aqueous medium" used in the present invention means and includes water, a mixture of water and a small amount of water-soluble organic solvent and those containing one or more additives, for example, a wetting agent, a stabilizing aget and an antiseptic, if desired.

Preparation methods of aqueous ink jet recording ink composition are described in detail in JP-A-5-148436, JP-A-5-295312, JP-A-7-97541, JP-A-7-82515 and JP-A-7-118584, and these methods can be utilized for the preparation of ink jet recording ink composition for use in the present invention.

In the present invention, when the dye and high-boiling point organic solvent to be used are hydrophobic, they are subjected to emulsifying dispersion in an aqueous medium. At the emulsifying dispersion, a low-boiling point organic solvent may be used in view of improving emulsification, if desired. The low-boiling point organic solvent includes an organic solvent having a boiling point of from 30 to 150° C. at a normal pressure. Examples of the low-boiling point organic solvent preferably used include an ester (e.g., ethyl acetate, butyl acetate, ethyl propionate, β-ethoxyethyl acetate or methyl cellosolve acetate), an alcohol (e.g., isopropyl alcohol, n-butyl alcohol or sec-butyl alcohol), a ketone (e.g., methyl isobutyl ketone, methyl ethyl ketone or cyclohexanone), an amide (e.g., dimethylformamide or N-methylpyrrolidone), and an ether (e.g., tetrahydrofuran, dioxane), but the present invention should not be construed as being limited thereto.

The emulsifying dispersion is performed by dispersing an oil phase prepared by dissolving the dye in the high-boiling point organic solvent or a mixed solvent of the high-boiling point organic solvent and the low-boiling point organic solvent, if desired, in an aqueous phase mainly composed of water in order to form fine oil droplets of the oil phase. In this case, to either the water phase, the oil phase or both thereof, an additive, for example, a surface active agent, a wetting agent, a dye stabilizing agent, an emulsion stabilizing agent, an antiseptic or an antimold as described hereinafter is added, if desired.

As the emulsifying method, a method of adding the oil phase to the water phase is ordinarily used. A so-called phase inversion emulsifying method wherein the water phase is added to the oil phase is also preferably used.

The boiling point of high-boiling point organic solvent for use in the present invention is preferably not less than 150° C., more preferably not less than 170° C.

Specific examples of the high-boiling point organic solvent for use in the present invention include a phthalic acid ester (e.g., dibutyl phthalate, dioctyl phthalate, dicyclohexyl phthalate, di-2-ethylhexyl phthalate, didecyl phthalate, bis(2,4-di-tert-amylphenyl) isophthalate or bis(1,1-diethylpropyl) phthalate, a phosphoric acid or phosphonic acid ester (e.g., diphenyl phophate, triphenyl phosphate, tricresyl phosphate, 2-ethylhexyl diphenyl phosphate, dioctyl butyl phosphate, tricyclohexyl phosphate, tri-2-ethylhexyl phosphate, tridodecyl phosphate or di-2-ethylhexyl phenyl phosphate), a benzoic acid ester (e.g., 2-ethylhexyl benzoate, 2, 4-dichlorobenzoate, dodecyl benzoate or 2-ethylhexyl-p-hydroxybenzoate), an amide (e.g., N,N-diethyldodecanamide or N,N-diethyllaurylamide), an alcohol or phenol (e.g., isostearyl alcohol or 2,4-di-tert-amylphenol), an aliphatic ester (e.g., dibutoxyethyl succinate, di-2-ethylhexyl succinate, 2-hexyldecyl tetradecanoate, tributyl citrate, diethyl azelate, isostearyl lactate or trioctyl citrate), an aniline derivative (for example, N,N-dibutyl-2-butoxy-5-tert-octylaniline), a chlorinated paraffin (e.g., paraffin having a chlorine content of from 10 to 80%), a trimesic acid ester (e.g., tributyl trimesate), dodecylbenzene, diisopropylnaphthalene, a phenol (e.g., 2,4-di-tert-amylphenol, 4-dodecyoxyphenol, 4-dodecyloxycarbonylphenol or 4-(4-dodecyloxyphenylsulfonyl)phenol), a carboxylic acid (e.g., 2-(2,4-di-tert-amylphenoxybutyric acid or 2-ethoxyoctadecanoic acid), and an alkylphosphoric acid (e.g., di-(2-ethylhexyl)phosphoric acid or diphenylphosphoric acid). An organic solvent having a boiling point of from 30 to about 160° C. (e.g., ethyl acetate, butyl acetate, ethyl propionate, methyl ethyl ketone, cyclohexanone, 2-ethoxyethyl acetate or dimethylformamide) may be used together with the high-boiling point organic solvent as an auxiliary solvent. The high-boiling point organic solvent is used preferably from 0.01 to 10 times by weight, more preferably from 0.05 to 5 times by weight of the dye.

The high-boiling point organic solvents may be used individually or as a mixture of two or more thereof, for example, a mixture of tricresyl phosphate and dibutyl phthalate, a mixture of trioctyl phosphate and di-(2-ethylhexyl) sebacate or a mixture of dibutyl phthalate and poly(N-tert-butylacrylamide).

Other specific examples of the high-boiling point organic solvents for use in the present invention and synthesis methods thereof are described, for example, in U.S. Pat. Nos. 2,322,027, 2,533,514, 2,772,163, 2,835,579, 3,594, 171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, European Patents 276, 319A, 286, 253A, 289,820A, 309,158A, 309,159A, 309, 160A, 509,311A and 510,576A, East German Patents 147, 009, 157,147, 159,573 and 225,240A, British Patent 2,091, 124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-78745, JP-A-1-101543, JP-A-1-102454, JP-A-2-792, JP-A-2-4239, JP-A-2-43541, JP-A-4-29237, JP-A-4-30165, JP-A-4-232946 and JP-A-4-346338.

The high-boiling point organic solvent is used preferably from 0.01 to 10 times by weight, more preferably from 0.05 to 5 times by weight of the dye.

Various surface active agents can be used for emulsifying dispersion of the dye according to the present invention. For instance, an anionic surface active agent including, e.g., a fatty acid salt, an alkylsulfate, an alkylbenzenesulfonate, an alkylnaphthalenesulfonate, a dialkylsulfosuccinate, an alkylphosphate, a naphthalenesulfonic acid-formalin condensate and a polyoxyethylene alkylsulfate, and a nonionic surface active agent including, e.g., a polyoxyethylene alkyl ether, a polyoxyethylene alkyl aryl ether, a polyoxyethylene fatty acid ester, a sorbitan fatty acid ester, a polyoxyethylene sorbitan fatty acid ester, a polyoxyethylene alkylamine, a glycerol fatty acid ester and an oxyethylene-oxypropylene block copolymer are preferably used. Surfynols (manufactured by Air Products & Chemicals, Inc.) which is an acetylene polyoxyethylene oxide surface active agent is also preferably used. Further, an amine oxide amphoteric surface active agent such as N,N-dimethyl-N-alkylamine oxide is also preferably used. Moreover, surface active agents described in JP-A-59-157636, pages 37 to 38 and *Research Disclosure,* No. 308119 (1989) are also employed.

For the purpose of improving stability just after the emulsification, a water-soluble polymer is used together with the surface active agent described above. Examples of the water-soluble polymer preferably used include polyvinyl alcohol, polyvinyl pyrrolidone, polyethylene oxide, polyacrylic acid, polyacrylamide and a copolymer thereof. A natural water-soluble polymer such as polysaccharide, casein or gelatin is also preferably used. Further, in order to stabilize the dye dispersion, a polymer which is substantially insoluble in the aqueous medium, for example, a polyvinyl polymer obtained by polymerization of a monomer, e.g., an acrylate, a methacrylate, a vinyl ester, an acrylamide, a methacrylamide, an olefin, a styrene, a vinyl ether or an acrylonitrile, a polyurethane, a polyester, a polyamide, a polyurea or a polycarbonate can be used together. It is preferred that such a polymer has $-SO^{2-}$ or $-COO^-$. In the case of using the polymer which is substantially insoluble in the aqueous medium, the amount thereof is preferably not more than 20% by weight, more preferably not more than 10% by weight of the high-boiling point organic solvent.

When the hydrophobic dye is dispersed by the emulsifying dispersion to prepare an aqueous ink composition, it is particularly important to control a particle size of the dye dispersion. In order to increase color purity and density of image formed by an ink jet recording method, it is essential to make an average particle size of the dye dispersion small. The volume average particle size thereof is preferably in a range of from 5 to 100 nm.

It becomes apparent that the presence of coarse particles has also very large influence on print characteristics. Specifically, the coarse particles cause clogging of a nozzle of head or formation of dirt in the nozzle, even if no clogging occur, and as a result, ejection of ink is interrupted or ink ejection is twisted, thereby adversely affecting print characteristics. It is found that to control a number of particles having a particle size of 5 $\mu$m or more and a number of particles having a particle size of 1 $\mu$m or more per 1 $\mu$l of the ink to not more than 10 and not more than 1,000, respectively is important in order to solve such problems.

In order to remove such coarse particles, a known method, for example, a centrifugal method or a microfiltration method can be used. The removing operation may be conducted just after the emulsifying dispersion or just before filling in a cartridge after the addition of various additives such as a wetting agent or a surface active agent to the emulsified dispersion.

The use of a mechanical emulsifying apparatus is effective for the purpose of reducing an average particle size and preventing the occurrence of coarse particles.

A known apparatus, for example, a simple stirrer, an impeller type stirring machine, an in-line type stirring machine, a mill such as a colloid mill or an ultrasonic type stirring machine can be used as the emulsifying apparatus. A high pressure homogenizer is particularly preferably employed.

The high pressure homogenizer is described in detail, for example, in U.S. Pat. No. 4,533,254 and JP-A-6-47264, and is also available as a commercial apparatus, for example, Gaulin homogenizer (manufactured by A.P.V. Gaulin Inc.), Microfluidizer (manufactured by Microfluidex Inc.) or Ultimaizer (manufactured by Sugino Machine Ltd.).

Also, a high pressure homogenizer having a mechanism of atomizing in an extra-high pressure jet as described in U.S. Pat. No. 5,720,551 is particularly useful in the emulsifying dispersion according to the present invention. Examples of the emulsifying apparatus utilizing the extra-high pressure jet include DeBEE 2000 (manufactured by Bee International Ltd.).

A pressure at emulsifying by the high pressure emulsifying dispersion apparatus is preferably not less than 500 bar, more preferably not less than 600 bar and still more preferably not less than 1,800 bar.

It is particularly preferred to use two or more kinds of emulsifying apparatus, for example, passing a high pressure homogenizer after emulsifying by a stirring emulsifying apparatus. Further, a method wherein an emulsified dispersion obtained by using such an emulsifying apparatus is passed through a high pressure homogenizer after the addition of various additives such as a wetting agent or a surface active agent thereto but before filling it in a cartridge is preferred.

When the emulsified dispersion contains the low-boiling point organic solvent in addition to the high-boiling point organic solvent, it is preferred to remove the low-boiling point organic solvent in view of stability of the emulsified dispersion and safety and sanitation. Various known methods can be used for removing the low-boiling point organic solvent depending on the kind of solvent. Specifically, evaporation, vacuum evaporation or ultrafiltration can be utilized. The removal of low-boiling point organic solvent is preferably conducted as soon as possible after the emulsifying dispersion.

Ink Jet Image Recording Method and Image-receiving Material

For the formation of image by the ink jet image recording method of the present invention, a known image-receiving material, for example, a plain paper, a resin-coated paper, a special paper for ink jet recording as described, for example, in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, a film, paper for common use in electrophotography and ink jet, cloth, glass, metal or ceramics can be used.

The recording paper or recording film which is used for recording image by the ink jet image recording method of the present invention is described in detail below. A support for the recording paper or recording film comprises a chemical pulp such as LBKP or NBKP, a mechanical pulp such as GP, PGW, RMP, TMP, CTMP, CMP or CGP, or a waste paper pulp such as DIP and, if desired, a conventionally known additive, for example, a pigment, a binder, a sizing agent, a fixing agent, a cationic agent or paper strengthening agent, and is prepared by using various kinds of machines, for example, a Fourdrinier paper machine or a cylinder paper machine. In addition to the paper, a synthetic paper and a plastic film sheet may also be used as the support. The thickness of support is preferably from 10 to 250 μm and the basis weight thereof is preferably from 10 to 250 g/m². An ink-receptive layer and a back-coat layer may be provided directly on the support or these layers are provided on the support after size-press with starch or polyvinyl alcohol or providing an anchor-coat layer. The support may be subjected to smoothing treatment using a calendaring machine, for example, a machine calendar, a TG calendar or a soft calendar. As the support, a paper laminated on both surfaces with a polyolefin (e.g., polyethylene, polystyrene, polyethylene terephthalate, polybutene or a copolymer thereof) and a plastic film are preferably used in the present invention. It is preferred to added a white pigment (e.g., titanium oxide or zinc oxide) or a dye for coloring (e.g., cobalt blue, ultramarine or neodymium oxide) to the polyolefin.

The ink-receptive layer provided on the support contains a pigment and an aqueous binder. The pigment is preferably a white pigment. Examples of the white pigment include an inorganic white pigment, e.g., calcium carbonate, kaolin, talc, clay, diatom earth, synthetic amorphous silica, aluminum silicate, magnesium silicate, calcium silicate, aluminum hydroxide, alumina, lithopone, zeolite, barium sulfate, potassium sulfate, titanium dioxide, zinc sulfide or zinc carbonate, and an organic pigment, e.g., a styrene type pigment, acrylic type pigment, a urea resin or a melamine resin. As the white pigment contained in the ink-receptive layer, a porous inorganic pigment is preferably used and synthetic amorphous silica which has a large porous area is particularly preferred. The synthetic amorphous silica includes silicic anhydride obtained by a dry manufacturing method and hydrous silicic acid obtained by a wet manufacturing method. While both of these silicic acid are used, the hydrous silicic acid is particularly preferred. Two or more kinds of pigments are used in combination.

Examples of the aqueous binder used in the ink-receptive layer include a water-soluble high-molecular weight substance, e.g., polyvinyl alcohol, silanol-modified polyvinyl alcohol, starch, cationized starch, casein, gelatin, carboxymethyl cellulose, hydroxyethyl cellulose, polyvinyl pyrrolidone, polyalkylene oxide or a polyalkylene oxide derivative, and a water-dispersible high-molecular weight substance, e.g., a styrene-butadiene latex or an acrylic emulsion. The aqueous binders may be used individually or as a mixture of two or more thereof. Of the aqueous binders, polyvinyl alcohol and silanol-modified polyvinyl alcohol are particularly preferred in view of adhesion to pigment and an anti-peeling property of the ink-receptive layer.

The ink-receptive layer may contain other additives, for example, a mordant, a water-resistance imparting agent, a light-fastness improving agent, a surface active agent or a hardening agent, in addition to the pigment and aqueous binding agent (aqueous binder).

The mordant to be used in the ink-receptive layer is preferably immobilized. For such a purpose, a polymer mordant is preferably used.

Examples of the polymer mordant are described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing a polymer mordant described in JP-A-1-161236, pages 212 to 215 is particularly preferred. By using the polymer mordant described in JP-A-1-161236, color images having excellent image quality are obtained and light-fastness of the images is improved.

The water-resistance imparting agent is effective to make the image water-resistant. As the water-resistance imparting agent, a cationic resin is preferably used. Examples of the cationic resin include polyamide polyamine epichlorohydrin, polyethyleneimine, polyaminesulfone, dimethyldiallyl ammonium chloride polymer, cationic polyacrylamide and colloidal silica. Of the cationic resins, polyamide polyamine epichlorohydrin is particularly preferred. The content of the cationic resin is preferably from 1 to 15% by weight, more preferably from 3 to 10% by weight, based on the whole solid content of the ink-receptive layer.

Examples of the light-fastness improving agent include zinc sulfate, zinc oxide, an antioxidant of hindered amine series and an ultraviolet absorbing agent of benzophenone series or benzotriazole series. Of the light-fastness improving agent, zinc sulfate is particularly preferred.

The surface active agent functions as a coating aid, a peeling-improving agent, a slipping-improving agent or an antistatic agent. Examples of the surface active agent are described in JP-A-62-173463 and JP-A-62-183457.

In place of the surface active agent, an organic fluoro compound may be used. The organic fluoro compound is preferably hydrophobic. Examples of the organic fluoro compound include a fluorine surface active agent, an oily fluorine compound (e.g., fluorine oil) and a solid fluorine compound (e.g., tetrafluoro ethylene resin). Examples of the organic fluoro compound are described in JP-B-57-9053, columns 8 to 17, JP-A-61-20994 and JP-A-62-135826.

Examples of the hardening agent for use in the present invention include those described in JP-A-1-161236, page 222.

Other additives incorporated into the ink-receptive layer include, for example, a pigment-dispersing agent, a viscosity-increasing agent, a defoaming agent, a dye, a fluorescent whitening agent, an antiseptic, a pH controlling agent, a matting agent and a hardening agent.

The ink-receptive layer may comprise one layer or two layers.

The recording paper or recording film may have a back coat layer. Examples of component to be added to the back coat layer include a white pigment, an aqueous binding agent (aqueous binder) and other components. Examples of the white pigment contained in the back coat layer include an inorganic white pigment, e.g., precipitated calcium carbonate light, calcium carbonate heavy, kaolin, talc, calcium sulfate, barium sulfate, titanium dioxide, zinc oxide, zinc sulfide, zinc carbonate, satin white, aluminum silicate, diatom earth, calcium silicate, magnesium silicate, synthetic amorphous silica, colloidal silica, colloidal alumina, pseudoboehmite, aluminum hydroxide, alumina, lithopone, zeolite, hydrated halloysite, magnesium carbonate or magnesium hydroxide, and an organic pigment, e.g., a styrene type plastic pigment, an acrylic type plastic pigment, polyethylene, a microcapsule, a urea resin or a melamine resin.

Examples of the aqueous binder for use in the back coat layer include a water-soluble high-molecular weight substance, e.g., a styrene/maleic acid salt copolymer, a styrene/acrylic acid salt copolymer, polyvinyl alcohol, silanol-modified polyvinyl alcohol, starch, cationized starch, casein, gelatin, carboxymethyl cellulose, hydroxyethyl cellulose or polyvinyl pyrrolidone, and a water-dispersible high-molecular weight substance, e.g., a styrene-butadiene latex or an acrylic emulsion.

Other components incorporated into the back coat layer include a defoaming agent, a foam-preventing agent, a dye, a fluorescent whitening agent, an antiseptic and a water-resistance imparting agent.

To the constituting layer (including the back coat layer) of the ink jet recording paper or film may be added a fine polymer particle dispersion. The fine polymer particle dispersion is used for the purpose of improving film properties such as dimension stability, anti-curl, anti-adherence and prevention of crack. The fine polymer particle dispersion is described, for example, in JP-A-62-245258, JP-A-62-136648 and JP-A-62-110066. When a fine polymer particle dispersion having a low glass transition temperature as 40° C. or below is added to a layer containing a mordant, crack and curl of the layer can be prevented. Also, when a fine polymer particle dispersion having a high glass transition temperature is added to the back coat layer, curl of the layer can be prevented.

The ink jet recording system which is utilized in the method of the present invention is not particularly limited, and known systems including, for example, a charge control system wherein ink is ejected by utilizing an electrostatic attractive force, a drop on-demand system (pressure pulse system) utilizing a vibration pressure of a piezoelectric element, a sound ink jet system wherein an electric signal is converted to a sound beam and the sound beam is applied to ink to eject the ink by the emission pressure, and a thermal ink jet (bubble jet) system can be employed.

The ink jet recording system includes a system wherein ink of low concentration called as photoink is frequently ejected in a small area, a system for improving image quality by using plural kinds of ink having substantially same hue but different concentration, and a system using colorless and transparent ink.

EXAMPLE

The present invention will be described in greater detail with reference to the following examples, but the present invention should not be construed as being limited thereto.

<Preparation of Ink Set 101>

To the components shown below was added deionized water up to one liter, the mixture was stirred under heating at 30 to 40° C. for one hour. A pH of the mixture was adjusted to 9 with 10 mol/liter of potassium hydroxide and the mixture was filtered under a reduced pressure using a microfilter having an average pore size of 0.25 $\mu$m to prepare light magenta ink.

| | |
|---|---|
| Magenta dye (101) | 3.75 g |
| Diethyle glycol | 150 g |
| Urea | 37 g |
| Glycerol | 130 g |
| Triethylene glycol monobutyl ether | 130 g |
| Triethanolamine | 6.9 g |
| Benzotriazole | 0.08 g |
| Proxel XL2 | 3.5 g |

Further, magenta ink, light cyan ink, cyan ink, yellow ink and black ink were prepared by changing the species and amounts of dyes and the species and amounts of additives, respectively. Thus, Ink Set 101 shown in Table 5 below was prepared. The amounts of the dyes and other additives shown in Table 5 are represented by a unit of g/l.

TABLE 5

| | | Ink Set 101 | | | | |
|---|---|---|---|---|---|---|
| | Light Magenta | Magenta | Light Cyan | Cyan | Yellow | Black |
| Dye | (101) | (101) | T-2 | T-2 | T-3 | T-5 |
| | 3.75 | 15.0 | 8.75 | 35.0 | 14.7 | 20.0 |
| | | | | | T-4 | T-6 |
| | | | | | 14.0 | 20.0 |
| | | | | | | T-7 |
| | | | | | | 20.0 |
| | | | | | | T-3 |
| | | | | | | 21.0 |
| Diethylene Glycol | 150 | 110 | 200 | 130 | 160 | 20 |
| Urea | 37 | 46 | — | — | — | — |
| Glycerol | 130 | 160 | 150 | 180 | 150 | 120 |
| Triethylene Glycol Monobutyl Ether | 130 | 140 | 130 | 140 | 180 | — |
| Diethylene Glycol Monobutyl Ether | — | — | — | — | — | 230 |
| 2-Pyrrolidone | — | — | — | — | — | 81 |
| Surfynol STG | — | — | — | — | 8.5 | 9.8 |
| Triethanolamine | 6.9 | 7.0 | 6.0 | 6.3 | 0.9 | 17.9 |
| Benzotriazole | 0.08 | 0.07 | 0.08 | 0.08 | 0.06 | 0.06 |
| Proxel XL2 | 3.5 | 1.5 | 1.1 | 1.2 | 1.5 | 1.1 |

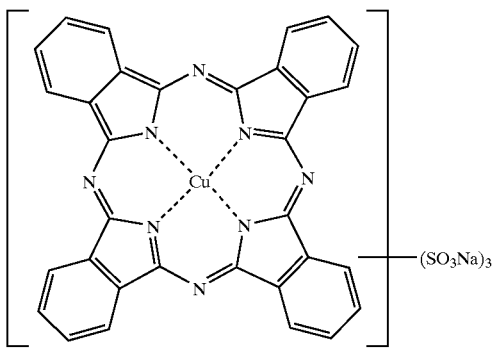

T-2

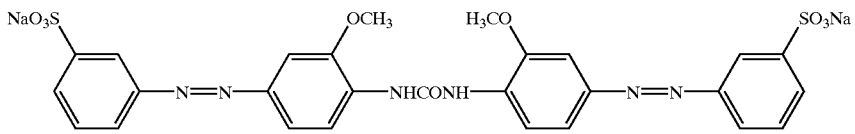

T-3

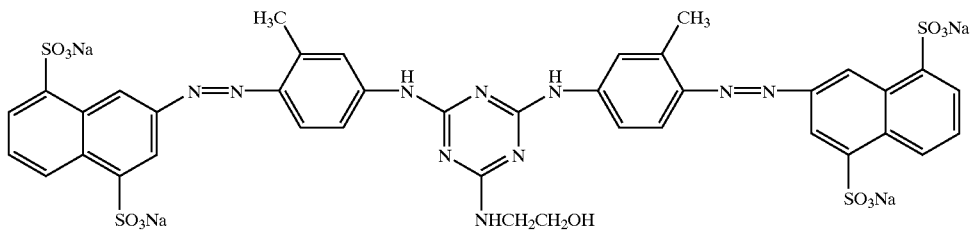

T-4

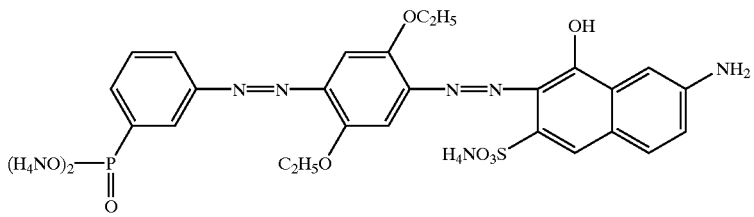

T-5

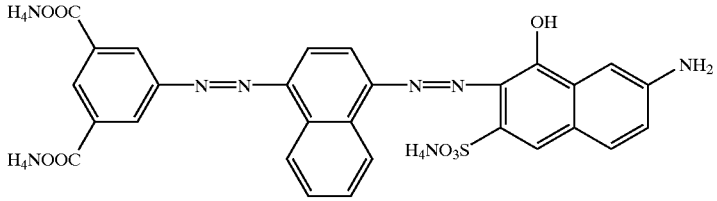

T-6

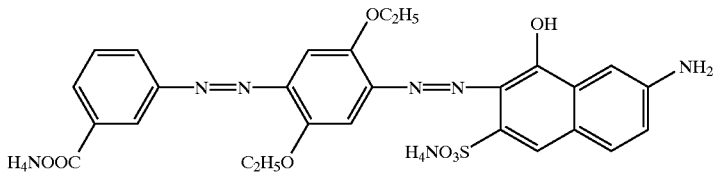

T-7

Example 1

Ink Set 101 was filled in a cartridge of Ink Jet Printer PM670C (manufacture by Seiko Epson Corp.) and printing was conducted using Ink Jet Paper Photo Glossy Paper EX (The paper with the ink-receptive layer including a porous inorganic pigment; manufacture by Fuji Photo Film Co., Ltd.) to form images.

Just after the printing, a liquid prepared by diluting Dispersion of Fine Polymer Particles P-1 with deionized water so as to become a solid content of 5% by weight was ejected from the ink jet printer on the images to coat to have a coating amount of solid content of the dispersion of fine polymer particles of 0.5 g/m², thereby preparing Sample 201.

In the same manner as above, Samples 202 to 205 as shown in Table 6 below were prepared. The coating amount of solid content of the dispersion of fine polymer particles was adjusted to 0.5 g/m² in each sample. When two kinds of the dispersions of fine polymer particles were used in combination, each of the dispersions of fine polymer particles were mixed in an equivalent weight.

The samples thus-prepared were evaluated in the following manner.

(1) Light-Fastness:

Image density (Ci) of the sample just after the preparation was measured by X-rite 310. The sample was irradiated with xenon light (85,000 lux) using a weather meter (manufactured by Atlas Co., Ltd.) for 10 days and then image density (Cf) of the sample was measured to determine a dye remaining ratio (Cf/Ci×100), whereby the light-fastness was evaluated. The dye remaining ratio was determined at 3 points having reflection density of 1, 1.5 and 2 respectively, and a case wherein the dye remaining ratio was not less than 70% at all three points was designated as A, a case wherein the dye remaining ratio was less than 70% at two points was designated as B and a case wherein the dye remaining ratio was less than 70% at all three points was designated as C.

(2) Heat-Fastness:

Reflection density of the sample was measured by X-rite 310 before and after preservation of the sample under a condition of 80° C. for 10 days and a dye remaining ratio was determined in the same manner as above, whereby the heat-fastness was evaluated. The dye remaining ratio was determined at 3 points having reflection density of 1, 1.5 and 2 respectively, and a case wherein the dye remaining ratio was not less than 90% at all three points was designated as A, a case wherein the dye remaining ratio was less than 90% at two points was designated as B and a case wherein the dye remaining ratio was less than 90% at all three points was designated as C.

(3) Waterproofness:

The sample was immersed in still water for 10 seconds and a case wherein change was not observed at all was designated as A, a case wherein some blur was observed was designated as B and a case wherein severe blur was observed and the image quality degraded was designated as C.

The results obtained are shown in Tables 6 and 7 below.

TABLE 6

| Sample No. | Dispersion of Fine Polymer Particles | Waterproofness | Remarks |
|---|---|---|---|
| 201 | P-1 | A | Present Invention |
| 202 | P-2 | A | Present Invention |
| 203 | P-3 | A | Present Invention |
| 204 | P-1 and P-17 | A | Present Invention |
| 205 | — | B | Comparison |

TABLE 7

| Sample No. | Light-Fastness | | | | Heat-Fastness | | | | Remarks |
|---|---|---|---|---|---|---|---|---|---|
| | Y | M | C | BK | Y | M | C | GK | |
| 201 | A | A | A | A | A | A | A | A | Present Invention |
| 202 | A | A | A | A | A | A | A | A | Present Invention |
| 203 | A | A | A | A | A | A | A | A | Present Invention |
| 204 | A | A | A | A | A | A | A | A | Present Invention |
| 205 | A | B | A | A | B | C | C | B | Comparison |

From the results shown in Tables 6 and 7, it is apparent that the samples according to the present invention are excellent in the waterproofness and image preservability, for example, light-fastness and heat-fastness.

Example 2

A liquid prepared by diluting Dispersion of Fine Polymer Particles P-8 with deionized water so as to become a solid content of 5% by weight was ejected from the ink jet printer on a glossy paper to uniformly coat to have a coating amount of solid content of the dispersion of fine polymer particles of 0.6 g/m$^2$, and immediately thereafter images were printed using Ink Set 101, thereby preparing Sample 301.

Further, Dispersion of Fine Polymer Particles P-8 was uniformly coated on the glossy paper to have a coating amount of solid content of the dispersion of fine polymer particles of 0.6 g/m$^2$ in the same manner as in Sample 301, and after the lapse of time sufficient for forming a film of the dispersion of fine polymer particles on the glossy paper, images were printed using Ink Set 101, thereby preparing Sample 302 for comparison.

Samples 301 and 302 were evaluated in the same manner as in Example 1. The results obtained are shown in Tables 8 and 9 below.

TABLE 8

| Sample No. | Dispersion of Fine Polymer Particles | Waterproofness | Remarks |
|---|---|---|---|
| 301 | P-8 | A | Present Invention |
| 302 | P-8 | C | Comparison |

TABLE 9

| Sample No. | Light-Fastness | | | | Heat-Fastness | | | | Remarks |
|---|---|---|---|---|---|---|---|---|---|
| | Y | M | C | BK | Y | M | C | GK | |
| 301 | A | A | A | A | A | A | A | A | Present Invention |
| 302 | A | B | A | A | B | C | C | B | Comparison |

From the results shown in Tables 8 and 9, it is apparent that the sample according to the present invention is excellent in the waterproofness and image preservability, for example, light-fastness and heat-fastness.

<Preparation of Ink Set A-101>

To a mixture of 6 g of High-Boiling Point Organic Solvent (S-1), 10 g of High-Boiling Point Organic Solvent (S-2) and 50 ml of ethyl acetate were dissolved 8 g of Dye (M-7) and 40 g of surface active agent (Emal 20C manufactured by Kao Corp.) at 70° C. To the solution was added 500 ml of deionized water under stirring with a magnetic stirrer to prepare a coarse dispersion of oil-in-water type.

The coarse dispersion was passed through Microfluidizer (manufactured by Microfluidex Inc.) at a pressure of 600 bar 5 times to prepare an emulsion of fine particles. The emulsion was subjected to removal of solvent by a rotary evaporator until odor of the ethyl acetate was gone.

To the fine emulsion of hydrophobic dye thus-obtained were added diethylene glycol, glycerol, urea and other additives as shown in Table 10 below and then was added 900 ml of deionized water. A pH of the mixture was adjusted to 9 with 10 mol/liter of potassium hydroxide to prepare light magenta ink shown in Table 10 below. A volume average particle size of the resulting emulsified dispersion ink was measured by Microtrack UPA (manufactured by Nikkiso Co., Ltd.) and it was 51 nm.

The compositions shown in Table 10 are those after the removal of solvent by evaporation.

Further, magenta ink, light cyan ink, cyan ink, yellow ink and black ink were prepared by changing the species and amounts of dyes, the amounts of high-boiling point organic solvents and the species and amounts of additives, respectively. Thus, Ink Set A-101 shown in Table 10 below was prepared. The amounts of the dyes, solvents and other additives shown in Table 10 are represented by a unit of g/l.

TABLE 10

| | \multicolumn{6}{c}{Ink Set A-101} | | | | | |
|---|---|---|---|---|---|---|
| | Light Magenta | Magenta | Light Cyan | Cyan | Yellow | Black |
| Dye | (M-7) 5.00 | (M-7) 20.0 | (A-2) 9.3 | (A-2) 37.2 | (A-3) 27.2 | (M-7) 10.0 (A-2) 18.6 (A-3) 13.6 |
| High-Boiling Point Organic Solvent | S-1 3.25 S-2 6.25 | S-1 14.52 S-2 25.52 | S-1 6.75 S-2 11.9 | S-1 27.0 S-2 47.6 | S-1 19.74 S-2 34.7 | S-1 30.6 S-2 53.8 |
| Emal 20 C. | 25.0 | 100 | 46.5 | 186.0 | 136.0 | 211.0 |
| Diethylene Glycol | 87.5 | 87.5 | 87.5 | 87.5 | 87.5 | 87.5 |
| Urea | 46.0 | 46.0 | 46.0 | 46.0 | 46.0 | 46.0 |
| Glycerol | 40.0 | 40.0 | 40.0 | 40.0 | 40.0 | 40.0 |
| Triethanolamine | 7.5 | 7.5 | 7.5 | 7.5 | 7.5 | 7.5 |
| Benzotriazole | 0.075 | 0.075 | 0.075 | 0.075 | 0.075 | 0.075 |
| Proxel XL2 | 2.5 | 2.5 | 2.5 | 2.5 | 2.5 | 2.5 |
| Deionized water up to one liter | | | | | | |

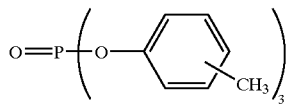

S-1

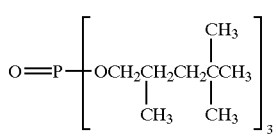

S-2

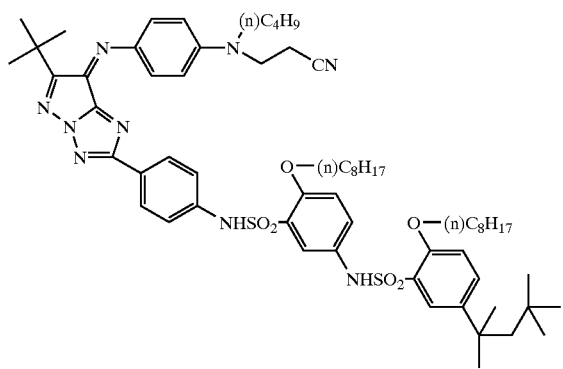

M-7

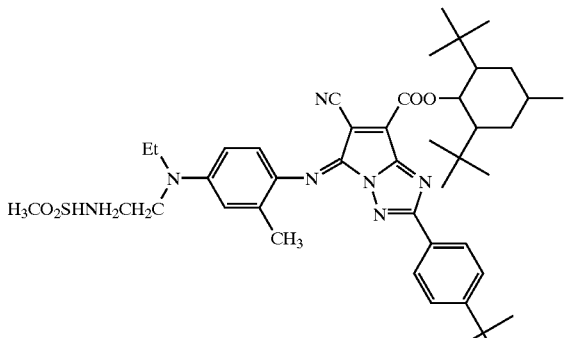

A-2

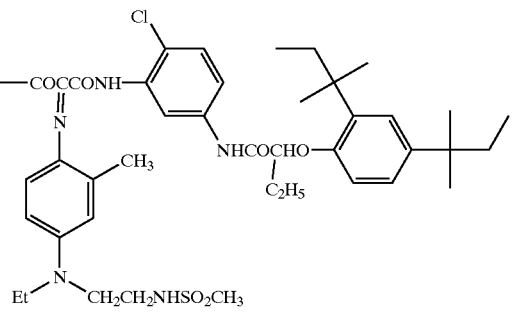

A-3

Example 3

Ink Set A-101 was filled in a cartridge of Ink Jet Printer PM670C (manufacture by Seiko Epson Corp.) and printing was conducted using Ink Jet Paper Photo Glossy Paper EX (manufacture by Fuji Photo Film Co., Ltd.) to form images.

Just after the printing, a liquid prepared by diluting Dispersion of Fine Polymer Particles P-1 with deionized water so as to become a solid content of 5% by weight was ejected from the ink jet printer on the images to coat to have a coating amount of solid content of the dispersion of fine polymer particles of 0.5 g/m$^2$, thereby preparing Sample A-201.

In the same manner as above, Samples A-202 to A-205 as shown in Table 11 below were prepared. The coating amount of solid content of the dispersion of fine polymer particles was adjusted to 0.5 g/m$^2$ in each sample. When two kinds of the dispersions of fine polymer particles were used in combination, each of the dispersions of fine polymer particles were mixed in an equivalent weight.

The samples thus-prepared were evaluated in the following manner.

(1) Light-Fastness:

Image density (Ci) of the sample just after the preparation was measured by X-rite 310. The sample was irradiated with xenon light (85,000 lux) using a weather meter (manufactured by Atlas Co., Ltd.) for 10 days and then image density (Cf) of the sample was measured to determine a dye remaining ratio (Cf/Ci×100), whereby the light-fastness was evaluated. The dye remaining ratio was determined at 3 points having reflection density of 1, 1.5 and 2 respectively, and a case wherein the dye remaining ratio was not less than 70% at all three points was designated as A, a case wherein the dye remaining ratio was less than 70% at two points was designated as B and a case wherein the dye remaining ratio was less than 70% at all three points was designated as C.

(2) Heat-Fastness:

Reflection density of the sample was measured by X-rite 310 before and after preservation of the sample under a condition of 80° C. for 10 days and a dye remaining ratio was determined in the same manner as above, whereby the heat-fastness was evaluated. The dye remaining ratio was determined at 3 points having reflection density of 1, 1.5 and 2 respectively, and a case wherein the dye remaining ratio was not less than 90% at all three points was designated as A, a case wherein the dye remaining ratio was less than 90% at two points was designated as B and a case wherein the dye remaining ratio was less than 90% at all three points was designated as C.

(3) Waterproofness:

The sample was immersed in still water for 10 seconds and a case wherein change was not observed at all was designated as A, a case wherein some blur was observed was designated as B and a case wherein severe blur was observed and the image quality degraded was designated as C.

The results obtained are shown in Tables 11 and 12 below.

TABLE 11

| Sample No. | Dispersion of Fine Polymer Particles | Waterproofness | Remarks |
|---|---|---|---|
| A-201 | P-1 | A | Present Invention |
| A-202 | P-2 | A | Present Invention |
| A-203 | P-3 | A | Present Invention |
| A-204 | P-1 and P-17 | A | Present Invention |
| A-205 | — | B | Comparison |

TABLE 12

| Sample No. | Light-Fastness | | | | Heat-Fastness | | | | Remarks |
|---|---|---|---|---|---|---|---|---|---|
| | Y | M | C | BK | Y | M | C | GK | |
| A-201 | A | A | A | A | A | A | A | A | Present Invention |
| A-202 | A | A | A | A | A | A | A | A | Present Invention |
| A-203 | A | A | A | A | A | A | A | A | Present Invention |
| A-204 | A | A | A | A | A | A | A | A | Present Invention |
| A-205 | B | C | C | A | B | C | C | C | Comparison |

From the results shown in Tables 11 and 12, it is apparent that the samples according to the present invention are excellent in the waterproofness and image preservability, for example, light-fastness and heat-fastness.

Example 4

A liquid prepared by diluting Dispersion of Fine Polymer Particles P-8 with deionized water so as to become a solid content of 5% by weight was ejected from the ink jet printer on a glossy paper to uniformly coat to have a coating amount of solid content of the dispersion of fine polymer particles of 0.6 g/m$^2$, and immediately thereafter images were printed using Ink Set A-101, thereby preparing Sample A-301.

Further, Dispersion of Fine Polymer Particles P-8 was uniformly coated on the glossy paper to have a coating amount of solid content of the dispersion of fine polymer particles of 0.6 g/m$^2$ in the same manner as in Sample A-301, and after the lapse of time sufficient for forming a film of the dispersion of fine polymer particles on the glossy paper, images were printed using Ink Set A-101, thereby preparing Sample A-302 for comparison.

Samples A-301 and A-302 were evaluated in the same manner as in Example 1. The results obtained are shown in Tables 13 and 14 below.

TABLE 13

| Sample No. | Dispersion of Fine Polymer Particles | Waterproofness | Remarks |
|---|---|---|---|
| A-301 | P-8 | A | Present Invention |
| A-302 | P-8 | C | Comparison |

TABLE 14

| Sample No. | Light-Fastness | | | | Heat-Fastness | | | | Remarks |
|---|---|---|---|---|---|---|---|---|---|
| | Y | M | C | BK | Y | M | C | GK | |
| A-301 | A | A | A | A | A | A | A | A | Present Invention |
| A-302 | A | B | A | A | B | C | C | B | Comparison |

From the results shown in Tables 13 and 14, it is apparent that the sample according to the present invention is excellent in the waterproofness and image preservability, for example, light-fastness and heat-fastness.

According to the ink jet image recording method of the present invention, image recording with high ejection stability and excellent in hue and particularly in waterproofness and weather fastness can be performed.

While the present invention has been described in detail and with reference to specific embodiments thereof, it will be apparent to one skilled in the art that various changes and modifications can be made therein without departing from the spirit and scope thereof.

What is claimed is:

1. An ink jet image recording method comprising:
    forming an image by ejecting an ink jet recording ink composition comprising one of a water-soluble dye and an oil-soluble dye onto an image-receiving material;
    applying a solution comprising a dispersion of fine polymer particles to the image-receiving material simultaneously with or after the forming of the image; and
    converting the dispersion of fine polymer particles to form a film.

2. The ink jet image recording method according to claim 1, wherein the polymer is a dissociation group-containing polymer selected from the group consisting of a vinyl polymer, polyurethane, polyester, polyamide, polyurea and polycarbonate.

3. The ink jet image recording method according to claim 2, wherein the dissociation group-containing polymer is a dissociation group-containing polymer comprising a group selected from the group consisting of a cationic dissociation group and an anionic dissociation group.

4. The ink jet image recording method according to claim 2, wherein the content of dissociation groups in the dissociation group-containing polymer is from 0.1 mmol/g to 3.0 mmol/g.

5. The ink jet image recording method according to claim 1, wherein the recording is conducted upon an image-receiving material, the image-receiving material comprising an ink receiving layer disposed on a support, with the ink receiving layer including a porous inorganic pigment.

6. The ink jet image recording method according to claim 1, wherein a glass transition temperature (Tg) of the polymer in the dispersion of fine polymer particles is from −40 to 160° C.

7. The ink jet image recording method according to claim 1, wherein a coating amount of the dispersion of fine polymer particles is from 0.1 to 10 g/m$^2$ in terms of the solid content.

8. An ink jet image recording method comprising:
    applying a solution comprising a dispersion of fine polymer particles to an image-receiving material; and
    ejecting an ink jet recording ink composition comprising one of a water-soluble dye and an oil-soluble dye onto the image-receiving material for formation of an image, while the dispersion of fine polymer particles on the image-receiving material maintains a condition in which the ink jet recording ink composition is able to pass therethrough.

9. The ink jet image recording method according to claim 8, wherein the polymer is a dissociation group-containing polymer selected from the group consisting of a vinyl polymer, polyurethane, polyester, polyamide, polyurea and polycarbonate.

10. The ink jet image recording method according to claim 9, wherein the dissociation group-containing polymer is a dissociation group-containing polymer comprising a group selected from the group consisting of a cationic dissociation group and an anionic dissociation group.

11. The ink jet image recording method according to claim 9, wherein the content of dissociation groups in the dissociation group-containing polymer is from 0.1 mmol/g to 3.0 mmol/g.

12. The ink jet image recording method according to claim 8, wherein the recording is conducted upon an image-receiving material, the image-receiving material comprising an ink receiving layer disposed on a support, with the ink receiving layer including a porous inorganic pigment.

13. The ink jet image recording method according to claim 8, wherein a glass transition temperature (Tg) of the polymer in the dispersion of fine polymer particles is from −40 to 160° C.

14. The ink jet image recording method according to claim 8, wherein a coating amount of the dispersion of fine polymer particles is from 0.1 to 10 g/m$^2$ in terms of the solid content.

15. The inkjet image recording method of claim 8, further comprising converting the dispersion of fine polymer particles to form a film.

16. An ink jet image recording method comprising:
    forming an image by ejecting an ink jet recording ink composition comprising one of a water-soluble dye and an oil-soluble dye onto an image-receiving material;
    applying a solution comprising a dispersion of fine polymer particles to the image-receiving material simultaneously with or after the forming of the image; and
    converting the dispersion of fine polymer particles to form a film,
    wherein the dispersion of fine polymer particles comprises a polymer having an ethylenically unsaturated group in the main chain or side chain thereof.

17. The ink jet image recording method according to claim 16, wherein the polymer is one of a homopolymer and a copolymer both comprising resin selected from the group consisting of acrylic or methacrylic resin, styrene resin, conjugated diene resin, vinyl acetate resin and polyolefin resin.

18. An ink jet image recording method comprising:
    applying a solution comprising a dispersion of fine polymer particles to an image-receiving material; and
    ejecting an ink jet recording ink composition comprising one of a water-soluble dye and an oil-soluble dye onto the image-receiving material for formation of an image, while the dispersion of fine polymer particles on the image-receiving material maintains a condition in which the ink jet recording ink composition is able to pass therethrough,
    wherein the dispersion of fine polymer particles comprises a polymer having an ethylenically unsaturated group in the main chain or side chain thereof.

19. The ink jet image recording method according to claim 18, wherein the polymer is one of a homopolymer and a copolymer both comprising resin selected from the group consisting of acrylic or methacrylic resin, styrene resin, conjugated diene resin, vinyl acetate resin and polyolefin resin.

20. An ink jet image recording method comprising:

forming an image by ejecting an ink jet recording ink composition comprising one of a water-soluble dye and an oil-soluble dye onto an image-receiving material; and applying a solution comprising a dispersion of fine polymer particles to the image-receiving material simultaneously with or after the forming of the image;

wherein the ink jet recording ink composition comprises a water-soluble dye represented by formula (A-I):

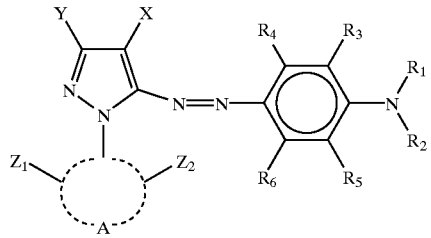

(A-I)

wherein X represents an electron attractive group having a Hammett's substituent constant $\sigma_p$ value of not less than 0.20; $R_1$, $R_2$, $R_3$, $R_4$, $R_5$, $R_6$ and Y, which may be the same or different, each represents a hydrogen atom, a halogen atom, an alkyl group, a cycloalkyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, a sulfinyl group, a phosphoryl group, acyl group or an ionic hydrophilic group; $R_1$ and $R_2$, $R_1$ and $R_3$ or $R_2$ and $R_5$ may combine with each other to form a ring; $Z_1$ and $Z_2$, which may be the same or different, each represents a hydrogen atom, a halogen atom, an alkyl group, a cycloalkyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, a sulfinyl group, a phosphoryl group, an acyl group or an ionic hydrophilic group; A represents a non-metallic atomic group necessary to form a 5-membered to 8-membered ring which may be a saturated ring or have an unsaturated bond, at least three atoms of the non-metallic atomic group are bonded to the nitrogen atom of the pyrazole ring, $Z_1$ and $Z_2$, respectively, and the atom bonding to the nitrogen atom of the pyrazole ring is connected to both the atom bonding to $Z_1$ and the atom bonding to $Z_2$; provided that at least one of $R_1$, $R_2$, $R_3$, $R_4$, $R_5$, $R_6$, X, Y, $Z_1$, $Z_2$ and A represents an ionic hydrophilic group or has an ionic hydrophilic group as a substituent.

21. An ink jet image recording method comprising:

applying a solution comprising a dispersion of fine polymer particles to an image-receiving material; and ejecting an ink jet recording ink composition comprising one of a water-soluble dye and an oil-soluble dye onto the image-receiving material for formation of an image, while the dispersion of fine polymer particles on the image-receiving material maintains a condition in which the ink jet recording ink composition is able to pass therethrough;

wherein the ink jet recording ink composition comprises a water-soluble dye represented by formula (A-I):

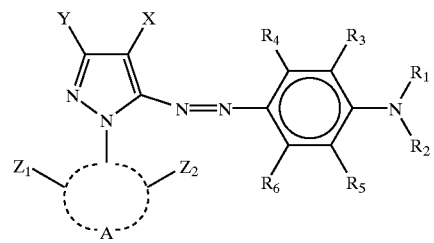

(A-I)

wherein X represents an electron attractive group having a Hammett's substituent constant $\sigma_p$ value of not less than 0.20; $R_1$, $R_2$, $R_3$, $R_4$, $R_5$, $R_6$ and Y, which may be the same or different, each represents a hydrogen atom, a halogen atom, an alkyl group, a cycloalkyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, a sulfinyl group, a phosphoryl group, an acyl group or an ionic hydrophilic group; $R_1$ and $R_2$, $R_1$ and $R_3$ or $R_2$ and $R_5$ may combine with each other to form a ring; $Z_1$ and $Z_2$, which may be the same or different, each represents a hydrogen atom, a halogen atom, an alkyl group, a cycloalkyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, a sulfinyl group, a phosphoryl group, an acyl group or an ionic hydrophilic group; A represents a non-metallic atomic group necessary to form a 5-membered to 8-membered ring which may be a saturated ring or have an unsaturated bond, at least three atoms of the non-metallic atomic group are bonded to the nitrogen atom of the pyrazole ring, $Z_1$ and $Z_2$, respectively, and the atom bonding to the nitrogen atom of the pyrazole ring is connected to both the atom bonding to $Z_1$ and the atom bonding to $Z_2$; provided that at least one of $R_1, R_2, R_3, R_4, R_5, R_6, X, Y, Z_1, Z_2$, and A represents an ionic hydrophilic group or has an ionic hydrophilic group as a substituent.

22. An ink jet image recording method comprising:

forming an image by ejecting an ink jet recording ink composition comprising one of a water-soluble dye and an oil-soluble dye onto an image-receiving material; and applying a solution comprising a dispersion of fine polymer particles to the image-receiving material simultaneously with or after the forming of the image;

wherein the ink jet recording ink composition comprises a dye dispersion comprising an aqueous medium dispersed therein a high-boiling point organic solvent comprising an oil-soluble dye represented by formula (B-I) or (B-II) dissolved therein:

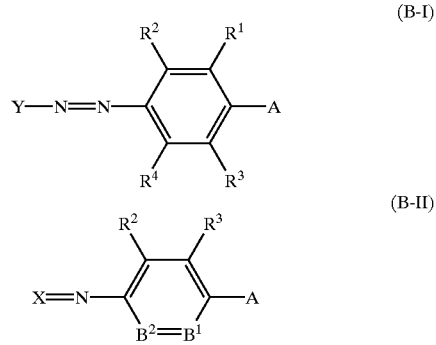

wherein $R^1$, $R^2$, $R^3$ and $R^4$, which may be the same or different, each represents a hydrogen atom, a halogen atom, an aliphatic group, an aromatic group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, a sulfinyl group, a phosphoryl group, an acyl group, a carboxyl group or a sulfo group; A represents —$NR^5R^6$ or a hydroxy group; $R^5$ and $R^6$, which may be the same or different, each represents a hydrogen atom, an aliphatic group, an aromatic group or a heterocyclic group; $R^5$ and $R^6$ may combine with each other to form a ring together with the nitrogen atom; $B^1$ represents =$C(R^3)$— or =N—; $B^2$ represents —$C(R^4)$= or —N=; $R^1$ and $R^5$, $R^3$ and $R^6$ and/or $R^1$ and $R^2$ may combine with each other to form an aromatic ring or a heterocyclic ring; X represents a photographic color coupler residue; and Y represents an unsaturated heterocyclic group.

23. An ink jet image recording method comprising:

applying a solution comprising a dispersion of fine polymer particles to an image-receiving material; and ejecting an ink jet recording ink composition comprising one of a water-soluble dye and an oil-soluble dye onto the image-receiving material for formation of an image, while the dispersion of fine polymer particles on the image-receiving material maintains a condition in which the ink jet recording ink composition is able to pass therethrough;

wherein the ink jet recording ink composition comprises a dye dispersion comprising an aqueous medium dispersed therein a high-boiling point organic solvent comprising an oil-soluble dye represented by formula (B-I) or (B-II) dissolved therein:

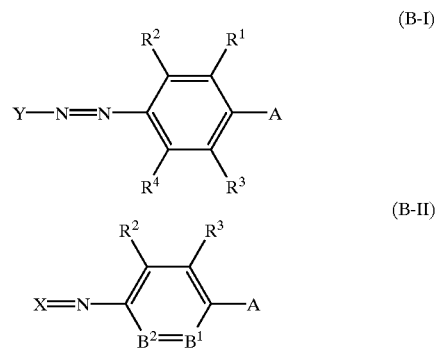

wherein $R^1$, $R^2$, $R^3$ and $R^4$, which may be the same or different, each represents a hydrogen atom, a halogen atom, an aliphatic group, an aromatic group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, a sulfinyl group, a phosphoryl group, an acyl group, a carboxyl group or a sulfo group; A represents —$NR^5R^6$ or a hydroxy group; $R^5$ and $R^6$, which may be the same or different, each represents a hydrogen atom, an aliphatic group, an aromatic group or a heterocyclic group; $R^5$ and $R^6$ may combine with each other to form a ring together with the nitrogen atom; $B^1$ represents =$C(R^3)$— or =N—; $B^2$ represents —$C(R^4)$= or —N=; $R^1$ and $R^5$, $R^3$ and $R^6$ and/or $R^1$ and $R^2$ may combine with each other to form an aromatic ring or a heterocyclic ring; X represents a photographic color coupler residue; and Y represents an unsaturated heterocyclic group.

24. An ink jet image recording method comprising:

forming an image by ejecting an ink jet recording ink composition comprising one of a water-soluble dye and an oil-soluble dye onto an image-receiving material;

applying a solution comprising a dispersion of fine polymer particles to the image-receiving material simultaneously with or after the forming of the image; and converting the dispersion of fine polymer particles to form a film, wherein the ink jet recording ink composition comprises one of a water-soluble dye and an oil-soluble dye in an amount of from 0.2 to 20% by weight.

25. An ink jet image recording method comprising:

applying a solution comprising a dispersion of fine polymer particles to an image-receiving material; and ejecting an ink jet recording ink composition comprising one of a water-soluble dye and an oil-soluble dye onto the image-receiving material for formation of an image, while the dispersion of fine polymer particles on the image-receiving material maintains a condition in which the ink jet recording ink composition is able to pass therethrough, wherein the ink jet recording ink composition comprises one of a water-soluble dye and an oil-soluble d e in an amount of from 0.2 to 20% by weight.

* * * * *